United States Patent
Beall et al.

(10) Patent No.: US 11,055,534 B2
(45) Date of Patent: *Jul. 6, 2021

(54) METHOD AND APPARATUS FOR 3-D AUTO TAGGING

(71) Applicant: Fyusion, Inc., San Francisco, CA (US)

(72) Inventors: Chris Beall, San Francisco, CA (US); Abhishek Kar, Berkeley, CA (US); Stefan Johannes Josef Holzer, San Mateo, CA (US); Radu Bogdan Rusu, San Francisco, CA (US); Pavel Hanchar, Minsk (BY)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,981

(22) Filed: Jan. 31, 2020

(65) Prior Publication Data
US 2020/0167570 A1    May 28, 2020

Related U.S. Application Data

(63) Continuation of application No. 16/179,702, filed on Nov. 2, 2018, now Pat. No. 10,592,747, which is a (Continued)

(51) Int. Cl.
*G06T 19/00* (2011.01)
*G06K 9/00* (2006.01)
*G06T 17/30* (2006.01)

(52) U.S. Cl.
CPC .......... *G06K 9/00671* (2013.01); *G06T 17/30* (2013.01); *G06T 19/003* (2013.01)

(58) Field of Classification Search
CPC .. H04N 13/183; H04N 13/207; H04N 5/2258; H04N 13/275; G06F 3/04815;
(Continued)

(56) References Cited

U.S. PATENT DOCUMENTS 8,515,982 B1   8/2013  Hickman et al.
9,886,771 B1 * 2/2018  Chen ................... G06F 3/04845
(Continued)

FOREIGN PATENT DOCUMENTS

KR   101590256 B1   2/2016
WO   2018154331 A1  8/2018
WO   2020092177 A2  5/2020

OTHER PUBLICATIONS

Bulat et al.; "Human pose estimation via convolutional part heatmap regression," In ECCV, 2016 (Year: 2016).*
(Continued)

*Primary Examiner* — Daniel Chang
(74) *Attorney, Agent, or Firm* — Kwan & Olynick LLP

(57) ABSTRACT

A multi-view interactive digital media representation (MVIDMR) of an object can be generated from live images of an object captured from a camera. Selectable tags can be placed at locations on the object in the MVIDMR. When the selectable tags are selected, media content can be output which shows details of the object at location where the selectable tag is placed. A machine learning algorithm can be used to automatically recognize landmarks on the object in the frames of the MVIDMR and a structure from motion calculation can be used to determine 3-D positions associated with the landmarks. A 3-D skeleton associated with the object can be assembled from the 3-D positions and projected into the frames associated with the MVIDMR. The 3-D skeleton can be used to determine the selectable tag locations in the frames of the MVIDMR of the object.

20 Claims, 31 Drawing Sheets

Related U.S. Application Data continuation-in-part of application No. 15/963,896, filed on Apr. 26, 2018, now Pat. No. 10,382,739.

(58) Field of Classification Search
CPC .............. G06F 3/04842; G06T 5/002; G06T 2207/30252; G06T 17/00; G06T 7/0002; G06T 15/00; G06T 7/20; G06T 7/33; G06K 9/00671; G06K 2209/40; G06K 9/00201; G01C 21/3644
USPC .......................................................... 348/46
See application file for complete search history.

(56) References Cited

U.S. PATENT DOCUMENTS

| | | | |
|---|---|---|---|
| 9,928,544 B1 | 3/2018 | Hasan | |
| 10,382,739 B1 | 8/2019 | Rusu et al. | |
| 10,657,647 B1* | 5/2020 | Chen | B62D 65/02 |
| 10,668,965 B2* | 6/2020 | Czinger | B62D 65/02 |
| 2015/0130799 A1* | 5/2015 | Holzer | H04N 13/279 |
| | | | 345/420 |
| 2015/0206341 A1* | 7/2015 | Loper | G06T 17/10 |
| | | | 345/420 |
| 2015/0254224 A1 | 9/2015 | Kim et al. | |
| 2017/0018055 A1* | 1/2017 | Holzer | H04N 13/111 |
| 2017/0018056 A1* | 1/2017 | Holzer | G06K 9/00664 |
| 2017/0084001 A1* | 3/2017 | Holzer | G06T 5/005 |
| 2017/0109930 A1* | 4/2017 | Holzer | G06T 13/20 |
| 2017/0277363 A1* | 9/2017 | Holzer | G06F 16/7867 |
| 2017/0277952 A1* | 9/2017 | Thommes | G08G 1/056 |
| 2017/0293894 A1* | 10/2017 | Taliwal | G06K 9/00671 |
| 2018/0143756 A1* | 5/2018 | Mildrew | G06F 3/0482 |
| 2018/0240243 A1 | 8/2018 | Kim et al. | |
| 2018/0315200 A1 | 11/2018 | Davydov et al. | |
| 2018/0357518 A1* | 12/2018 | Sekii | G06T 7/11 |
| 2019/0147221 A1* | 5/2019 | Grabner | G06T 7/75 |
| | | | 382/103 |
| 2019/0209886 A1 | 10/2019 | Harlow | |
| 2019/0304064 A1* | 10/2019 | Zhang | G06T 3/4046 |

OTHER PUBLICATIONS

Cao et al., "Realtime Multi-person 2D Pose Estimation Using Part Affinity Fields," 2017 IEEE Conference on Computer Vision and Pattern Recognition (CVPR), Honolulu, HI, USA, 2017 (Year: 2017).*

U.S. Appl. No. 15/963,896, Non Final Office Action dated Apr. 18, 2019, 7 pgs.

U.S. Appl. No. 15/963,896, Notice of Allowance dated May 22, 2019, 8 pgs.

International Application Serial No. PCT/US19/28807, Search Report and Written Opinion dated Oct. 8, 2019, 12 pgs.

International Application Serial No. PCT/US2019/058204, Search Report and Written Opinion dated Apr. 21, 2010 pages.

Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and ffigure 2.

* cited by examiner

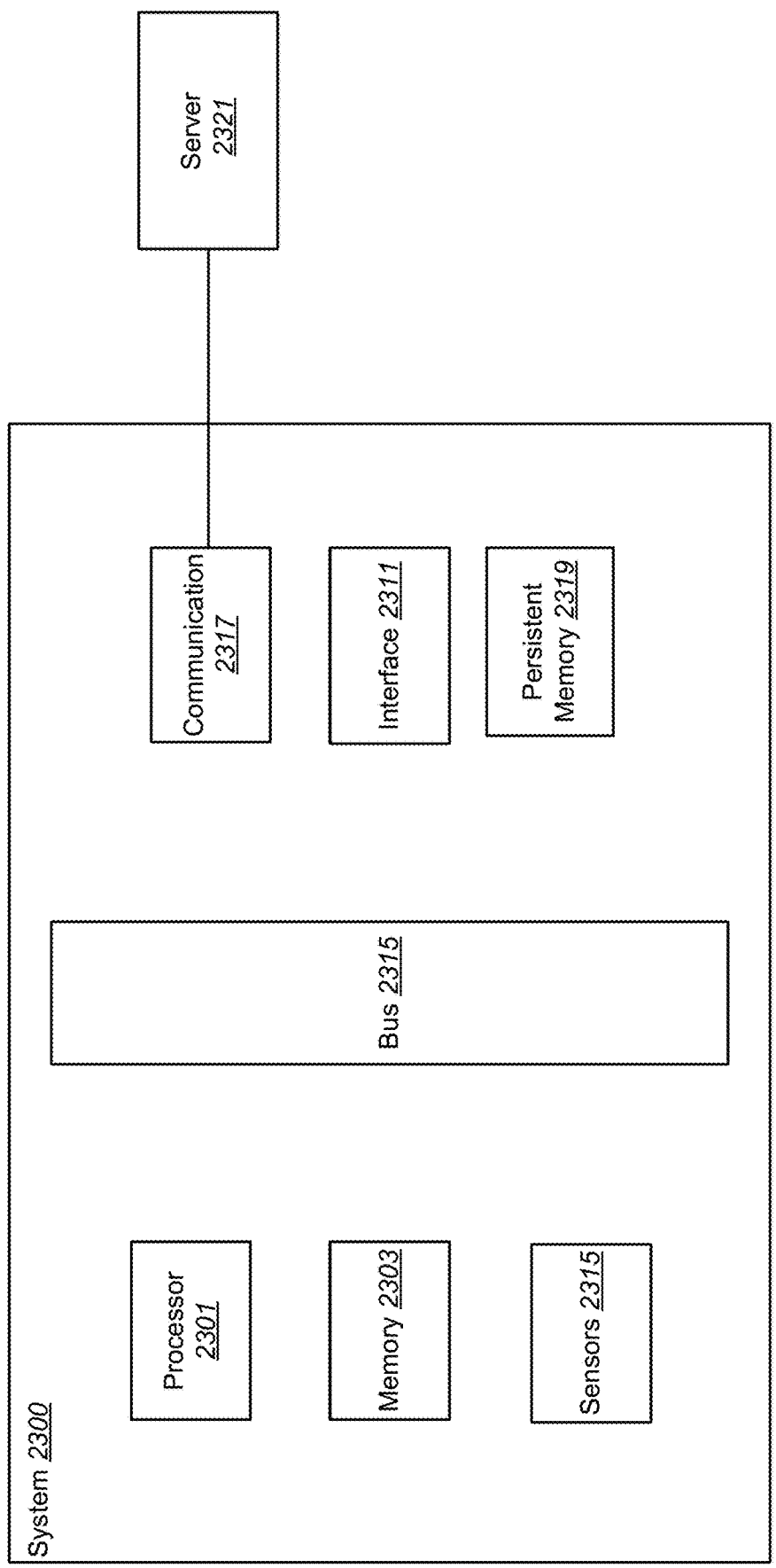

METHOD AND APPARATUS FOR 3-D AUTO TAGGING

CROSS REFERENCE TO RELATED APPLICATIONS

This patent document is a continuation of and claims priority to U.S. patent application Ser. No. 16/179,702, filed Nov. 2, 2018, titled, "METHOD AND APPARATUS FOR 3-D AUTO TAGGING," by Beall, et al., which is a continuation-in-part of and claims priority to U.S. patent application Ser. No. 15/963,896, filed Apr. 26, 2018, titled, "Visual Annotation Using Tagging Sessions," by Rusu, et al., now U.S. Pat. No. 10,382,739, issued on Aug. 13, 2019. U.S. patent application Ser. No. 15/963,896 (now U.S. Pat. No. 10,382,739) and U.S. patent application Ser. No. 16/179,702 are both incorporated by reference herein in their entirety and for all purposes.

TECHNICAL FIELD

The present disclosure relates generally to the capture and presentation of image sequences, and more specifically to capturing and generating content for multi-view interactive digital media representations (MVIDMR) for augmented reality and virtual reality systems.

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). Other existing methods of producing 3D models may be done by computer generation of polygons or texture mapping over a three-dimensional mesh and/or polygon models, which also require high processing times and resources. This limits the efficiency of these methods in processing speed as well as transfer rates when sending it over a network. Accordingly, improved mechanisms for extrapolating and presenting 3D image data are desirable.

Overview

Various embodiments of the present invention relate generally to systems and methods for analyzing and manipulating images and video. According to particular embodiments, the spatial relationship between multiple images and video is analyzed together with location information data, for purposes of creating a representation referred to herein as a multi-view interactive digital media representation (MVIDMR). The MVIDMR can be output to a device with a display, such as a mobile device, tablet computer or laptop computer.

MVIDMRs can include image frames of an object from many different viewing angles. As an example, image frames with viewing angles about a common axis can be grouped together. The grouped images can be stabilized and smoothed. These images can be provided in a sequence where the viewing angle changes from image to image in the sequence in an orderly manner. Thus, as the sequence of images is viewed on a display, the object can appear to rotate about the common axis.

In various embodiments, a location on an object appearing in a frame of an MVIDMR can be tagged. The tag can be integrated into the MVIDMR. The location where a tag is placed can appear in all or a portion of frames of the MVIDMR. Thus, a tag may appear in all or a portion of the frames of the MVIDMR.

In one embodiment, a user may be able to manually select a location on object where a tag is to be placed. In another embodiment, landmarks on a type of object, such as a car, can be selected and a machine learning algorithm, such as a neural net, can be trained to recognize the landmarks from image data including various examples of the type of object. For a particular MVIDMR of an object, the trained machine learning algorithm (TMLA) can be used to determine the pixel locations of the landmarks in all or a portion of the frames of the MVIDMR. The pixel locations of the landmarks determined using the trained machine learning can be used to place tags in the MVIDMR rather than having a user manually select the locations. When many different examples of a type of object are to be tagged, it can be more efficient to use a TMLA to determine the tag locations as opposed to manually determining the tag locations for each object.

In a particular embodiment, connection relationships between the landmarks can be specified. Based upon the connection relationships between the landmarks, a 2-D skeleton associated with the object can be determined in a particular frame in the MVIDMR. Based upon a structure from motion calculation, such as a bundle adjustment, 3-D position data associated with the object can be determined.

The 3-D position data can be used to determine a 3-D skeleton associated with object. The 3-D skeleton including the positions of the landmarks and the connections between landmarks can be projected into the 2-D image frames associated with the MVIDMR. The positions of the landmarks in the 2-D image frames associated with the MVIDMR determined from the 3-D skeleton can be used to determine selectable tag locations.

In particular embodiments, media content, such as photo, a video or an MVIDMR, can be generated that is associated with the location where the tag is placed. The media content can provide details about the location where a tag is placed, such as the close up views. The tag can be selectable. Thus, when the MVIDMR is output and the tag is selected, the media content associated with the tag can be output. As is described in more detail as follows, methods and apparatus, including interfaces, for generating an MVIDMR, placing tags and propagating the tag through the frames of the generated MVIDMR and capturing the media content, which can be output, when the tag is selected, are discussed.

One aspect of the present disclosure is generally related to a method on a mobile device including a processor, a memory, a camera, a plurality of sensors, a microphone and a display and a touch screen sensor. The method can include 1) receiving via an input interface on the mobile device a request to generate a multi-view interactive digital media representation (MVIDMR) of an object; 2) recording a first plurality of frames from the camera on the mobile device from a live video stream as the mobile device moves along a trajectory such that different views of the object are captured in the first plurality of frames; 3) generating the MVIDMR of the object including a second plurality of frames from the first plurality of frames where the different views of the object can be included in each of the second plurality of frames; 4) using a machine learning algorithm on the second plurality of frames to generate heatmaps and part affinity fields associated with possible 2-D pixel locations of a plurality of landmarks on the object wherein the machine learning algorithm can be trained to recognize the plurality of landmarks; 5) based upon the heatmaps and part affinity fields, determining a skeleton for the object where the plurality of landmarks can form joints of the skeleton and where determining the skeleton includes determining the 2-D pixel locations of the joints; 6) rendering a first selectable tag into the second plurality of frames to form a third plurality of frames associated with a tagged MVIDMR where the first selectable tag can be associated with a first landmark positioned at a first joint within the skeleton and where the first selectable tag can be rendered into the second plurality frames relative to first 2-D pixel locations determined for the first joint in the second plurality of frames; 7) receiving media content associated with the first selectable tag; 8) outputting a first frame from the third plurality of frames of the tagged MVIDMR that includes the first selectable tag; 9) receiving input from the touch screen sensor indicating the first selectable tag is selected in the first frame from the tagged MVIDMR; and 10) in response, outputting the media content associated with the first selectable tag to the display.

An additional aspect of the present disclosure can be generally characterized as a method on a mobile device including a processor, a memory, a camera, a plurality of sensors, a microphone and a display and a touch screen sensor. The method can include 1) receiving via an input interface on the mobile device a request to generate a multi-view interactive digital media representation (MVIDMR) of car; 2) recording a first plurality of frames from the camera on the mobile device from a live video stream as the mobile device moves along a trajectory such that different views of the car are captured in the first plurality of frames; 3) generating the MVIDMR of the car including a second plurality of frames from the first plurality of frames where the different views of the car can include in each of the second plurality of frames; 4) using a machine learning algorithm on the second plurality of frames to generate heatmaps and part affinity fields associated with possible 2-D pixel locations of a plurality of landmarks on the car wherein the machine learning algorithm is trained to recognize the plurality of landmarks; 5) based upon the heatmaps and part affinity fields, determining a 3-D skeleton for the car where the plurality of landmarks can form joints of the 3-D skeleton and where determining the 3-D skeleton can include determining the 3-D positions of the joints; 6) rendering a first selectable tag into the second plurality of frames to form a third plurality of frames associated with a tagged MVIDMR where the first selectable tag is associated with a first landmark positioned at a first joint in the 3-D skeleton and where the first selectable tag can be rendered into the second plurality frames relative to first 2-D pixel locations determined for the first joint in the second plurality of frames from first 3-D positions associated with the first joint; 7) receiving media content associated with the first selectable tag; 8) outputting a first frame from the third plurality of frames of the tagged MVIDMR of the car that can include the first selectable tag; 9) receiving input from the touch screen sensor indicating the first selectable tag is selected in the first frame from the tagged MVIDMR; and 10) in response, outputting the media content associated with the first selectable tag to the display.

BRIEF DESCRIPTION OF THE DRAWINGS

The disclosure may best be understood by reference to the following description taken in conjunction with the accompanying drawings, which illustrate particular embodiments of the present invention.

FIG. 18 illustrates a particular example of a computer system that can be used with various embodiments of the present invention.

DETAILED DESCRIPTION

Figure 1:
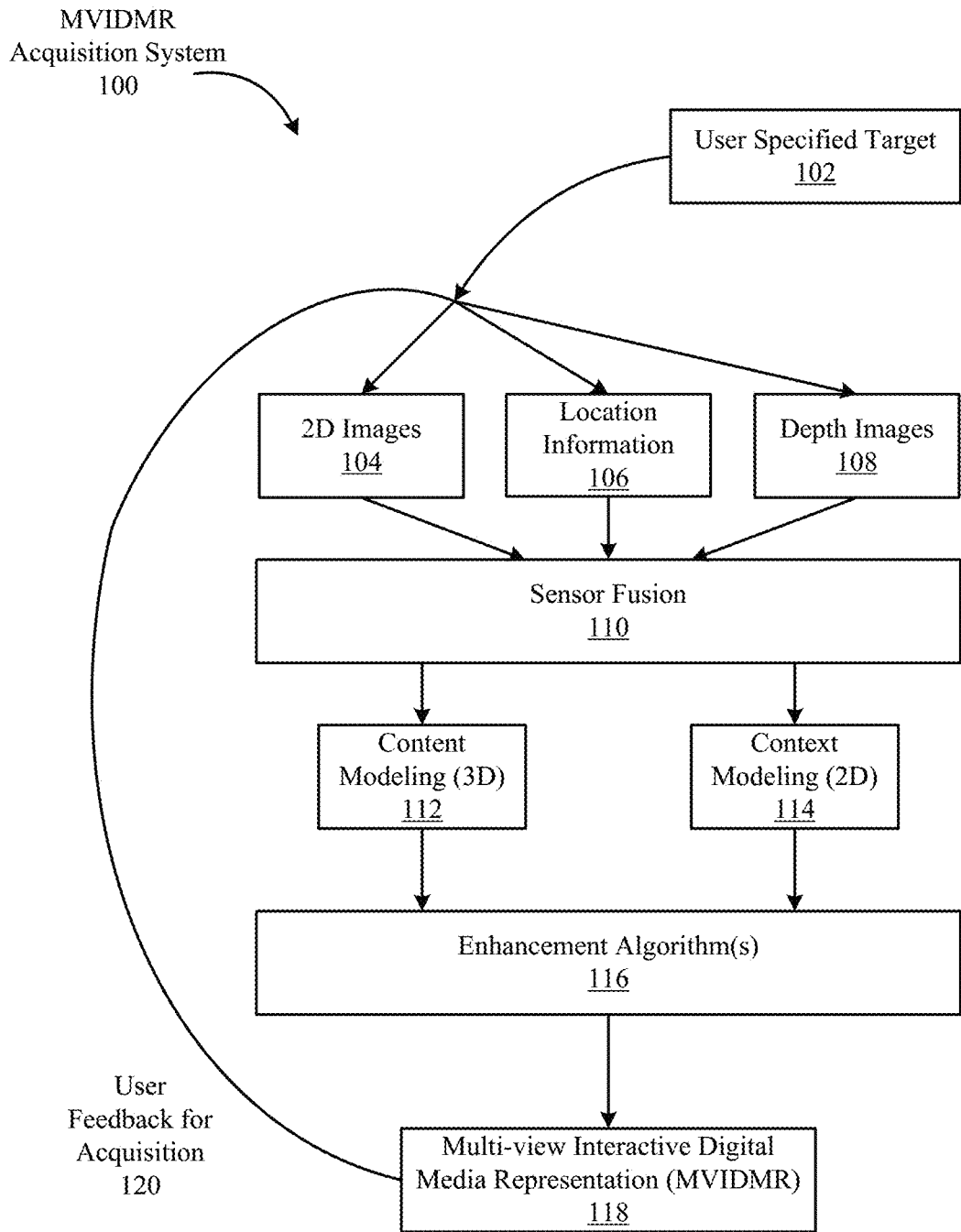
FIG. 1 illustrates an example of a multi-view interactive digital media representation acquisition system in accordance with embodiments of the present invention.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation (MVIDMR), which eliminates redundancy in the data, and presents a user with an interactive and immersive active viewing experience. According to various embodiments, active is described in the context of providing a user with the ability to control the viewpoint of the visual information displayed on a screen.

Next, with respect to FIGS. 1-18 methods and apparatus for acquiring image data and generating a multi-view interactive digital media representation (MVIDMR) of an object are discussed. In particular embodiments, the MVIDMRs can be generated from a video stream of an object captured using a mobile device. The video stream can include a plurality of frames each having image data. Method and apparatus embodied as interfaces are described.

The interfaces can allow tags to be placed in the MVIDMR and media content associated with the tags to be captured. The tags can be selectable to allow the captured media content to be output. In embodiment, the object in the MVIDMR can be a car and the tags can be used to output media content with additional details about the car at the location where the tag is placed on the car. For example, a tag placed on a wheel on the car in an MVIDMR can be selected to output additional media content about the wheel.

A number of sections are described in the detailed description. In a first section, including FIGS. 1 to 6D and entitled "MVIDMR Generation," some aspects of image capture and MVIDMR generation are discussed. In more detail, an example of MVIDMR system is discussed with respect to FIG. 1. An example of a process flow for generating an MVIDMR is described. With respect to FIG. 3, one example of multiple camera views that can be fused into a three-dimensional (3D) model to create an immersive experience is discussed. With respect to FIG. 4, one example of separating content and context for MVIDMR generation is described. Examples of concave view and convex views, respectively, where both views use a back-camera capture style are described with respect to FIGS. 5A and 5B. Various capture modes, which can be used in MVIDMR generation, are discussed with respect to FIGS. 6A to 6D.

Figure 7:
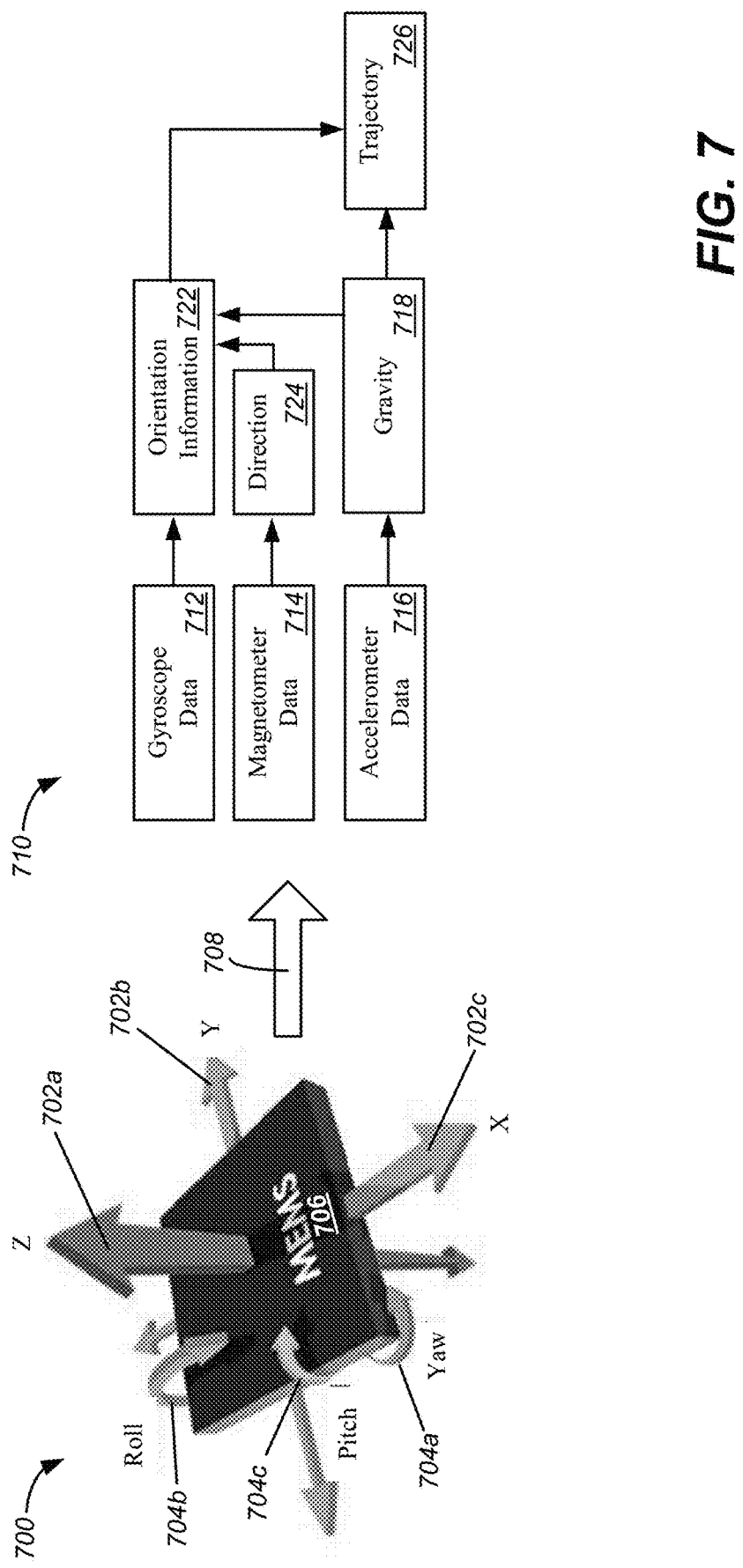
FIG. 7 illustrates a sensor package for determining orientation of a camera used to generate a MVIDMR in accordance with embodiments of the present invention.
Figure 8B:
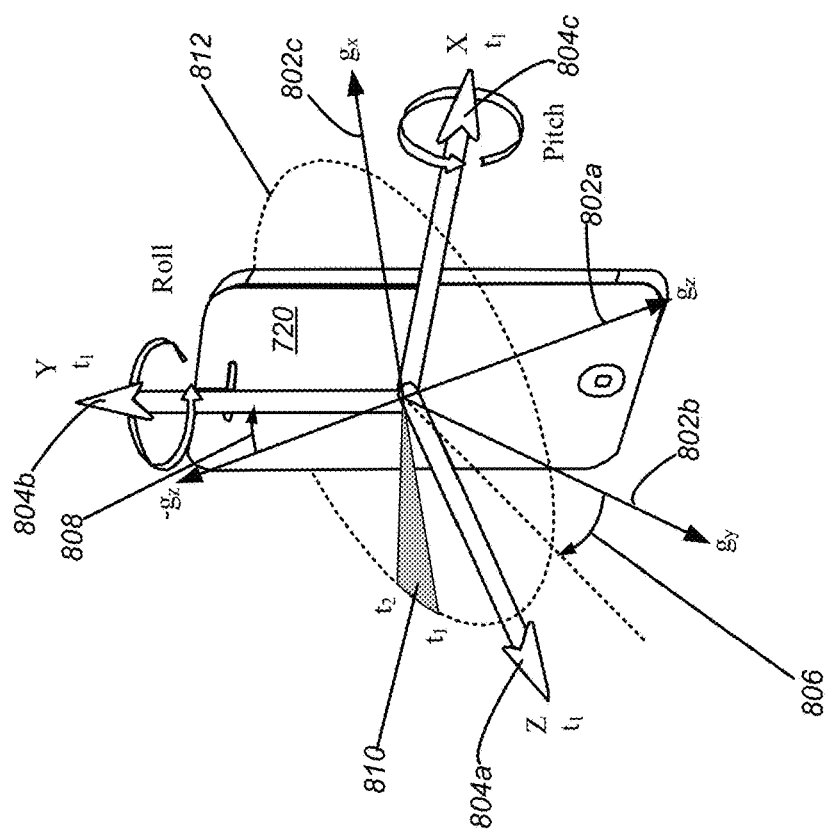
FIG. 8B illustrates pitch and roll of a mobile device and angle changes as a function of time relative to the gravity vector during MVIDMR generation in accordance with embodiments of the present invention.
Figure 8A:
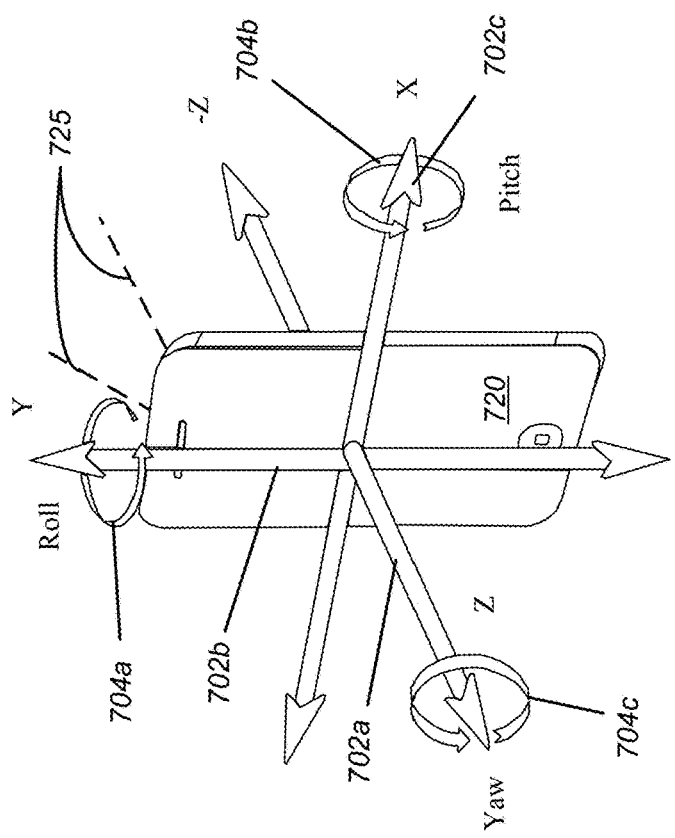
FIG. 8A illustrates a mobile device and body-centric coordinate system in accordance with embodiments of the present invention.

In a second section, including FIGS. 7, 8A and 8B, and entitled "IMU Data and Processing," sensor packages are described. In particular, with respect to FIG. 7, some examples of sensor packages, their integration into a mobile device and sensors are discussed. The sensor data from the sensor packages can be used in the MVIDMR generation process. With respect to FIGS. 8A to 8B, rotation metrics and angle measurements determined from IMU data are described. The rotation data and angle measurements can be used to determine a ground plane of the camera and a viewing angle of the object which is captured in the images.

In a third section, including FIGS. 9A-11, and entitled "Session Tagging," methods and apparatus for generating an MVIDMR of an object, placing tags on the object in the MVIDMR and capturing media content associated with the tags are described. In particular, with respect to FIGS. 9A-9K, screen grabs of an interface which performs these functions is discussed. With respect to FIG. 10A, tags placed on an object in the MVIDMR and projected onto a plan view of the object are described. With respect to 10B, an MVIDMR navigation scheme is described where tags displayed on a plan view of an object are used to navigate with an MVIDMR of the object including the tags. With respect to FIG. 11, a method of generating an MVIDMR of an object, placing tags on the object in the MVIDMR and then capturing media content associated with the tags is described.

In a fourth section, including FIGS. 12-18, and entitled "Auto Tagging," methods and apparatus for automatically determining selectable tag locations in the frames of an MVIDMR are described. In a particular embodiment, a 3-D skeleton of an object is constructed from image data using machine learning algorithms and structure from motion algorithms. In particular, with respect to FIG. 12, landmarks selected for a car that can be recognized by a machine learning algorithm are discussed. With respect to FIG. 13, a process for training a machine learning algorithm to recognize landmarks on an object is described.

Figure 14:
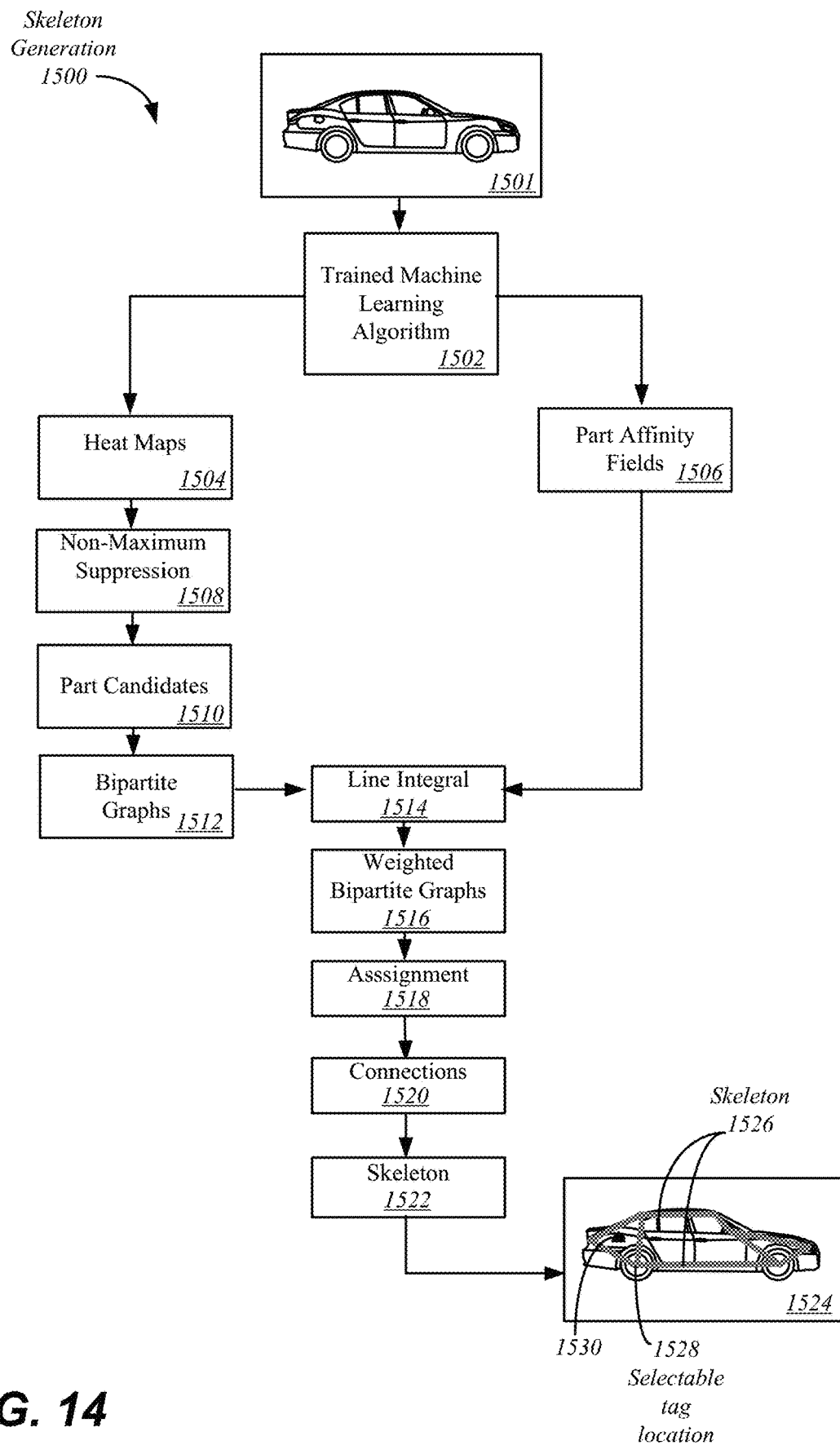
FIG. 14 illustrates a process for determining a 2-D skeleton of an object in an image in accordance with embodiments of the present invention.

With respect to FIG. 14, a process for determining a 2-D skeleton of an object in an image is discussed. With respect to FIG. 15, a process for constructing 3-D data including a 3-D skeleton from images of an object taken from different viewpoints is described. With respect to FIGS. 16A, 16B, 16C and 16D examples of a 3-D skeleton determined for a car where the joints in the 3-D skeleton can provide locations for selectable are discussed. With respect to FIG. 17, a method of automatically determining locations of selectable tags on an object in frames of an MVIDMR is described. Finally, systems which can be used to perform the initial processing and additional processing associated with a tagged MVIDMR are described with respect to FIG. 18.

MVIDMR Generation

With reference to FIG. 1, shown is one example of a multi-view interactive digital media representation acquisition system 100. In the present example embodiment, the multi-view interactive digital media representation acquisition system 100 is depicted in a flow sequence that can be used to generate a multi-view interactive digital media representation. According to various embodiments, the data used to generate a multi-view interactive digital media representation can come from a variety of sources.

In particular, data such as, but not limited to two-dimensional (2D) images 104 can be used to generate a multi-view interactive digital media representation. Images can also be referred to as frames, video frames or image frames. These 2D images can include color image data streams such as multiple image sequences, video data, etc., or multiple images in any of various formats for images, depending on the application. Another source of data that can be used to generate a multi-view interactive digital media representation includes environment information 106. This environment information 106 can be obtained from sources such as accelerometers, gyroscopes, magnetometers, GPS, WiFi, IMU-like systems (Inertial Measurement Unit systems), and the like. Some methods of utilizing the IMU to generate a multi-view interactive digital media representation are described in more detail below with respect to FIGS. 7, 8A and 8B. Yet another source of data that can be used to generate a multi-view interactive digital media representation can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a multi-view interactive digital media representation can be generated for a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a multi-view interactive digital media representation are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It is noted, however, that a multi-view interactive digital media representation can be generated without a user specified target in some applications.

In the present example embodiment, one or more enhancement algorithms can be applied at enhancement algorithm(s) block 116. In particular example embodiments, various algorithms can be employed during capture of multi-view interactive digital media representation data, regardless of the type of capture mode employed. These algorithms can be used to enhance the user experience. For instance, automatic frame selection, stabilization, view interpolation, filters, and/or compression can be used during capture of multi-view interactive digital media representation data. In some examples, these enhancement algorithms can be applied to image data after acquisition of the data. In other examples, these enhancement algorithms can be applied to image data during capture of multi-view interactive digital media representation data.

According to particular example embodiments, automatic frame selection can be used to create a more enjoyable multi-view interactive digital media representation. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a multi-view interactive digital media representation in a manner similar to that used for video. In particular, key frames in a multi-view interactive digital media representation can be stabilized for to produce improvements such as smoother transitions, improved/enhanced focus on the content, etc. However, unlike video, there are many additional sources of stabilization for a multi-view interactive digital media representation, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a multi-view interactive digital media representation. Because points of interest in a multi-view interactive digital media representation are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for multi-view interactive digital media representations. For instance, key points can be detected and tracked. Key point tracking can be a subset of feature tracking. Key points can be tracked from one video frame to the next. For example, key point tracking can be performed by estimating a translation of the key point using an optical flow, such as via the Lucas-Kanade method. Optical flow can be the apparent motion of brightness patterns in the image. Based upon information obtained from an image analysis technique, key points appearing in a first frame can be matched to key points appearing in a second frame and so on.

In certain scenes, such as a dynamic scene or static scene with parallax, no simple warp may exist that can stabilize everything. Consequently, there is a trade-off in which certain aspects of the scene receive more attention to stabilization and other aspects of the scene receive less attention. Because a multi-view interactive digital media representation is often focused on a particular object of interest, a multi-view interactive digital media representation can be content-weighted so that the object of interest is maximally stabilized in some examples.

Another way to improve stabilization in a multi-view interactive digital media representation includes direct selection of a region of a screen. For instance, if a user taps to focus on a region of a screen, then records a convex multi-view interactive digital media representation, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic key points. In another example, a user can select an area of image to use as a source for key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a multi-view interactive digital media representation in some embodiments. In other embodiments, view interpolation can be applied during multi-view interactive digital media representation generation.

In some examples, filters can also be used during capture or generation of a multi-view interactive digital media representation to enhance the viewing experience. Just as many popular photo sharing services provide aesthetic filters that can be applied to static, two-dimensional images, aesthetic filters can similarly be applied to surround images. However, because a multi-view interactive digital media representation is more expressive than a two-dimensional image, and three-dimensional information is available in a multi-view interactive digital media representation, these filters can be extended to include effects that are ill-defined in two dimensional photos. For instance, in a multi-view interactive digital media representation, motion blur can be added to the background (i.e. context) while the content remains crisp. In another example, a drop-shadow can be added to the object of interest in a multi-view interactive digital media representation.

In various examples, compression can also be used as an enhancement algorithm 116. In particular, compression can be used to enhance user-experience by reducing data upload and download costs. Because multi-view interactive digital media representations use spatial information, far less data can be sent for a multi-view interactive digital media representation than a typical video, while maintaining desired qualities of the multi-view interactive digital media representation. Specifically, the IMU, key point tracks, and user input, combined with the view interpolation described above, can all reduce the amount of data that must be transferred to and from a device during upload or download of a multi-view interactive digital media representation. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a multi-view interactive digital media representation 118 is generated after any enhancement algorithms are applied. The multi-view interactive digital media representation can provide a multi-view interactive digital media representation. In various examples, the multi-view interactive digital media representation can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, multi-view interactive digital media representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with multi-view interactive digital media representations that allow the multi-view interactive digital media representations to be indexed with a high degree of efficiency and accuracy; and the ability of the user to interact and change the viewpoint of the multi-view interactive digital media representation. In particular example embodiments, the characteristics described above can be incorporated natively in the multi-view interactive digital media representation, and provide the capability for use in various applications. For instance, multi-view interactive digital media representations can be used to enhance various fields such as e-commerce, visual search, 3D printing, file sharing, user interaction, and entertainment.

In some embodiments, a multi-view interactive digital media representation can use a series of 2-D images of a physical object taken from multiple viewpoints. When the 2-D images are output to a display, the physical object can appear to undergo a 3-D transformation, such as a rotation in 3-D space. This embodiment of the multi-view interactive digital media representation approach differs from using a full 3-D model of the physical object.

With a full 3-D model approach, the physical object can be represented as a series of polygons where the polygons are defined by points in a 3-D model space. After the 3-D model of the physical object is generated, the 3-D model can be initially positioned in the 3-D model space. Then, the position of the 3-D model can be adjusted in 3-D model space as function of time. For example, the 3-D model of the physical object can be rotated in the 3-D model space.

The re-positioning of the 3-D model involves determining a new location of each of the points of the 3-D model in the 3-D model space. Next, textures can be reapplied to the 3-D model. Yet further, a background can be added to the 3-D model space. Then, a light source in the 3-D model space can be simulated. Finally, based upon the light source, the 3-D model and the background can be re-rendered to a 2-D image. This process is repeated each time the 3-D model is changed in the 3-D model space.

The determination of the changes to the 3-D model positions in the 3-D space as a function of time, the re-texturing of the model, the addition of the background and then the re-rendering is computationally expensive, especially as the complexity of the 3-D model increases. Further, as described above, it requires the generation and storage of a 3-D model and its defining parameters, which is time consuming. Thus, the multi-view interactive digital media representation can be more computationally efficient and require less memory resources than a 3-D model approach.

In addition, when an apparent motion of an object is output from a multi-view interactive digital media representation, it appears as if the object motion is generated from an image quality 3-D textured model. Image quality 3-D textured models are generated in a time consuming and often manual process. In particular, the generation of an image quality textured 3-D model of an object, such as an actual person's face, is notoriously difficult and time consuming, especially, when a "life like" rendering of the object is desired.

In this embodiment of the multi-view interactive digital media representation approach, because of the elimination of the 3-D modeling steps, user-selected objects from user generated 2-D images can be converted quickly to a multi-view interactive digital media representation and then output to a display in real-time. During output, the user can control aspects of apparent motion of the object within the multi-view interactive digital media representation. Because the object in the multi-view interactive digital media representation can be generated from real images, such as images received from a user-controlled camera, the object appears life-like when output. In a traditional 3-D modeling approach, because of the difficulties associated with generating an image quality 3-D model, this capability is not offered.

Returning to FIG. 1, according to various example embodiments, once a multi-view interactive digital media representation 118 is generated, user feedback for acquisition 120 of additional image data can be provided. In particular, if a multi-view interactive digital media representation is determined to need additional views to provide a more accurate model of the content or context, a user may be prompted to provide additional views. Once these additional views are received by the multi-view interactive digital media representation acquisition system 100, these additional views can be processed by the system 100 and incorporated into the multi-view interactive digital media representation.

Figure 2:
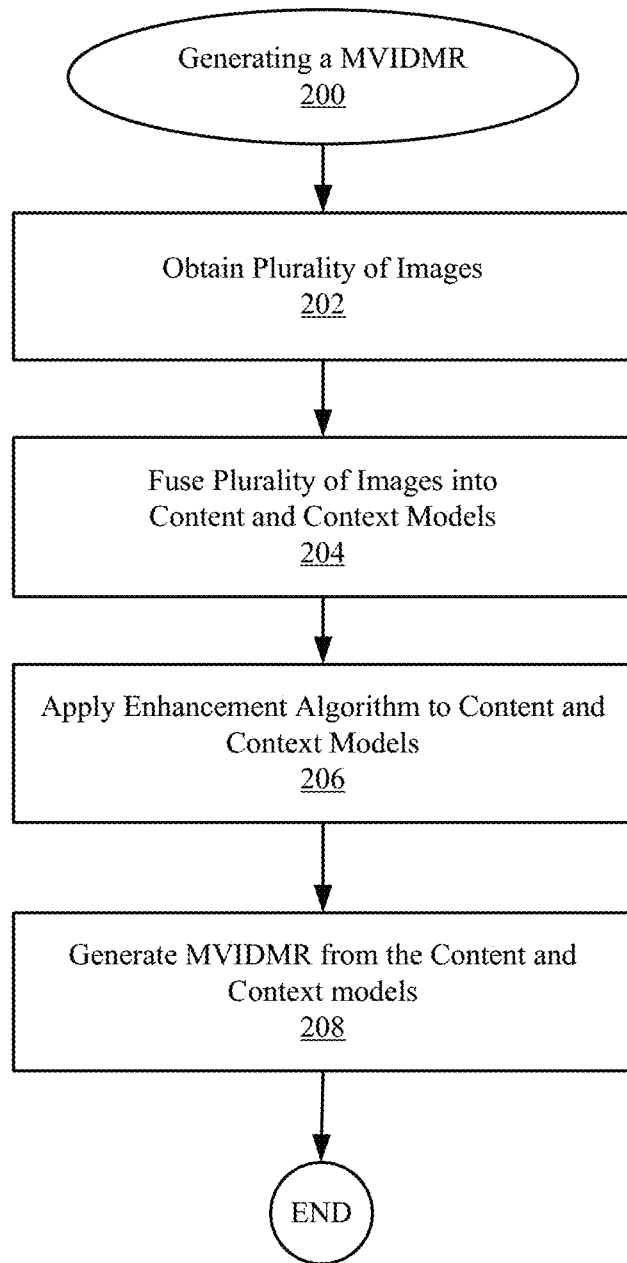
FIG. 2 illustrates an example of a process flow for generating a multi-view interactive digital media representation in accordance with embodiments of the present invention.

With reference to FIG. 2, shown is an example of a process flow diagram for generating a multi-view interactive digital media representation 200. In the present example, a plurality of images is obtained at 202. According to various embodiments, the plurality of images can include two-dimensional (2D) images or data streams. These 2D images can include location information that can be used to generate a multi-view interactive digital media representation. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a multi-view interactive digital media representation is generated from the content and context models at 208. The multi-view interactive digital media representation can provide a multi-view interactive digital media representation. In various examples, the multi-view interactive digital media representation can include a three-dimensional model of the content and a two-dimensional model of the context. According to various embodiments, depending on the mode of capture and the viewpoints of the images, the multi-view interactive digital media representation model can include certain characteristics. For instance, some examples of different styles of multi-view interactive digital media representations include a locally concave multi-view interactive digital media representation, a locally convex multi-view interactive digital media representation, and a locally flat multi-view interactive digital media representation. However, it is noted that multi-view interactive digital media representations can include combinations of views and characteristics, depending on the application.

Figure 3:
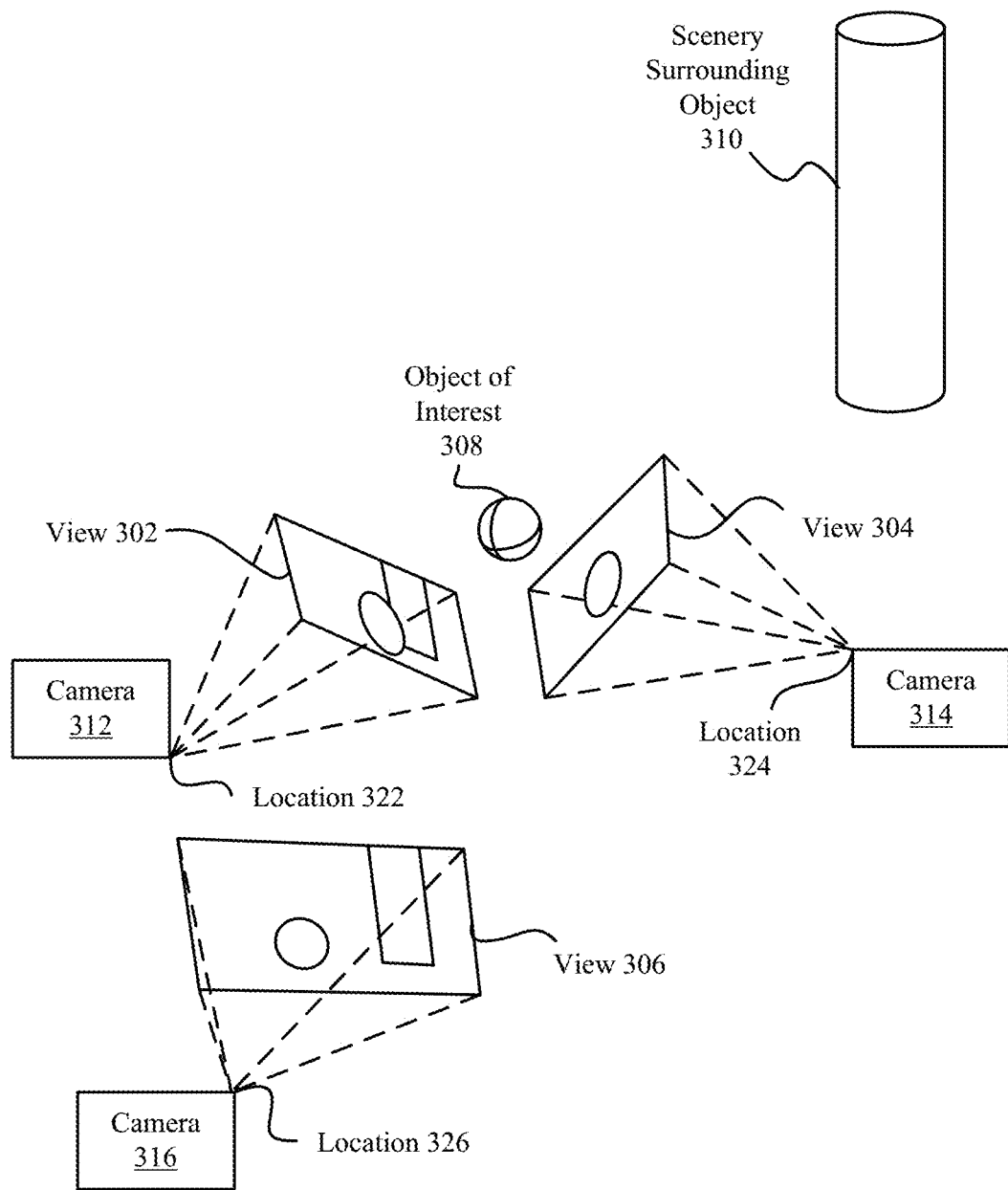
FIG. 3 illustrates one example of multiple camera views that can be fused into a three-dimensional (3D) model to create an immersive experience in accordance with embodiments of the present invention.

With reference to FIG. 3, shown is one example of multiple camera views that can be fused together into a three-dimensional (3D) model to create an immersive experience. According to various embodiments, multiple images can be captured from various viewpoints and fused together to provide a multi-view interactive digital media representation. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 306 along with their associated locations 322, 324, and 326, respectively, provide a rich source of information about object of interest 308 and the surrounding context that can be used to produce a multi-view interactive digital media representation. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a multi-view interactive digital media representation.

Figure 4:
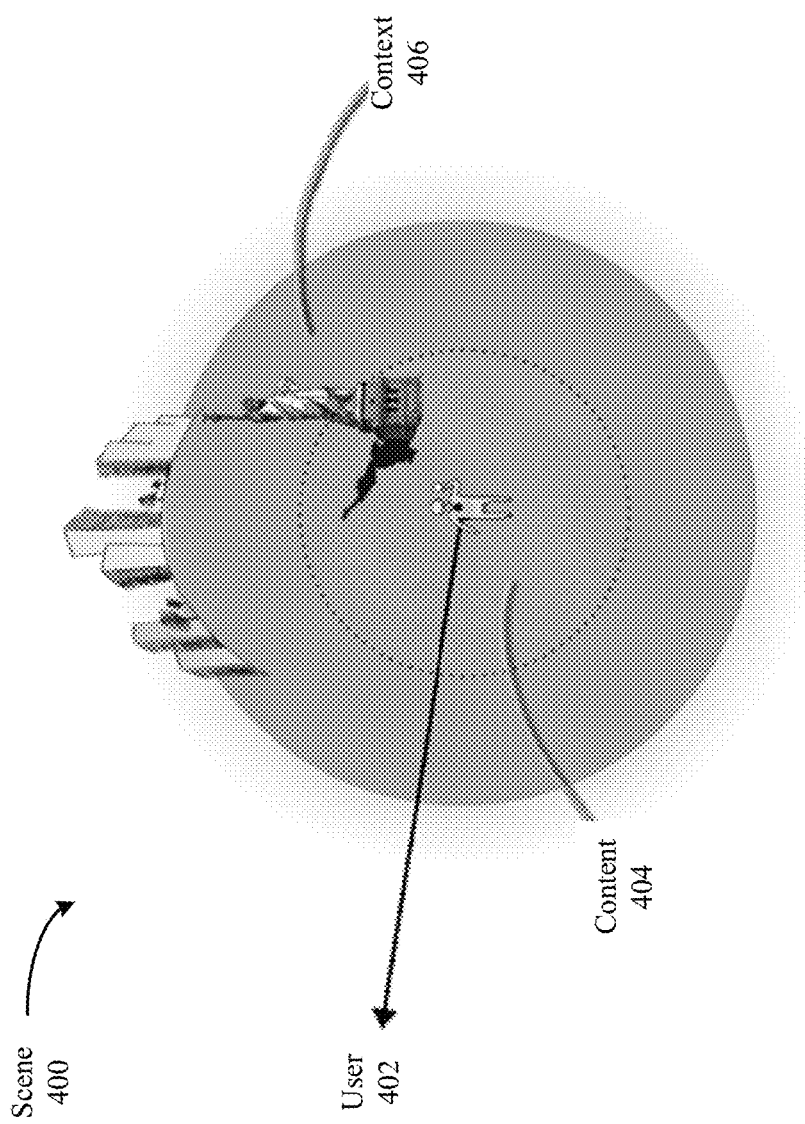
FIG. 4 illustrates one example of separation of content and context in a multi-view interactive digital media representation in accordance with embodiments of the present invention.

FIG. 4 illustrates one example of separation of content and context in a multi-view interactive digital media representation. According to various embodiments of the present invention, a multi-view interactive digital media representation is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a multi-view interactive digital media representation.

According to various embodiments of the present disclosure, the digital visual data included in a multi-view interactive digital media representation can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a multi-view interactive digital media representation may represent the content 404 as three-dimensional data, and the context 406 as a two-dimensional panoramic background. In other examples, a multi-view interactive digital media representation may represent both the content 404 and context 406 as two-dimensional panoramic scenes. In yet other examples, content 404 and context 406 may include three-dimensional components or aspects. In particular embodiments, the way that the multi-view interactive digital media representation depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the multi-view interactive digital media representation produced may have some characteristics that are similar to other types of digital media such as panoramas. However, according to various embodiments, multi-view interactive digital media representations include additional features that distinguish them from these existing types of digital media. For instance, a multi-view interactive digital media representation can represent moving data. Additionally, a multi-view interactive digital media representation is not limited to a specific cylindrical, spherical or translational movement. Various motions can be used to capture image data with a camera or other capture device. Furthermore, unlike a stitched panorama, a multi-view interactive digital media representation can display different sides of the same object.

Figures 5A, 5B:
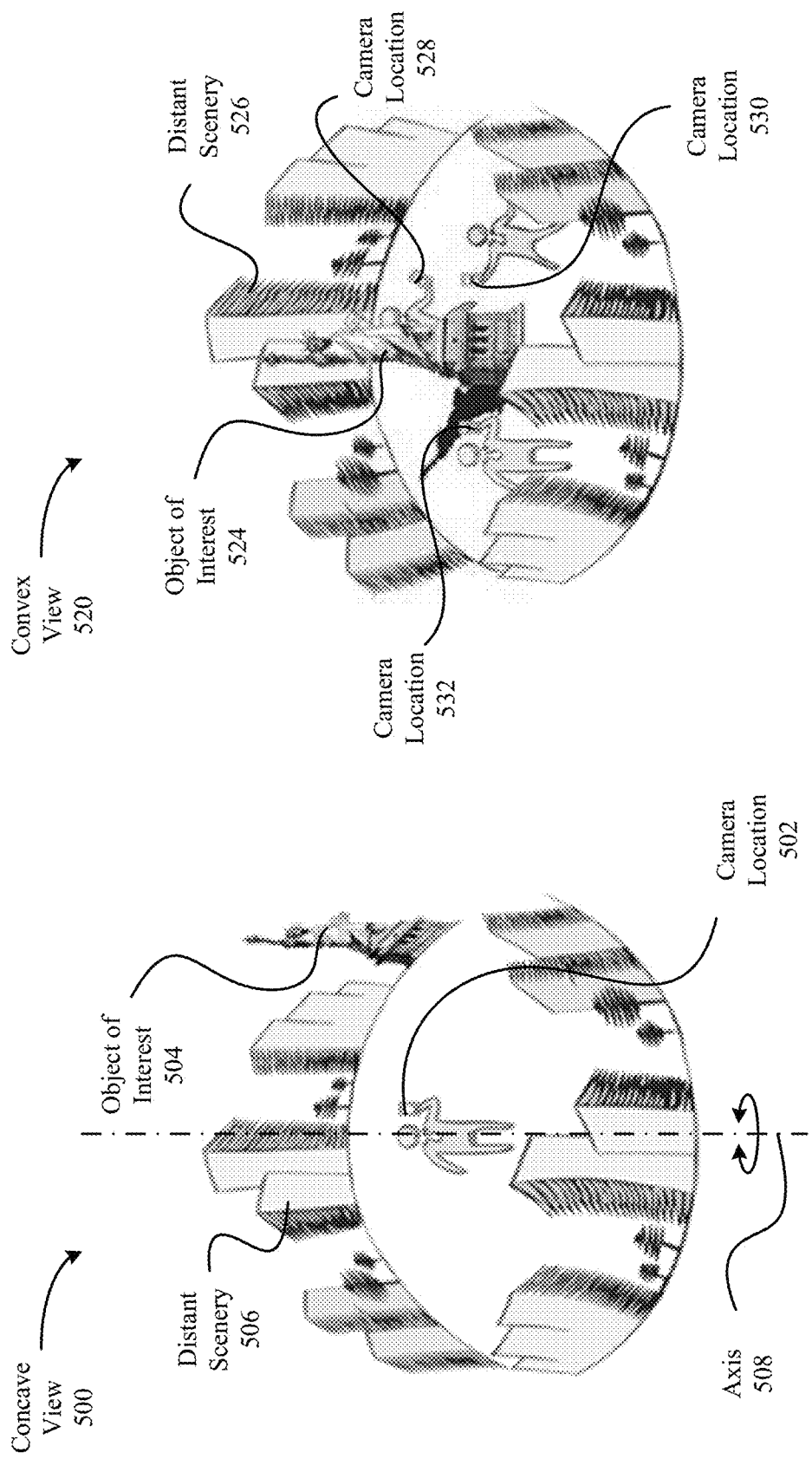
FIGS. 5A and 5B illustrate examples of concave view and convex views, respectively, where both views use a back-camera capture style in accordance with embodiments of the present invention.

FIGS. 5A and 5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a multi-view interactive digital media representation.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A to 6D illustrate examples of various capture modes for multi-view interactive digital media representations. Although various motions can be used to capture a multi-view interactive digital media representation and are not constrained to any particular type of motion, three general types of motion can be used to capture particular features or views described in conjunction multi-view interactive digital media representations. These three types of motion, respectively, can yield a locally concave multi-view interactive digital media representation, a locally convex multi-view interactive digital media representation, and a locally flat multi-view interactive digital media representation. In some examples, a multi-view interactive digital media representation can include various types of motions within the same multi-view interactive digital media representation.

Figure 6A:
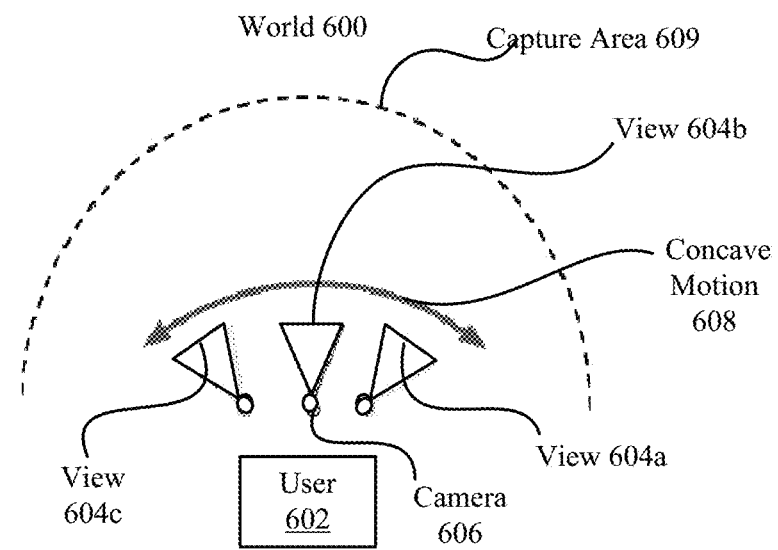
FIGS. 6A to 6D illustrate examples of various capture modes for multi-view interactive digital media representations in accordance with embodiments of the present invention.

With reference to FIG. 6A, shown is an example of a back-facing, concave multi-view interactive digital media representation being captured. According to various embodiments, a locally concave multi-view interactive digital media representation is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
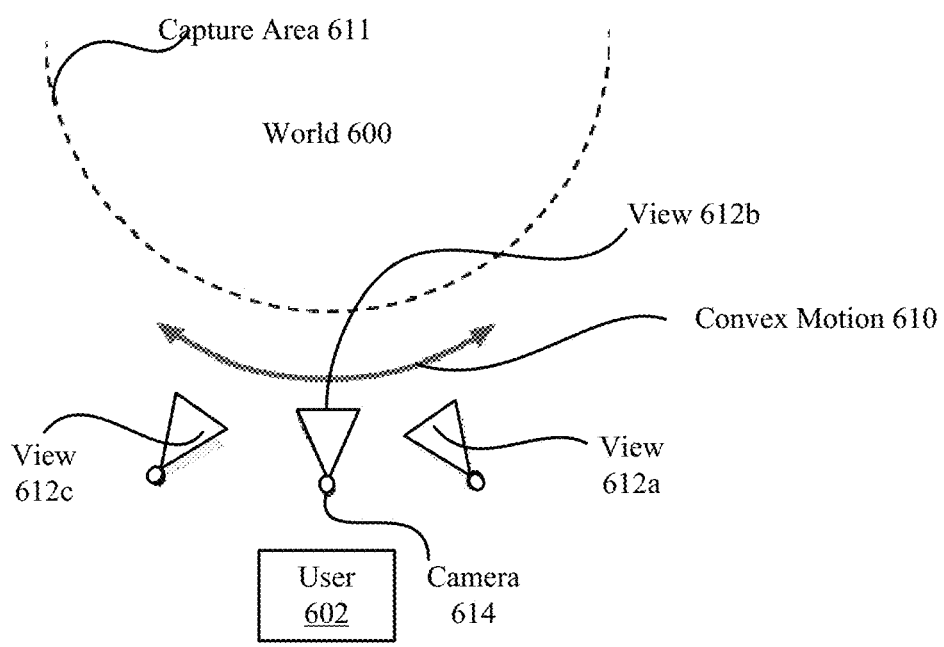

With reference to FIG. 6B, shown is an example of a back-facing, convex multi-view interactive digital media representation being captured. According to various embodiments, a locally convex multi-view interactive digital media representation is one in which viewing angles converge toward a single object of interest. In some examples, a locally convex multi-view interactive digital media representation can provide the experience of orbiting about a point, such that a viewer can see multiple sides of the same object. This object, which may be an "object of interest," can be segmented from the multi-view interactive digital media representation to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
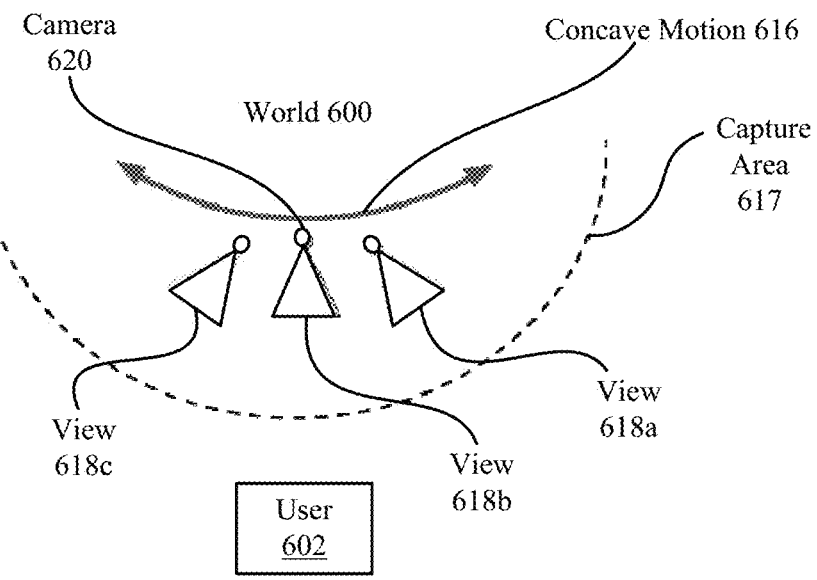

With reference to FIG. 6C, shown is an example of a front-facing, concave multi-view interactive digital media representation being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 608 such that the views 618a, 618b, and 618c diverge from each other in an angular sense. The capture area 617 follows a concave shape that includes the user at a perimeter.

Figure 6D:
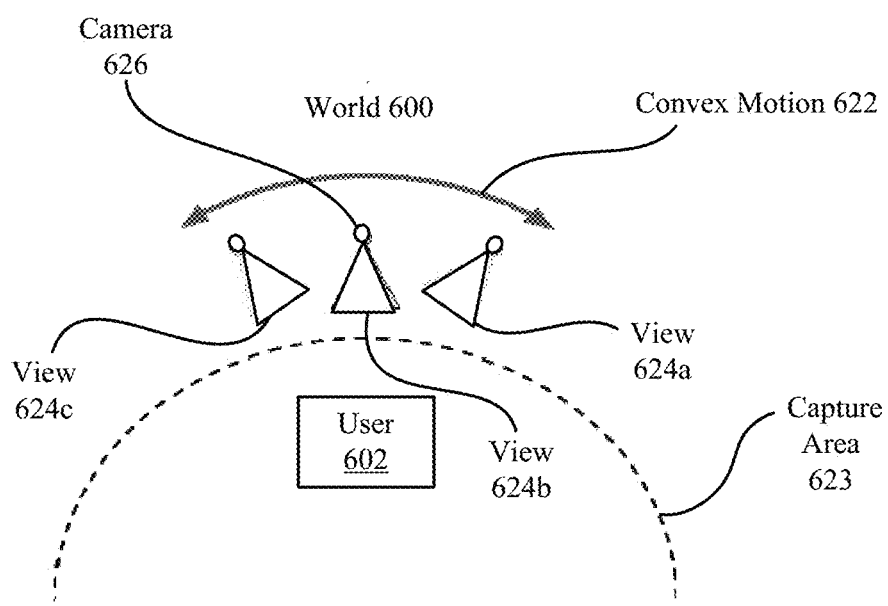

With reference to FIG. 6D, shown is an example of a front-facing, convex multi-view interactive digital media representation being captured. In the present example embodiment, camera 626 is facing user 602. The camera follows a convex motion 622 such that the views 624a, 624b, and 624c converge towards the user 602. As described above, various modes can be used to capture images for a multi-view interactive digital media representation. These modes, including locally concave, locally convex, and locally linear motions, can be used during capture of separate images or during continuous recording of a scene. Such recording can capture a series of images during a single session.

Next, with respect to FIGS. 7, 8A and 8B, a device with a camera and a sensor package is described. As described above, data from a sensor package, such as an IMU can be used to provide image stabilization. Further, data from the sensor package can be used as part of smoothing algorithms used to generate a MVIDMR as described below. Thus, some sensor capabilities and quantities that are derived from the sensors are described as follows.

IMU Data and Processing

In this section, devices, such as mobile devices, which including cameras and sensor packages are described. Image data from the camera and sensor data from the sensors can be used to generate an MVIDMR. FIG. 7 illustrates a sensor package 700 for determining orientation of a camera used to generate a MVIDMR. In one embodiment, the sensor package 700 can include a MEMS (Micro-Electro-Mechanical System) device 706. In particular embodiments, the sensor package 700 can be part of an IMU. Other types of sensor packages are possible and the example of a MEMS device 706 is provided for the purposes of illustration only.

The MEMS device 706 can include a plurality of sensors. For example, the MEMS device 706 can include a 3-axis accelerometer. The 3-axis accelerometer can be used to measure accelerations along the z axis 702a, the y axis 702b and the x axis 702c. In addition, the MEMs device can include a 3-axis gyroscope. The 3-axis gyroscope can be used to measure angular velocities, 704a (yaw) about z axis 702a, 704b (roll) about y axis 702b and 704c (pitch) about x axis 702c. In addition, a MEMs device can include an one or more axis magnetometer (not shown), such as 3-axis magnetometer. In various embodiments, a sensor package 700 can include one or more of accelerometers, gyroscopes, magnetometers or combinations thereof.

The sensor package 700 can output sensor data 708. An IMU, which can include a sensor processing system, such as 710, can receive the sensor data 708 and determine an orientation of a device. For example, gyroscopic data 712 can be integrated to determine angular changes about the pitch, roll and yaw axes. Magnetometer data 714 can be used to determine a heading or direction 724 relative to the Earth's magnetic poles. Accelerometer data 716 can be used to determine a direction of the Earth's gravity vector. Further, accelerometer data 716 can be integrated once to determine a velocity of the device and twice to determine distance changes.

The orientation 722 of a device relative to a reference coordinate system can be described with three angles, i.e., pitch, roll and yaw angles. For example, the accelerometer data 716, such as from a 3-axis accelerometer, can provide a pitch and roll orientation of a device relative to the Earth's gravitational vector. The magnetometer data 714, if available, can be used to provide a yaw angle. Gyroscopic data 712 can be used to provide changes to the pitch, roll and yaw angles. Thus, if an initial orientation of a device is known and it begins to rotate, the gyroscopic data can be used to determine an orientation of a device as a function of time.

FIG. 8A illustrates a mobile device 720 with a sensor package, such as the MEMs device 706 shown in FIG. 7. For example, the MEMs device 706 can be installed in mobile device 720 with its axes aligned as depicted in the FIG. 8A. The mobile device 720 can include one or more cameras (not shown) facing in the negative Z direction along axis 702a and one or more cameras facing in the positive Z direction. An exemplary field of view of at least one camera facing in the negative Z direction is indicated by rays 725.

When the fields of view of two or more cameras overlap, knowledge of the distance between the cameras can be used to obtain distance data, i.e., the distance of the camera to objects captured in the image data. For example, the mobile device 720 can include two cameras facing in the negative Z direction with overlapping fields of view. Where the fields of view overlap, the distance to objects from the cameras, and hence mobile device 720, can be estimated based upon a comparison of image data taken from both cameras. In another example, a structured light system can be used, such as a Kinect™ sensor. The structured light system can use a light source, such as an infrared light generator and a sensor for detecting light reflected from objects.

When mobile device 720 is a rigid body, then based upon a position and orientation of the camera relative to the body of mobile device 720, the orientation of the camera can be determined based upon the orientation of body of the mobile device 720. In this example, a camera is aligned with the Z-direction at some position on the face of the body of device facing in the negative Z direction. As described with respect to FIG. 8A, the orientation of a body of the device can be determined from the sensor package. Hence, based upon its position on mobile device 720, the orientation of the camera can be derived from data from the sensor package.

In other examples, a camera can be configured so that it is not aligned with negative Z direction, such as pointing at an angle relative to the negative Z axis. For instance, the mobile device 720 a first camera can be aligned with the negative Z axis and then one or more additional cameras can be configured to point at angles relative to the negative Z direction. The light gathered from the multiple cameras can be combined to provide a wider field of view. In another example, a camera can be designed to mechanically sweep through an angle to provide a wider field of view.

In yet another example, mobile device 720 may not be a rigid body. For example, mobile device 720 can include a flexible housing. When the housing is flexible, sensors may be included which measure an amount of bending. Based upon the amount of bending determined from the sensors and data from a sensor package, such as a sensor package on an IMU, an orientation of the camera on a flexible body can be determined.

Next, examples are considered where the mobile device 720 is allowed to move generally in 3-D space. FIG. 8B illustrates pitch and roll of a mobile device 720 and angle changes as a function of time relative to the gravity vector during image acquisition for MVIDMR generation. The direction of the gravity vector is indicated by 802a. An orthogonal coordinate system associated with the gravity vector is indicated by 802b and 802c. The gravity vector can be used to determine a ground plane on which a person is resting, such as a surface on which a person is standing.

The direction of the body centered coordinate system for mobile device 720 is indicated by 804a, 804b and 804c. The direction of the camera is in the negative Z direction as in the previous pictures. The pitch and roll orientation of the mobile device 720 relative to the gravity vector can be determined using sensor data from the 3-axis accelerometer. As described above, if a magnetometer data is available, then it may be possible to obtain yaw data.

The gyroscopic data can be used to determine a roll rate of the mobile device 720 about axis 804b and the pitch rate about 804c. The roll rate can be integrated to obtain an amount of roll between a first time and a second. The pitch rate can be integrated to obtain an amount of pitch between a first time and a second time.

In one embodiment, the angular rotation amount of mobile device 720 during an MVIDMR image acquisition can be determined using just the roll rate or pitch rate. If the device is orientated in a portrait mode and the user plans to pan around an object with this orientation, then the roll rate from the gyroscopic data as a function of time can be integrated to determine a total roll angle amount as a function of time. In one embodiment, negative roll rates can be ignored for the purposes of determining the total roll angle amount. The total roll angle amount as a function of time can be used to estimate the angular view of an object that has been captured during image acquisition.

If the mobile device 720 is orientated in a landscape mode and the user plans to pan around an object with the device in this orientation, then the pitch rate from the gyroscopic data as a function of time can be integrated to determine a total pitch angle as a function of time. In this example, negative pitch rates can be ignored for the purposes of determining the total pitch angle amount. The total pitch angle amount as a function of time can be used to estimate the angular view of an object that has been captured during the image acquisition process.

In one embodiment, the MVIDMR system can present a user with a selection of a type of path for the device to follow and an orientation of the device that is to be used during the path. Based upon the input provided by the user, the MVIDMR system can determine whether to determine the total pitch angle amount or the total roll angle amount for the purposes of determining an angular view amount of an object that has been captured as a function of time. In these embodiments, as roll rate data and pitch rate data is being integrated, the orientation of the device as a function time may not be needed. However, a starting time to begin the integration of the roll rate data or the pitch rate data and an ending time may have to be determined. In one embodiment, the start and stop can be determined based upon a user selecting a button in an input interface, i.e., the user can select a button to start the image capture and end the image capture.

In another embodiment, the sensor data from the 3-axis accelerometer can be used. The 3-axis accelerometer can be used to determine a roll and pitch orientation of the mobile device 720 relative to the gravity vector (gx, gy and gz) as a function time. For example, in FIG. 8B, the device is pitched by pitch angle 808 about the gx axis 802c and rolled about the gravity vector gz 802a by a roll angle 806 at time $t_1$. The yaw angle amount about the gy axis 802b is not determined using the 3-axis accelerometer data. As described above, it can be set to an arbitrary value such as zero degrees.

At $t_1$, the first value of angles 806 and 808 provide an orientation of the Z axis 804a (or negative Z axis) in the coordinate system associated with the gravity vector (802a, 802b and 802c). As described above, a camera on mobile device 720 can be orientated in the negative z direction. At $t_2$, the magnitude of the value of the pitch angle 808 can increase or decrease relative to its value at $t_1$ and the magnitude of the value of the roll angle 806 can increase or decrease relative to its value at $t_1$. The values of the pitch angle 808 and roll angle 806 at time $t_2$ again determine the orientation of the negative z vector in the coordinate system associated with the gravity vector.

In one embodiment, at different times, such as between $t_1$ and $t_2$, an angle value can be determined between the 3-D camera direction vectors, which is the negative z direction in the camera based coordinate system. In this example, the 3-D camera direction vector at each time can be determined in the gravity based coordinate system (802a, 802b and 802c) using the pitch and roll angles about the gx 802c and gz 802a axes obtained from the accelerometer data. The yaw angle about the gy 802b vector can be set to zero or some other fixed value (no yaw change as a function of time). With pitch, roll and yaw angles in the gravity based coordinate system for 3-D camera vector known as a function of time, the change in the angle between the 3-D camera direction vector at two different times, such as between times, $t_1$ and $t_2$, can be determined.

The angle changes can be summed to determine a total angle change as a function of time. The angle change is approximately around the gravity vector gz 802a. The total change in angle can be used to estimate an angular view of an object captured by the camera. Thus, the angular view of the object captured as function of time can be determined and output to a display screen. Like the examples described above, a rotation direction that is needed along the path to keep the object in view of the camera can be determined, i.e., clockwise or counter clockwise. Further, angle changes, in the direction that is not needed, can be ignored for the purposes of determining the angular rotation amount in the rotation direction that is needed to keep the object in view of the camera.

In another embodiment, the angle changes can be projected into a particular plane. For example, a circle 812 is shown in a plane perpendicular to the gravity vector. The 3-D camera direction vector can be projected into this plane. Then, the angle changes of the 3-D camera direction vector projected into this plane from time to time can be determined, such as 810. Like the examples described above, a rotation direction that is needed along the path to keep the object in view of the camera can be determined, i.e., clockwise or counter clockwise. Further, as described above, angle changes in the plane in the direction that is not needed can be ignored.

Session Tagging

In this section, methods and apparatus for efficiently tagging an MVIDMR of an object are described. The tags can be placed at different locations on an object. The tags incorporated into an MVIDMR can be selectable. In one embodiment, when a selection of a tag is detected, media content associated with the tag can be output. In some instances, the media content can include close-up views of the location where the tag is placed on the object.

To illustrate session tagging, screen shots of an interface for generating an MVIDMR of an object and placing tags on the object in the MVIDMR are described with respect to FIGS. 9A to 9K. In these figures, the object is a car. However, the example of a car is provided for the purposes of illustration only and is not meant to be limiting.

Figure 9A:
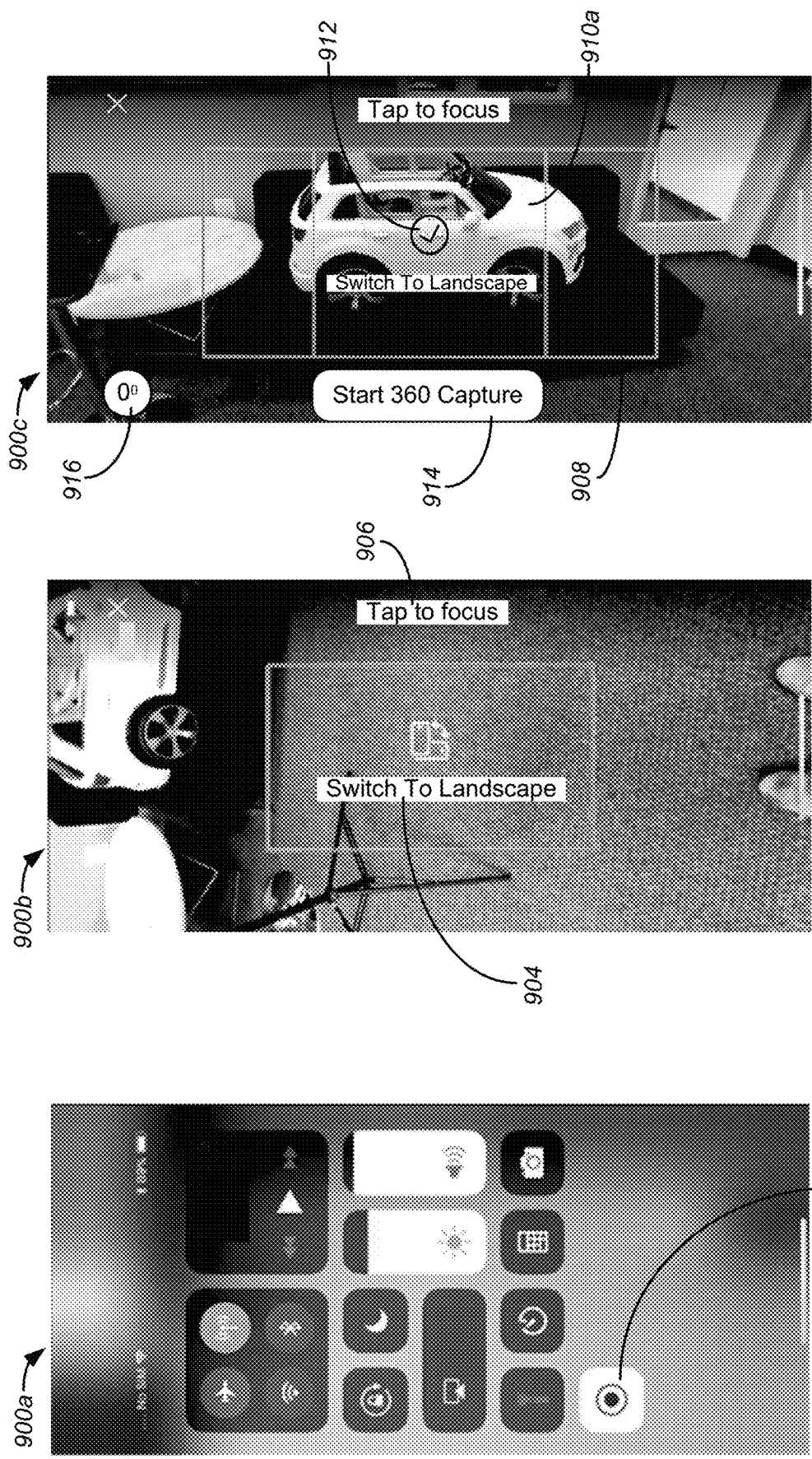
FIG. 9A to 9K are screen shots of an interface for generating an MVIDMR and placing tags in accordance with embodiments of the present invention.

In FIG. 9A, screen shots 900a, 900b and 900c of an interface on a mobile device are shown. In 900a, an initial screen shot including a plurality of selectable icons is shown. A first icon 902 can be for an MVIDMR application. When the first icon 902 is selected, such as via a touch screen sensor, screen shot 900b can be generated which include live video images from a camera coupled to the mobile device. Option 904 to switch to a landscape mode is provided in the interface. Further, an option 906 to tap on an object in the frame on which to focus is provided in the interface. In another embodiment, the message "switch to landscape mode" can be a requirement for the capture.

In 900c, landscape mode is selected. A frame 908 is rendered over the live video image to help keep the image frames centered on a selected object. In this example, the car 910a is selected as an object for an MVIDMR capture as indicated by the check mark 912 and the camera is focused on the car 910a. A selectable button 914 is generated which can be used to start the MVIDMR image capture process.

An indicator 916 can be used to indicate an amount of angular view of the car 910a that has been captured. In one embodiment, the angular view can be determined from IMU data as described above with respect to FIGS. 7A, 8A and 8B. Initially, the angular view in the indicator 916 is set at zero degrees.

Figure 9B:
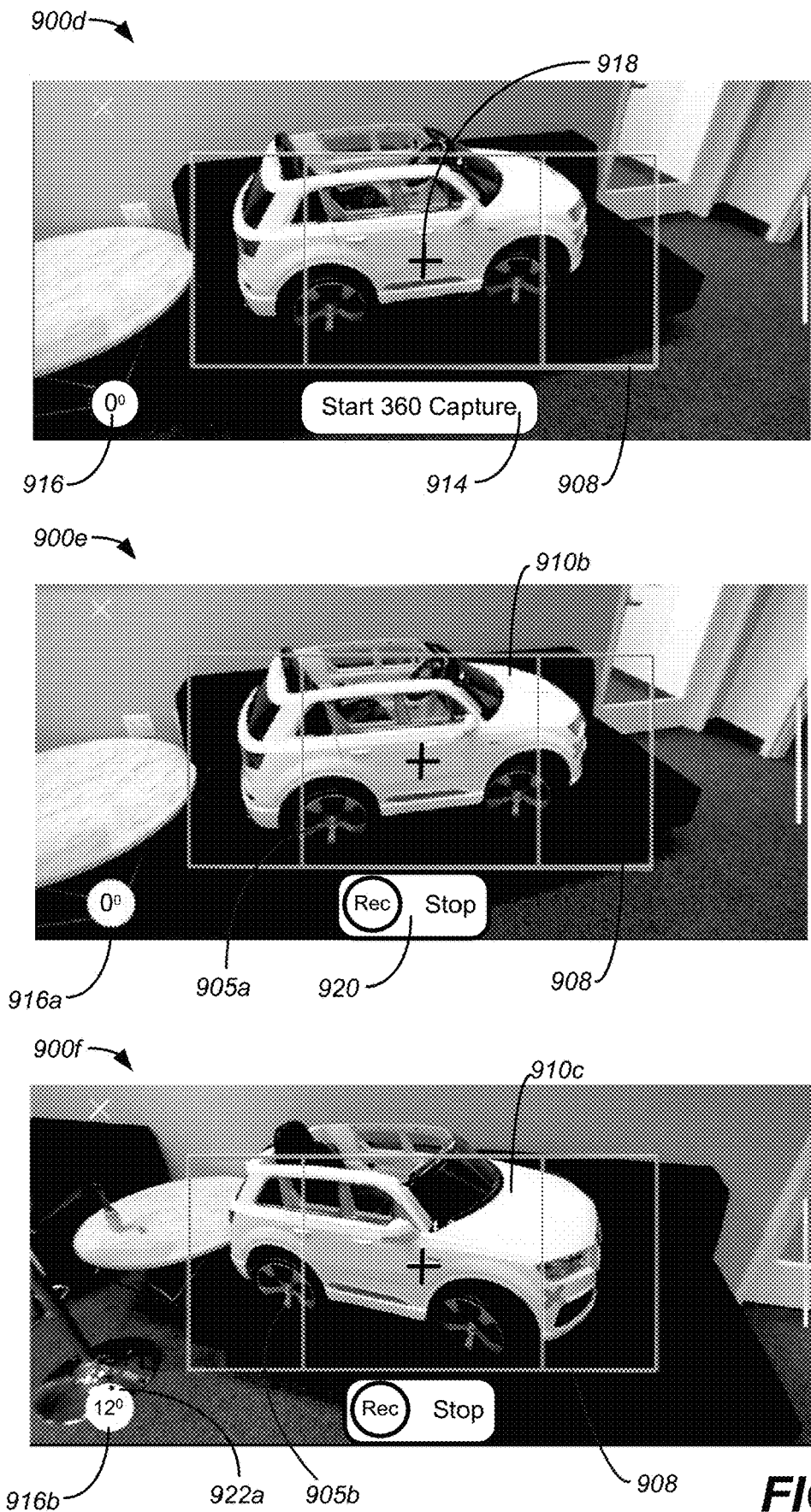
Figure 9C:
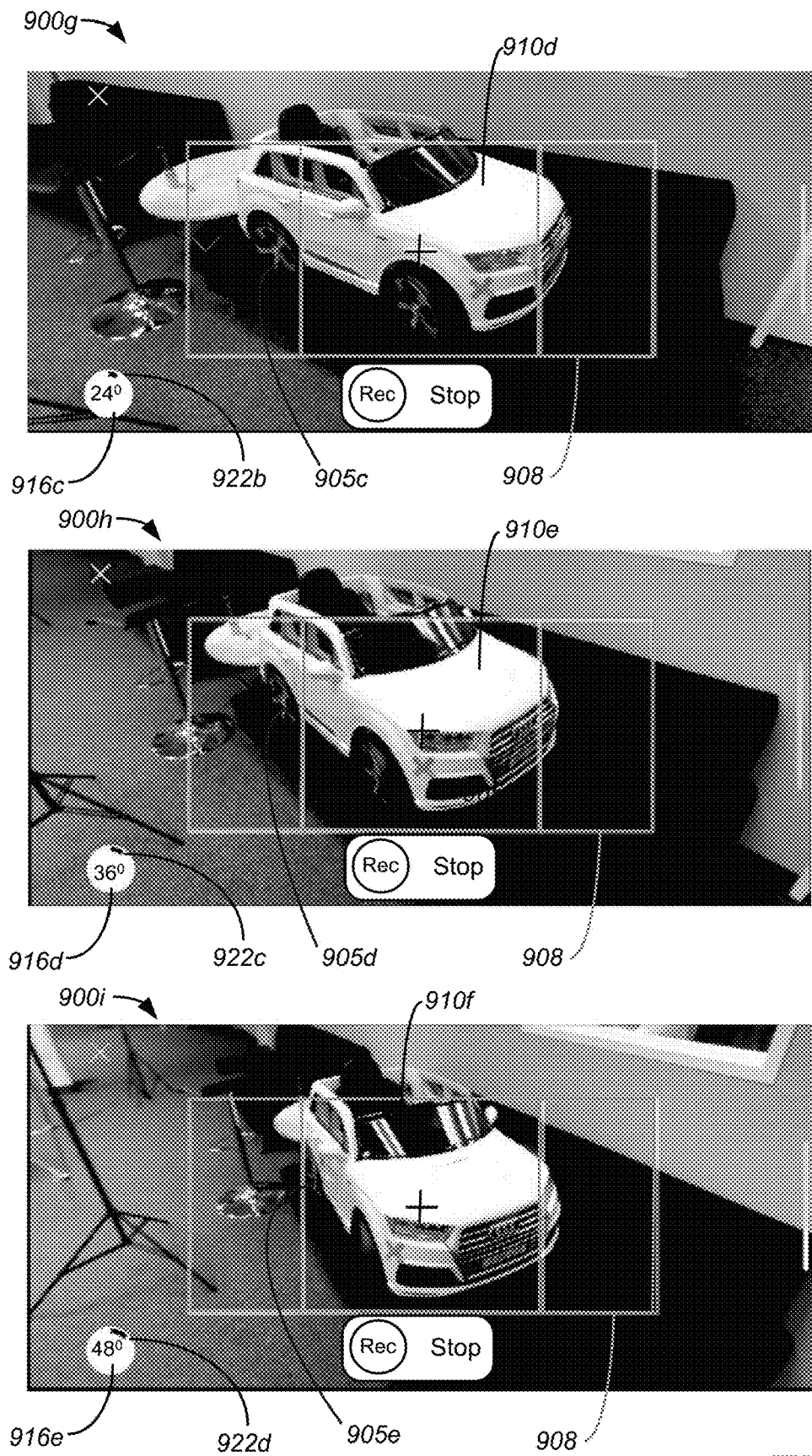

In FIG. 9B, screen shots 900d, 900e and 900f are shown. In 900d, a cross 918 is rendered over the object to be captured. The cross can be used to help keep the object centered in the frame 908. In 900d, selectable button 914 is selected and MVIDMR capture can be initiated.

Figure 9D:
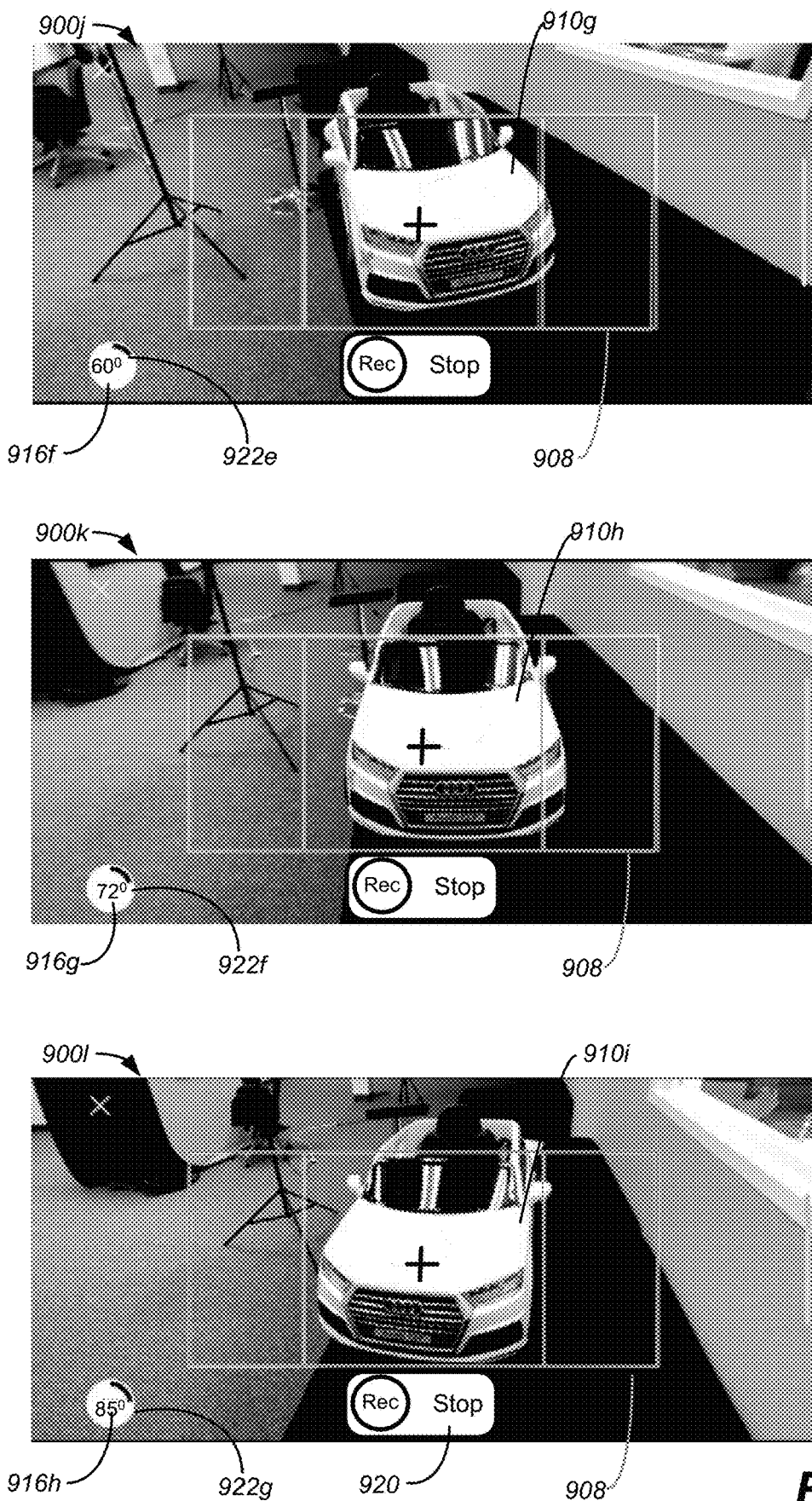

With respect to screen shots 900e and 900f in FIG. 9B, screen shots 900g, 900h and 900i in FIG. 9C and 900j, 900k and 900l in FIG. 9D, image frames captured for an MVIDMR of the object (the car) are shown. The record and stop button 920 can be used to start and stop recording of the images frames from the live video stream.

The total angular view of the car which is currently captured is eighty five degrees as shown in screen shot 900l. Different views, 910b, 910c, 910d, 910e, 910f, 910g, 910h and 900i, of the car are shown as the total angular view increases. Additional different views of the car can be captured and these are provided for the purposes of illustration only and are not meant to be limiting.

In more detail, screen shot 900e shows an angular view of zero degrees, as shown in indicator 916a. Screen shot 900f shows an angular view of twelve degrees as shown in indicator 916b. The indicator 916b includes a textual indicator and a line indicator 922a. The line indicator 922a shows a fraction of a circle associated with the textual indicator.

Screen shot 900g shows an angular view of twenty four degrees as shown textually in indicator 916c and graphically represented by the line indicator 922b. Screen shot 900h shows an angular view of thirty six degrees as shown textually in indicator 916d and graphically represented by the line indicator 922c. Screen shot 900i shows an angular view of forty eight degrees as shown textually in indicator 916e and graphically represented by the line indicator 922d. Screen shot 900j shows an angular view of sixty degrees as shown textually in indicator 916*f* and graphically represented by the line indicator 922*e*. Screen shot 900*k* shows an angular view of seventy two degrees as shown textually in indicator 916*g* and graphically represented by the line indicator 922*f* Finally, screen shot 900*l* shows an angular view of eighty five degrees as shown textually in indicator 916*h* and graphically represented by the line indicator 922*g*.

As will be described in more detail as follows, methods and apparatus for efficiently adding selectable tags to an object are described. In one embodiment, one or more selectable tags can be added to the frames of the MVIDMR of an object after the MVIDMR of the object is generated. During output of the MVIDMR to a display, a detected selection of the selectable tag can cause media content associated with the location where the selectable tag is placed on the object to be output. For example, a selectable tag can be placed on a wheel of a car in an MVIDMR of the car such that when selected causes the media content about the wheel to be output to the display.

Different views of an object can be shown in the MVIDMR. Thus, the locations on the object that appear in each of the plurality of frames of the MVIDMR can vary from frame to frame. In particular, a first location on an object may appear in only a portion of the frames of the MVIDMR, i.e., the first location can move into and out of view. In addition, because the view of the object is changing in the MVIDMR, the position where the first location on an object appears in each frame of the MVIDMR can vary from frame to frame. Thus, if a selectable tag is placed at the first location, the position where the selectable tag appears in each frame can vary from frame to frame and may appear in only a portion of the plurality of frames of the MVIDMR.

As an example, with respect to screen shots 900*e*, 900*f*, 900*g*, 900*h* and 900*i*, a location on the object, which is the center of the back wheel on the car, is shown. The physical location pointed out, i.e., the center of the wheel, on the object is the same in each frame. However, a first location in the frame, 905*a*, 905*b*, 905*c* and 905*d*, i.e., in pixel space, where the physical location appears, changes from frame to frame because the view of the object is changing from frame as frame. Also, the camera can be moving relative to the object. After screen shot 900*i*, which corresponds to a total angular view of forty eight degrees, the physical location at the center of the wheel is no longer visible. Thus, a first position of a selectable tag placed at the center of the wheel can vary in the frames of the MVIDMR and the selectable tag may not appear in some frames.

In one embodiment, each of the plurality of frames of an MVIDMR can be associated with two dimensional pixel coordinates. When a location on an object appearing in a first frame of the MVIDMR is selected for a selectable tag, the location can be associated with the pixel coordinates of the first frame. Then, the location on the object can be estimated in the remaining frames of the MVIDMR including whether the location on the object appears or not.

For example, one or more key points appearing in the image that are in the vicinity of the selected pixel coordinate can be determined. Then, the key points can be tracked from frame to frame in the remaining frames of the MVIDMR. In each of the remaining frames, the location of the tracked key points can be used to estimate where the selected location on the physical object appears in the pixel coordinates of the remaining frames including whether the location appears at all. Then, the selectable tag can be rendered at the estimated location determined for each frame.

As an example, screen shots 900*e*, 900*f*, 900*g*, 900*h*, 900*i* and 900*j*, can be used as frames in an MVIDMR. In a first frame associated with screen shot 900*e*, a location 905*a* in the center of the wheel can be selected. Then, one or more key points near location 905*a* can be tracked to frames 900*f*, 900*g*, 900*h*, 900*i* and 900*j*. The locations of the one or more tracked key points can be used to estimate where location 905*b* occurs in 900*f*, where location 905*c* occurs in 900*g*, where location 905*d* occurs in 900*h* and where location 905*e* occurs in 900*i*. Then, the selectable tag can be rendered at the estimated locations in each of the frames. In 900*j*, the key point tracking can indicate the feature, i.e., the center of the wheel no longer appears. Hence, a selectable tag may not be rendered in this frame.

The use of key point tracking is one example of determining where a location on an object in one frame of an MVIDMR appears in other frames. Hence, the methods and apparatus are not limited to key point tracking. For example, key points can be matched between frames, which can be referred to as key point matching. Thus, a key point appearing in one frame, such as a selected location on an object, can be matched to the key point appearing in another frame. In another example, in skeleton detection on an object, such as a person or car, a group of locations on the object can be identified and then linked together in some manner via pre-defined relationships to provide a 3-D representation of the object.

For example, on a car, components, such as the centers of the wheels, tail lights, headlights, side mirrors can be identified and then linked together to provide a 3-D structure for the car. The linkages can define geometric relationships. For example, the front wheels of a car can be joined by a line that is perpendicular to a line drawn between the front and back wheels of a car on the same side of the car. Similarly, a line can be drawn between the front headlights that is approximately parallel to the lines drawn between the wheels. In another example, a line can be drawn between the front wheel and the front headlight on the same side. This line can be approximately perpendicular to the line drawn between the two front wheels.

If depth data is available, such as from a stereoscopic camera, this information can also be used to construct a 3-D structure of an object. The depth data can be used to position various locations on an object in a 3-D coordinate system relative to one another. In one embodiment, when a 3-D structure of an object is determined, it can be projected onto a 2-D plane to create a plan view of the object.

After a 3-D structure is determined for an object, other locations on the car can be referenced relative to this determined 3-D structure when a location selected in one frame is propagated to other frames. As another example, on a person, joints can be identified. Then, a skeleton and a pose of the person can be determined in various frames. The pose detection can be used to provide relative 3-D positioning of locations on the skeleton. Then, the skeleton and the pose data associated with the person can be used to help propagate locations from frame to frame.

In yet another example, the interface can be configured to allow a user to select the same location on the object in two or more different frames. Then, the location on the object can be approximated in 3-D, such as via triangulation. Then, in the remaining frames, the 3-D tag location can be projected into the frame to determine the location on the object in each frame.

Next, methods and apparatus for placing selectable tags in an MVIDMR are illustrated with respect to FIGS. 9E, 9F, 9G, 9H and 9I, which include screen shots, 900*m*, 900*n*, 900*o*, 900*p*, 900*q*, 900*r*, 900*s*, 900*t*, 900*u*, 900*v*, 900*w*, 900*x*, 900*y*, 900*z* and 900*aa* of one embodiment of interface implemented on a mobile device. In screen shot 900*m* of FIG. 9E, image frame capture for an MVIDMR of the car 932*a* is complete. This completion of the image capture is indicated by the prompt 924 which says "Capture complete."

From the captured images from the live video stream, an MVIDMR of the object, which is the car, can be generated. In particular embodiments, a first plurality of the frames captured from the live video stream can be processed, such as smoothed and stabilized to generate an MVIDMR of the object, which is a car in this example. Via the interface, the user may be able to navigate through the second plurality of frames of the MVIDMR. The navigation capability is indicated by the arrows 926. For instance, a user can use input devices associated with a mobile device to cause different views of the car to be output to the display.

In 900*m*, the interface can provide a capability to add a selectable tag to the MVIDMR. Alternatively, via the "publish" prompt 930, the MVIDMR can be saved for later viewing. For example, the MVIDMR can be published to a website for subsequent viewing.

In response to the "Add Tag" prompt 928 being selected in 900*m*, an interface state is generated that allows a selectable tag to be placed at a location on the object in the MVIDMR, which is the car in this example. A selector 936 which includes a circle with a cross 934 is provided which allows the location on the object in the image frame to be selected. The pixel coordinates beneath the center of the cross can be the location on the object which is selected when the "place tag" prompt 938 is selected. A selectable tag can then be rendered at the location or at a position relative to the location selected on the object, such as adjacent to the location.

Using an input device, such as a touch screen on the mobile device, the selector 936 can be positioned within the current frame of the MVIDMR of the object output to the display. For the example, using the touch screen sensor, the selector 936 can be moved from its current position over the front grill of the car to a new position over the hood. As another example, using the touch screen sensor, the selector can be moved from its current position over the front grill of the car to a new position over the seat.

In particular embodiments, the object can be differentiated from the background. Thus, if the selector 936 is placed over the background and attempt is made to place a selectable tag on the background. The interface can be configured to indicate that placing a selectable tag on the background is not allowed or the selected location is not on the object.

In other embodiments, the interface can be configured to allow navigation through the MVIDMR of the object. Thus, prior to selecting a location on the object, the current view 932*b* of the object in a first frame can be changed to a different view of the object in a second frame. Then, a location on the object can be selected using the image data from the second frame and the selector 936.

In 900*n*, the place tag prompt 938 is selected. The selection of prompt 938 causes a selectable tag to be rendered at the location of the cross 934. In 900*o*, a selectable tag 946 is shown. The selectable tag 946 is a circle with a number one inside of it.

The current view of the car 940*a* includes the selectable tag 946. As described above, the MVIDMR can include a plurality of different views of the object, which, in this example, is the car. In each frame with a different view, the location on the object can appear in different locations in the frame because the view has changed. Thus, the system can be configured to determine where the location on the object appears in the remaining frames of the MVIDMR including whether the location object appears in the frame at all.

The selectable tag, such as 946, can be rendered in the frames where the location on the object appears in each frame. Thus, first plurality of frames for the MVIDMR of the object can be modified to form a second plurality of frames including the selectable tag rendered into all or a portion of the frames. An MVIDMR modified in this manner can be referred to as a tagged MVIDMR.

In screen shot 900*o*, the interface can be configured to allow the tagged MVIDMR to be previewed. In the preview, the locations where the selectable tag appears in each frame can be viewed. In some instances, as the location on the object comes into view and goes out of view, the selectable tag may appear and disappear on the selectable MVIDMR.

As examples, screen shot 900*p* shows a second view 940*b* of the car. The selectable tag 946 appears at a different location in the frame as compared to the frame in screen shot 900*o*. In screen shot 900*q*, the location where the selectable tag is placed on the object can be determined to no longer appear in the current view of the car 940*c*. Thus, the selectable tag is not rendered in this frame of the tagged MVIDMR.

In addition in screen shot 900*p*, the selectable tag appears at a slightly different location on the car as compared to screen shot 900*o*. In particular, the location on the object where the selectable tag is rendered in screen shot 900*p* is shifted to the left as compared to the location on the object where the selectable tag is rendered in screen shot in 900*o*. The key point tracking of the location on the object from frame to frame may not be exact. As described above, key points can be tracked from frame to frame using techniques such as optical flow calculations to match a key point appearing in a first frame to a second frame. Factors, such as lighting conditions, can affect the tracking. Hence, key points may not be tracked exactly from frame to frame and the placement location on the object can vary from frame to frame.

In one embodiment, the interface can allow the placement of a selectable tag within a frame to be manually adjusted. For example, the location of selectable tag 946 can be manually shifted to the right to more closely match the location on the object of the selectable tag 946 in 900*o*. In one embodiment, the newly selected location for the selectable tag can be limited to the current frame on which the adjustment was made, i.e., only the current frame is modified with the newly selected location of the selectable tag 946. In another embodiment, the newly selected location can be used with the originally selected location, as an additional data point, to determine the locations of the selectable tag in the remaining frames.

From screen shots 900*o*, 900*p* or 900*q*, using prompt 942, the tagged MVIDMR can be saved and as described as follows, additional selectable tags can be added. Alternatively, using prompt 944, the tag placement can be changed. For example, the selector 936 with cross 934 can be rendered again on the screen as shown in 900*n* and then, a new location on the object can be selected for placing the selectable tag. Then, the system can determine where the new location appears in each of the remaining frames of the MVIDMR and can render a selectable tag at the determined locations. Then, screen 900*o* with the selectable tag at the new location can be regenerated and the tagged MVIDMR with the selectable tag at the new location can be previewed.

In the example of 900*o*, the selectable tag 946*a* is rendered as a 2-D flat circle with a number on it. As described below, the selectable tag can be labeled in some manner, such as with a textual description. In addition, the size and shape of the selectable tag can be varied. For example, a square or rectangular tag can be used and the size can be larger or smaller than the size shown in 900o.

In a particular embodiment, the selectable tag can be rendered from a 3-D object which is projected into the 2-D frames of the MVIDMR. Thus, the selectable tag can appear to extend from the object. For example, a selectable tag can be rendered from a hemisphere or a 3-D model of a pushpin. The 3-D model can include a texture, such as a label painted onto the 3-D surface. In one embodiment, the view of the 3-D model can change as the view of the object changes in the tagged MVIDMR. For example, the 3-D model of the pushpin used as a selectable tag can be rendered so it appears from different angles as the current view of the car changes.

As described above and with more detail below, the selectable tag, such as 946, can be selected to cause media content associated with the selectable tag to be output to the display. Thus, the size and shape of the selectable tag can be associated with a pixel area for each frame. The pixel area's location can vary from frame to frame because the determined location on the object can vary from frame to frame.

A determination that a selection has occurred within the pixel area associated the selectable tag can cause an action, such as but not limited to an output of media output. The selection can occur via various input methods, such as detecting a touch from a touch screen sensor or via cursor and a mouse. Thus, one aspect of generating the tagged MVIDMR can be determining, for each frame in which a selectable tag appears, a pixel area in the frame that is to be associated with a selection of the selectable tag.

In 900r, after the "save tag placement" prompt 942 has been selected, the interface can enter into a state where media content associated with selectable tag, such as 946. In one embodiment, the interface can be configured to offer the user to select from different types of media content to associate with the selectable tag, such as taking a photo, generating a new MVIDMR, uploading an existing MVIDMR, uploading a media file (e.g., audio, video, text or combinations thereof), entering text, etc. In 900r, a selection of "photo," as indicated by the label 948. Using a camera coupled to the interface, the capture photo 950 prompt can be selected to capture a photo that is to be associated with the selectable tag, such as a close up view of the location where the selectable tag was placed.

The close up view can be used to reveal detail of a feature of interest on the object. For example, in 900r, the detail can be of the front grill design on the car. In another, the front grill can be damaged in some manner. Thus, the close up view linked to the selectable tag can allow the damage to be more closely inspected when the selectable tag is selected.

Screen shots 900s and 900t illustrate interface states where information about a selectable tag can be modified. For example, the label 952 for selectable tag 946 is called "detail tag." After selecting the prompt change label 958 in 900s, using the keyboard interface 962, in 900t, the label 952 can be renamed as "front." In addition, in 900s, the prompts 954, 956 and 960 can be used to delete, move or save the selectable tag including modifications to its label.

In 900u, the interface is shown in a state that enables a second selectable tag to be added to the tagged MVIDMR including the first selectable tag. In 900u, the car is shown in a view 940d from the side. The selector 936 is positioned with the cross over the center of the wheel of the car. Then, the place tag prompt 938 can be selected to add the second selectable tag.

In 900v, the second selectable tag 966 has been rendered into the current frame. Thus, a view of the car 964a including the second selectable tag 966 is shown. In this view, the first selectable tag, described above, is not visible. After placing the second selectable tag, a newly tagged MVIDMR with the first selectable tag and the second selectable tag can be viewed. In 900w, a second view 964b of the car is shown. In this view, the first selectable tag 946 is visible and the second selectable tag is not visible.

In general, a tagged MVIDMR of an object can include a plurality of selectable tags. In some instances, on some frames, none of the plurality of selectable tags can be visible. In other instances, all of the plurality selectable tags can be visible on some frames. In yet other instances, different combinations of the plurality of selectable tags can be visible depending on the frame. For example, for a tagged MVIDMR with two selectable tags, some frames can show both selectable tags, some frames can show only the first selectable tag, some frames can show only the second selectable tag and some frames may not show either the first selectable tag or the second selectable tag. These combinations can vary from MVIDMR to MVIDMR depending on the angular view captured of the object and the selected locations on the object where the tags are placed.

In 900x, an interface state is described where the second selectable tag can be modified. In 900x, the second selectable tag is referred to as a detail tag 968. As described above, via the change label prompt, the label of the second selectable tag can be changed, such as from "detail tag" to "back wheel." In addition, the second selectable tag can be moved, deleted or saved from this interface state.

Next, the second selectable tag can be saved which causes interface state 900y to be generated. In 900y, a selection between an MVIDMR 970 or a photo 972 can be made as media content to associate with the second selectable tag. In this example, the MVIDMR 970 is selected. The capture MVIDMR prompt 974 can be selected to begin recording of video data for the MVIDMR, such as a detail of the wheel.

In 900z, live video recording for the MVIDMR is initiated. The record and stop prompt 974 can be used to begin or stop the recording of video data for the MVIDMR. In 900aa, the message "capture complete" 978 is output to indicate the MVIDMR associated with the second selectable tag has been captured. From this interface state, the second selectable tag 966 can be selected and the media content associated with the second selectable tag, which is an MVIDMR with close-up views of the wheel, can be output.

Further, the interface state allows the current tagged MVIDMR having the first selectable tag and the second selectable tag to be viewed. In 900aa, the view 946c of the car in the MVIDMR is shown. Input can be provided which causes the MVIDMR of the car to rotate, as indicated by the arrows. When the first selectable tag comes into view, the first selectable tag can be selected and the media content associated with the first selectable tag, which is a photo of the front of the vehicle, can be output. The first selectable tag can appear in a portion of the frames of the MVIDMR and a selection can be made from any one of these frames. Finally, the interface allows an additional tag to be added to the current tagged MVIDMR or the current tagged MVIDMR with two selectable tags to be saved and published, such as uploaded to web-site.

In particular embodiments, details of a tagging session can be saved used as a starting point for a subsequent tagging session. As described above, a first tagging session involving the placement of two tags was described. Later, a second tagging session can be invoked which starts from the first tagging session where additional selectable tags can be added.

For example, a first tagging session can involve a rental car. In the first tagging session, an MVIDMR of the rental car can be generated and a damage location on the rental car can be tagged. Later, in a subsequent tagging session after a second damage location has occurred, the first tagging session can be invoked as a starting point to add a second selectable tag at the new damage location using the original MVIDMR of the object from the first tagging session.

In another example, a first MVIDMR (or photo or video stream) of an object can be tagged in a session with one or more selectable tags. Then, a new tagging session involving the object can be instantiated. In the new tagging session, a second photo, video stream or MVIDMR of the object can be generated. The second MVIDMR (or photo or video stream) of the object may be generated to reflect a new state of the object which may have changed over time.

In one embodiment, the system can be configured to map locations on the object with tags in the first MVIDMR to locations on the object in the second MVIDMR. For example, when the object is a car and a location on the wheel of the car is tagged in the first MVIDMR, the system can be configured to determine where the location on the wheel of the car occurs in second MVIDMR and propagate the tag to the second MVIDMR. Then, additional tags can be added to the second MVIDMR. Thus, the user doesn't have to start the tagging process from scratch if the user decides to replace the first MVIDMR with a second MVIDMR of the object.

In another embodiment, the system can be configured to provide an interface where two or more tagged MVIDMRs can be compared with one another. For example, two tagged MVIDMRs of the two different objects, such as two cars can be compared with one another. In another example, two tagged MVIDMR of the same object, such as from different tagging sessions, can be compared to one another.

In one embodiment, the two tagged MVIDMRs can be overlaid on top of one another. For example, one of the objects can be made transparent so they are both visible. In another embodiment, the two tagged MVIDMRs can be displayed in a side by side manner.

In one embodiment, the system can be configured to align the views of the objects in the two tagged MVIDMRs. For example, when the objects are two cars, the system can be configured to detect and align the side views of a first car and a side view of the second car (whether overlaid with one another or side by side). In some instances, the system can be configured to rotate both the objects in unison based upon a single input. For example, the system can receive a navigational input for a first tagged MVIDMR and then rotate both the first tagged MVIDMR and a second tagged MVIDMR such that both the same view of each object are approximately displayed.

In another embodiment, the system can be configured to allow the two or more tagged MVIDMRs to be independently rotated. However, the system can include a button which returns to the two or more tagged MVIDMRs to a common view. In one instance, the system can be configured to receive a viewing angle, such as a number, or a descriptor, such as "front," "side" or "rear" and then set two or more tagged MVIDMRs to the view associated with the viewing angle or the descriptor.

In a particular embodiment, two similar objects, such as two cars, can be tagged in a similar way or have a number of selectable tags in common. In this instance, when the two objects are compared and a first selectable tag on the first tagged MVIDMR is selected, the system can be configured to determine whether the second tagged MVIDMR includes a similar selectable tag, such as in a common location. Then, the system can output the media content associated with the selectable tags in the common locations in a side by side or overlaid manner for comparison purposes. This approach can be repeated when more than two tagged MVIDMRs are compared.

For example, two tagged MVIDMRs of cars can each include a selectable tag showing details of the dashboard. When a first selectable tag on a first MVIDMR of the car is selected via an input, the system can locate first media content associated with the first selectable tag on the first car and second media content associated with a second selectable tag on a second car. Then, the first media content and the second media content can be shown together for comparison purposes.

When a photo, a stream of video images or an MVIDMR of an object is tagged over time, the system can be configured to store time data associated with each selectable tag added to the object. For example, image data including a rental car is tagged over time, and then time data can be stored for each selectable tag to indicate when the selectable tag was added, such as date and time. Additional descriptive information can also be associated with the selectable tag, such as a mileage on the car when the selectable tag was added. Also, if the car were involved in an incident where damage occurred, additional descriptive detail about the incident can be associated with the selectable tag.

In some instances, a location on an object can be tagged and then the details of the location can be updated over time. Then, the multiple details of the location can be accessed via the selectable tag. For example, on a car, a first selectable tag can be placed on a mirror and additional media content showing details of the mirror can be captured when the car is new. Subsequently, the car mirror can be damaged and new media content can be captured showing the damage to the mirror to associate with the selectable tag at the mirror location. Then, when the selectable tag is selected, the system can show one of the media content in the original state (prior to the damage), the media content in the damaged state or both the media content from both states, side by side. In general, media content associated with a plurality of states in time can be associated with a selectable tag.

As another example, a plan view of a person or an MVIDMR of a person can have a selectable tag associated with a wound, such as a burn or stitches. Media content associated with a detail of the wound such as a close up view of the wound can be recorded at different moments in time. Then, when the selectable tag is selected, the close up views from different times can be output. Thus, a doctor can view the progress of the healing at the wound site over time.

In one embodiment, when multiple instances of media content are associated with a location, multiple selectable tags can be placed at the location. For instance, a first selectable tag can be placed at the location associated with a first time and a second selectable tag can be placed at the location associated with a second time. The first selectable tag and the second selectable tag can be off-set so that both are visible. In another embodiment, a single selectable tag can be provided that indicates multiple instances of media content are available at the location. For instance, the single selectable tag associated with multiple instances of media content can be colored or shaped differently than a selectable tag associated with only a single instance of media content.

In a particular embodiment, the system can include filters which allow selectable tags which have been added as a function of time to be selected. For example, a first filter can include all selectable tags. A second filter can allow a user to select selectable tags added within a specific time period. Then, the system can output to the display a tagged photo, video stream or an MVIDMR with the selectable tags added within the selected time period.

Next, session tagging is described where a selectable tag can lead to a different portion of an object, such as an interior of an object. In 900bb, an option is provided to add a selectable tag associated with the interior of the object. In one embodiment, the selectable tag associated with the interior of the object can appear in all of the plurality of frames associated with the current tagged MVIDMR. In this example, the current tagged MVIDMR includes two selectable tags. Thus, when the interior selectable tag is added, the total number of selectable tags associated with the current tagged MVIDMR can be increased to three selectable tags.

After it is added, a selection of the interior selectable tag can cause media content associated with the interior to be output. In one embodiment, the media content can be an MVIDMR showing an interior of the object, which is the car. In a particular embodiment, the media content can be a tagged MVIDMR of the interior of the object including one or more additional selectable tags. The additional selectable tags can be separate from the selectable tags associated with the exterior of the object.

For example, the tagged MVIDMR of the interior of the car can include one or more selectable tags which cause media content associated with details of the interior to be output. Further, the tagged MVIDMR of the interior can include an exterior selectable tag which, when selected, causes the tagged MVIDMR of the exterior of the object to be output, i.e., to switch between the interior and the exterior. In another embodiment, a prompt can be provided on the interface, which causes the interface to switch between the tagged MVIDMR (or non-tagged) of the interior of the object and the tagged (or non-tagged) MVIDMR of the exterior of the object.

In general, a tagged MVIDMR of an object can be nested with one or more tagged MVIDMRs. For example, a first tagged MVIDMR can include a first selectable tag that when selected causes a second tagged MVIDMR to be output. The second tagged MVIDMR can include a first selectable tag that when output causes a third tagged MVIDMR to be output. Further, the second tagged MVIDMR can have a second selectable tag which causes the first tagged MVIDMR to be output, i.e., to switch between the first tagged MVIDMR and the second tagged MVIDMR.

As an example, a first tagged MVIDMR of the exterior of the car can have a first selectable tag, which causes a second tagged MVIDMR of the interior of the car to be output. The second tagged MVIDMR can have a first selectable tag which causes third tagged MVIDMR of the dashboard of the car to be output. The third tagged MVIDMR of the dashboard can have a plurality of tags that when selected causes media content associated with different features of the dashboard to be output.

Returning to FIG. 9J, after the "add interior" prompt 980 is selected, in 900cc, the interface enters into a state where a plurality of frames used to generate an MVIDMR of the interior of the car can be captured. In 900cc, the prompt "capture interior MVIDMR" 982 and a frame 984 are rendered into the images being received from the camera.

The frame 984 can help the user keep the content centered in the images captured for the MVIDMR of the interior of the object.

In 900cc, the record/stop prompt 988 can start and stop the capture of images used to generate the MVIDMR of the interior of the car. The indicator 986 can indicate what angular view of the interior has been captured so far. Initially, the indicator starts at a count of zero degrees.

In one embodiment, the interface can be configured to output prompts to capture media content for certain features associated with the MVIDMR and add a selectable tag at a location associated with the feature. In 900dd, the prompt 990 "capture front seat" and instruction 992 to capture a photo of the front seat is displayed. In response, a photo can be recorded. The photo can be associated with a selectable tag.

In 900ee, a prompt 994 "place front seat tag" is output. The selector 936 can be used to position a selectable tag associated with the front seat. The interface can be configured to receive input, such as touch screen or cursor input, which allows a position of the selector to be adjusted relative to the underlying image. In 996, the "add tag" prompt 996 can be selected to place a selectable tag at the current location of the selector 936.

In general, the interface can be configured to output one or more locations where a user is to place a selectable tag and then associated additional media content with the selectable tag. In one embodiment, the interface and system can be configured to identify a location on an object and then provide indicators, such as arrows or a path to the location rendered into the live video stream so that the user can guided to a location where to place a selectable tag (or the system can perform this task automatically) and/or capture additional media content associated with the location.

For example, on a car, the system can be configured to prompt the user to place a tag on one of the wheels. The system can identify a location on the wheel, such as the center of the wheel. Then, the system can render over the live video stream a guide, which can be a curve of some type, for the camera to follow to reach the location or an indicator where the location on the wheel is to be tagged, such as an arrow rendered into the image.

This process can be repeated for a number of locations on an object. For example, from the wheel on the car, the system can prompt the user to tag and capture media content on a side view mirror. If the system can identify the side view mirror in the image, then a guide from the wheel to the side view mirror can be rendered into the image or indicators can be rendered into the image showing the location of the side view mirror. When the system determines a 2-D or a 3-D structure for an object, then the guide can indicate a location which may be occluded in the image. For example, the guide can curve around the car to direct the user to a location on an opposite side of the car that is occluded in a current view of the car.

In other embodiments, after the system has prompted a user to place selectable tags and/or capture media content at specific locations on an object and has received media content for each selectable tag, the system can implement a review process in the interface. In the review process, the system can output locations that were requested to place a tag, the location where the selectable tag was actually placed for the requested location and the media content associated with the requested location. Then, the system can ask for the user to confirm that the selectable tag is in the correct requested location and the media content that has been associated with the requested location is correct. If either is not correct, then the system can allow the user to reposition the tag and/or record new media content.

In one embodiment, when system has identified a location on an object and placed a selectable tag at a location, the system can be configured to allow a user to manually determine if the location has been correctly identified. When the user determines the system has not correctly identified the location, the system can allow the user to manually adjust the location of selectable tag determined by the system. Then, the new position of the selectable tag, manually adjusted by the user, can be propagated into the remaining frames.

In one embodiment, the system can provide guides and/or indicators as to locations where tags have been placed on an object. For example, the guides can be used in the review process described above to guide a user to the locations where selectable tags have been placed. In some embodiments, the guides can be based upon one or more filters input into the system. For example, an object can be tagged at a plurality of locations to indicate damage as well as other features. A filter can be provided that allows a user to view only tag locations associated with damage. Then, the system can locate one or more images where the selectable tags appear and then one or more guides or indicators can be provided which direct the user to selectable tags associated with damage locations. Again, the guides can be curves and/or indicators, such as arrows.

Returning to FIG. 9K, in 900*ff*, a selectable tag 1002 is placed within the MVIDMR of the interior of the object. The MVIDMR of the interior object can be viewed to see which locations the selectable tag 1002 appears in each of the plurality of frames of the interior of the MVIDMR. As described above, the selectable tag 1002 may only appear in a portion of the frames depending on whether the location associated with the selectable tag on the object is in view or not in view.

In various embodiments, an object can include multiple interior locations. For example, the car can include the passenger compartment, trunk compartment and engine compartment. A tagged MVIDMR can be generated for each interior compartment. A different selectable tag can be placed on the tagged MVIDMR of the exterior of the object that when selected causes the tagged MVIDMR (or non-tagged) associated with each interior compartment to be output to the display.

For example, a first selectable tag can be placed above the trunk which causes an MVIDMR of the trunk to be output. A second selectable tag can be placed above the passenger compartment which causes an MVIDMR of the passenger compartment to be output. Finally, a third selectable tag can be placed above the hood, which causes an MVIDMR of the engine compartment to be output.

The "change tag placement" prompt 998 can cause the interface to enter a state where the location of the selectable tag 1002 can be changed. As described above, each time the location where a selectable tag is changed, the locations where the selectable tag appears in the remaining frames can be changed. When the "save tag placement" prompt 1000 is selected, the location of the selectable tag 1002 can be saved in the current frame and at the determined locations in the remaining frames of the MVIDMR.

As described above in screen shot 900*s*, the interface can be configured to allow the user to change details of the selectable tag, such as a label. In addition, the interface can be configured to allow a user to place additional selectable tags at different interior locations. Also, the interface can allow a user to capture and/or associate media content with each selectable tag.

In 900*gg*, the capture of the tagged MVIDMR of the interior of the car is complete and the interface is in a state where the tagged MVIDMR of the exterior of the car is shown. A first view 1004 of the car in the current tagged MVIDMR is shown. The first view 1004 includes the second electable tag 966 associated with the wheel and the selectable tag 1008 associated with the interior of the car. In 900*gg*, the interface can allow the plurality of frames associated with the current tagged MVIDMR of the exterior of the MVIDMR to be viewed.

When the selectable tag 1008 associated with the interior is selected, the interface can output the current tagged MVIDMR associated with the interior of the car. Then, the interface can allow the plurality of frames with the current tagged MVIDMR of the interior of the MVIDMR to be viewed. In 900*gg*, when either the current tagged MVIDMR associated with the exterior or the interior is shown, the interface can be configured to allow additional selectable tags to be added. Alternatively, the interface can be configured to allow the current MVIDMR of the interior and the exterior to be published.

In one embodiment, the system can be configured to receive media content associated with a detail of an object, such as a photo, video stream or MVIDMR, showing details of a location on the object and then determine where the location appears in one or more images showing a less detailed view of the object. For example, the system can receive media content, such as a photo, a video recording or an MVIDMR, showing detail of a location on a car, such as a wheel. Then, the system can determine where the location appears on a photo, video recording (series of images) or an MVIDMR which includes a less detailed and larger view of the object including the location with the detail, place a selectable tag at the location and then associate media content with the selectable tag. Thus, in this example, rather than starting with a large view of the object, selecting tag locations and then associating media contents with the tag locations that provides more detail, the associated media content associated with details of a location on an object can be used to determine where to place a selectable tag on a larger view of the object.

This process can involve matching a detail of an object on a first image to a larger view of the object in a second image. For example, if a first image of an eye and surrounding detail of the eye on the face and a second image showing the whole face were provided. The system can be configured to determine how the first and second images overlap, i.e., the mapping of the eye in the first image to the eye region in the second image of the face. Then, a selectable tag can be placed near the eye region in the second image of the faces. If a series of images of the face are provided, such as in an MVIDMR, then the system can propagate the selectable tag locations to the remaining frames in manners described above.

In one embodiment, to tag an object, a photo can be taken of an object, such as a detail of an object. The detail can be used as media content for a selectable tag. The center of the photo can be used as the selectable tag location. Then, the location associated with the center of the photo can be matched to a location on an image showing a larger view of the object, such as in an image from an MVIDMR of the object. A selectable tag can then be placed at this location in the image from the MVIDMR and propagated to the remaining images in the MVIDMR.

The approach in the previous paragraph can be used to only tag the MVIDMR without using the photo as the media content for the selectable tag. For example, after a photo is taken of the detail and then the center of the photo is used as determine a tag location on an MVIDMR, media content for the selectable tag can be recorded. For example, a video recording can be captured of the detail or an MVIDMR can be generated of the detail. Then, the video recording or the MVIDMR can be associated with the selectable tag.

Figure 10A:
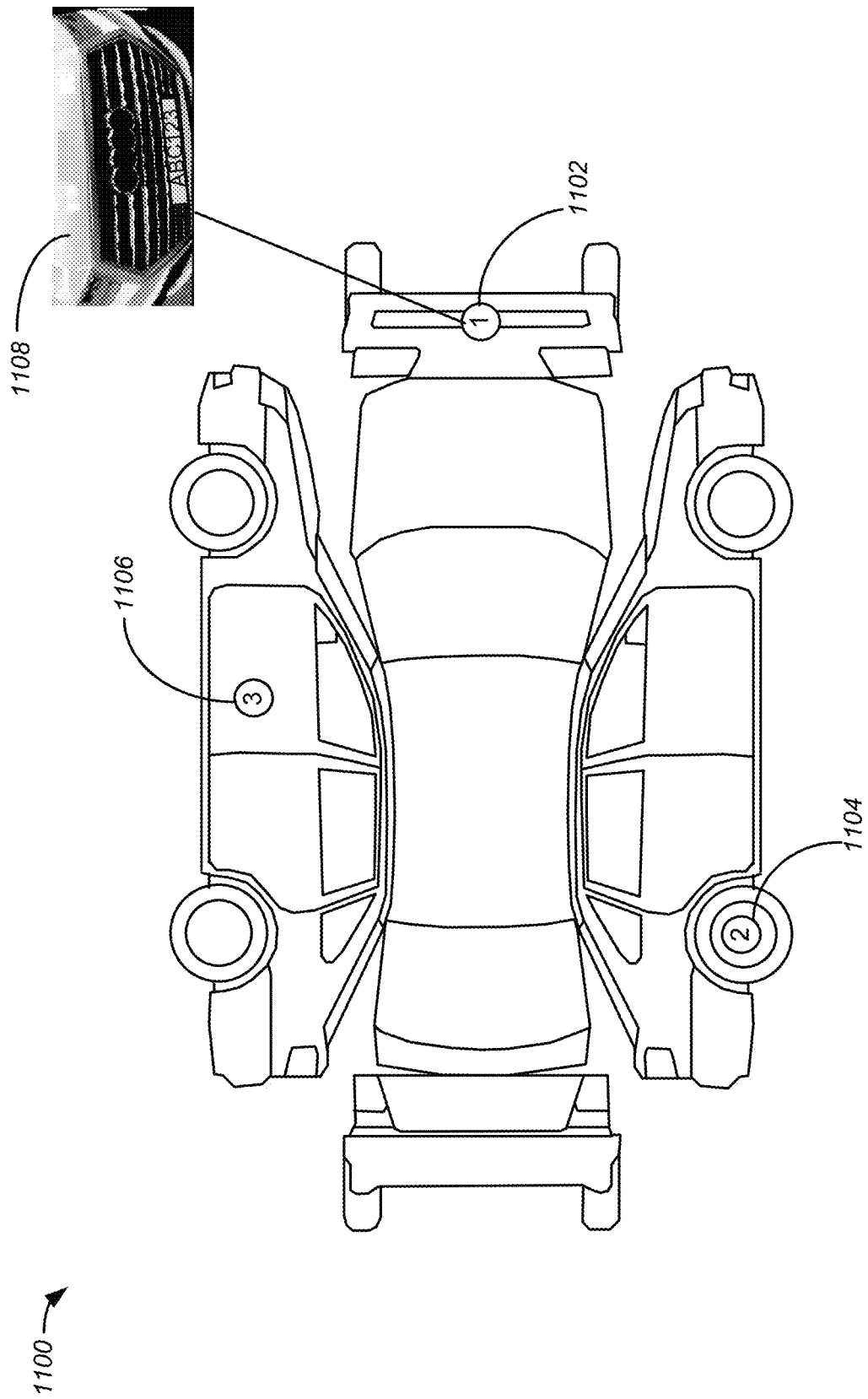
FIG. 10A illustrates an example of projecting tags placed in an MVIDMR of an object into a plan view of an object in accordance with embodiments of the present invention.
Figure 10B:
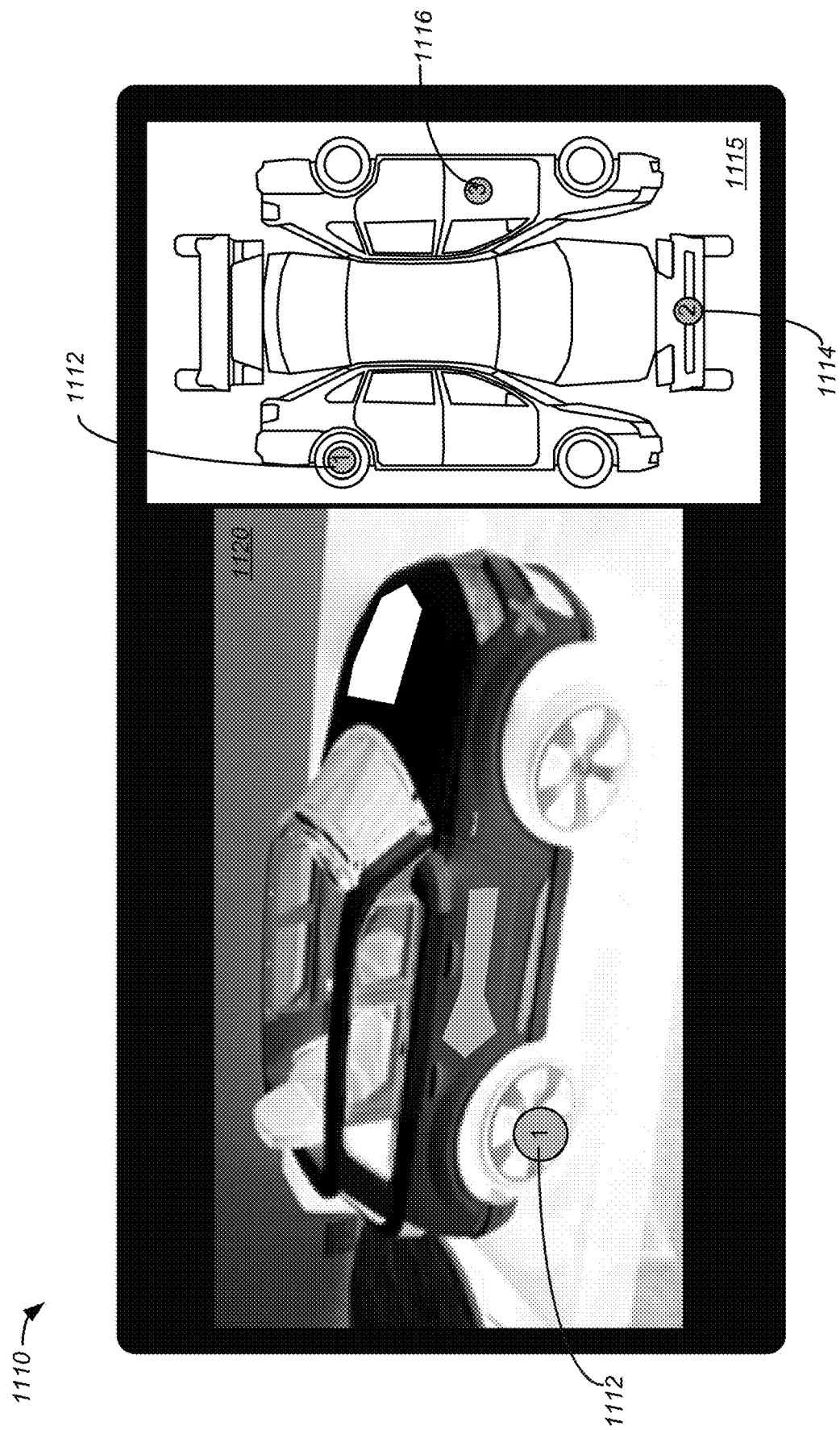
FIG. 10B illustrates an example of navigating through an MVIDMR of an object using a plan view of the object in accordance with embodiments of the present invention.

Next, alternate configurations for presenting selectable tags are discussed with respect to FIGS. 10A and 10B. In one embodiment, a 2-D plan view of a 3-D object can be generated and then the tag can be placed on the plan view of the object. The 2-D plan view can be associated with an MVIDMR of the object.

FIG. 10A illustrates an example of projecting tags placed in an MVIDMR of an object into a plan view of an object. In this example, a plan view of a car showing the top, back, front and sides, simultaneously, is shown. The bottom of the car can also be included.

Three tags, 1102, 1104 and 1106, are shown in the image. The first tag 1102 is associated with the front grill of the car. The second tag 1104 is associated with the wheel. The third tag 1106 is associated with a location on the door of the car.

In one embodiment, the tags, 1102, 1104 and 1106, can be selectable. Hence, when each tag is selected, media content associated with each tag can be output to the display. For example, when tag 1102 is selected, the media content, which is a front view of the car, can be output to the display. In another embodiment, the tags, 1102, 1104 and 1106, can be non-selectable. In this example, the plan view placement of the tags can provide a guide as to where the selectable tags are located on the MVIDMR of the car.

In yet other embodiments, the system can be configured to map between the plan view of the object and the MVIDMR of the object and vice versa. The map can be used to place selectable tags on the object in the MVIDMR or place tags (selectable or non-selectable) on the plan view. For example, when a selectable tag is placed on the MVIDMR of the object, the map can be used to determine a location on the plan view of the object to place the selectable tag. As another example, when a tag (selectable or non-selectable) is placed on the plan view of the object, the location on the plan view of the object and the map can be used to determine locations in each of the plurality of frames of the MVIDMR of the object to render the tag.

In another embodiment, the plan view can be used to indicate requested locations to place selectable tags on an MVIDMR of an object. All or a portion of the requested locations can be selected. In addition, custom selectable tags can be added to the plan view. Then, the system can manually prompt the user to place selectable tags at the selected requested locations including any custom selectable and record media content for the selected locations.

In particular embodiments, a plan view of an object can be provided, such as a plan view of the car. In other embodiments, the system can be configured to generate a plan view of an object, such as from an MVIDMR of the object. For example, based upon the image data in an MVIDMR of an object, the system can be configured to construct a 3-D structure for the object. The 3-D structure can involve identifying particular locations on the object which are connected in a known manner. For example, on a person, it is known that the elbow connects to the wrist and the shoulder. Then, the 3-D structure can be projected to a 2-D surface to provide a plan view of the object.

The plan view is one example something other than an MVIDMR can be tagged. In other examples, a single image of an object, such as a frame from a video stream can be tagged. In another example, a video stream, such as a live video stream recorded of an object, can be tagged. The video stream may not have been converted to an MVIDMR.

FIG. 10B illustrates an example of an interface state 1110 where a plan view 1115 of the object can be used to navigate through an MVIDMR of the object. In the plan view 1115, three selectable tags, 1112, 1114 and 1116 are shown. When one of the selectable tags is selected, one or more frames from the MVIDMR of the object which include the selectable can be output. For example, when selectable tag 1112 is selected in plan view 1115, a frame 1120 from the MVIDMR including the selectable tag 1112 can be output.

In one embodiment, when a selectable tag in the plan view of the object, such as 1115, is displayed, a single frame of the tagged MVIDMR including the selectable tag can be output. Then, the interface can be configured to allow a user to navigate through the MVIDMR from this location. In another embodiment, a plurality of frames including the selectable tag, including all the frames with the selectable tag, can be output.

In FIGS. 9A-10B, the system features are primarily described using a car as an example of object. The system is not limited to cars. In another example, a tagged object can be a piece of clothing. The selectable tags can be associated with details of the clothing, such as stitching, zippers, buttons, etc. For example, a photo, video stream of a wedding dress can be tagged. Then, the selectable tags can be associated with media content associated with detail of the wedding dress, such as bead work or lace work.

In another example, the object can be an appliance, such as a refrigerator, stove, a washer, a dryer or a microwave. When the object has an interior and exterior, MVIDMRs can be generated of the interior and exterior. Then, the interior and exterior MVIDMRs of the object can be tagged. Each tag can be associated with media content showing details of the object. For example, on a stove, the burners and the control nobs can be tagged. Then, media content showing close up views of the burners and control nobs can be associated with the selected tags.

In yet another example, the object can be a house or a building. In this example, the image data can be recorded using a camera on a drone (image data can also be recorded from a hand held device). The drone footage can be used to generate an MVIDMR of the exterior of the house which can be subsequently tagged. In one embodiment, a plan view of the house can be associated with the interior of the house. Further, a plan view can be used with an exterior of the house and the surrounding property. In particular embodiments, the system can be configured to construct plan views of the exterior and/or interior of an object, such as a house, based upon captured image data associated with the object.

In one embodiment, the system can be configured to allow a user to select tag locations on an exterior of the house and the surrounding property, such as within a plan view. Then, the system can be configured to guide a drone to automatically capture images associated with the selected tag locations. The images can be converted into an MVIDMR. The captured images can be used as media content which is associated with the selectable tag. For example, the drone can be used to capture images of a back patio on a house or a garden adjacent to the house. Further, a drone can be guided through the house to capture image data associated with the interior of the house.

Figure 11:
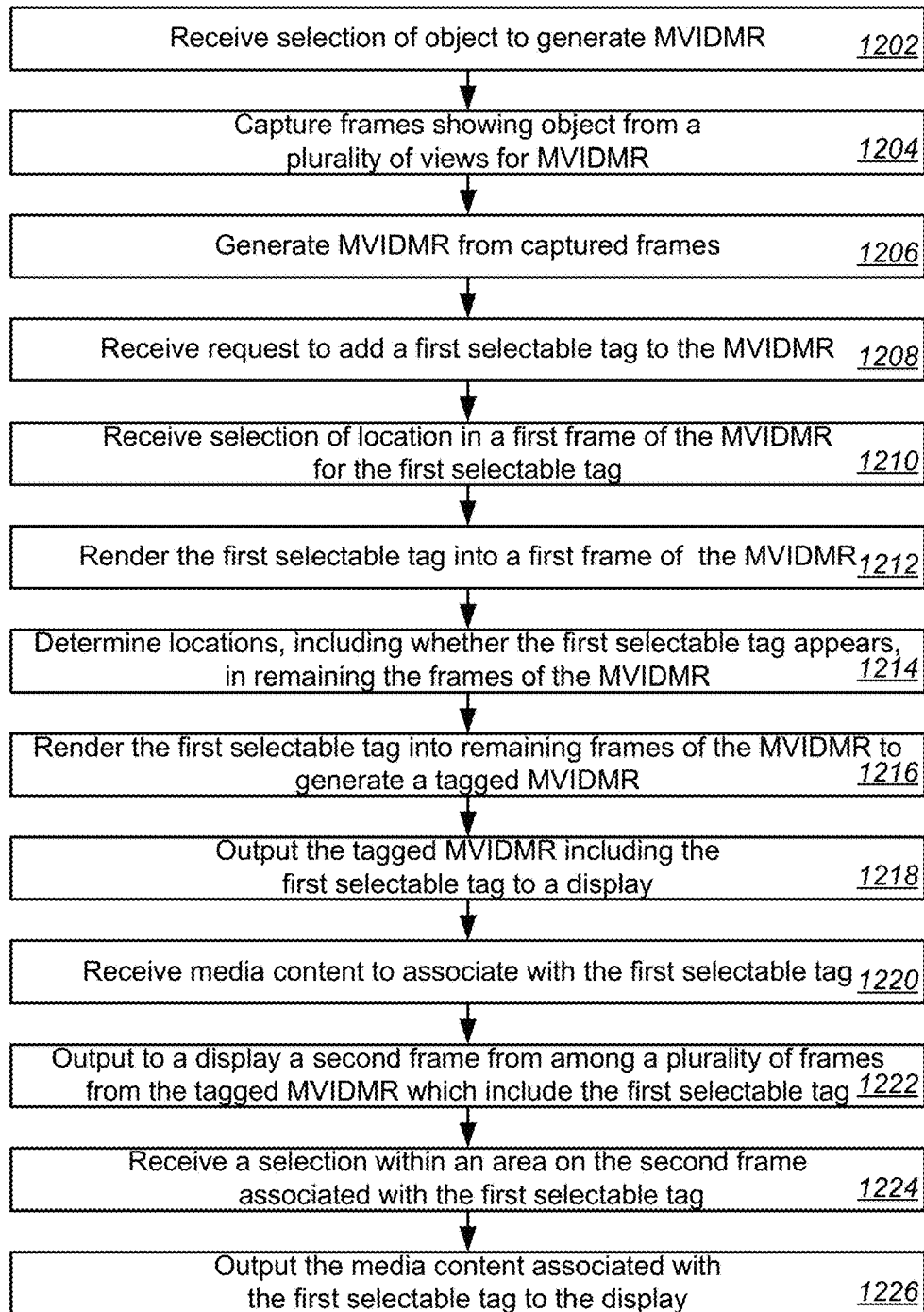
FIG. 11 illustrates a method of generating an MVIDMR of object with tagged locations in accordance with embodiments of the present invention.

FIG. 11 illustrates a method 1200 of generating an MVIDMR of object with tagged locations. In 1202, a selection of an object to generate MVIDMR can be received. Frames showing the object from a plurality of views can be captured from a live video stream. The object can be an exterior or an interior of the object. In 1206, an MVIDMR of the object can be generated from the captured frames. The MVIDMR of the object including a plurality of frames can be output to the display.

In 1208, a request can be received to add a first tag to the MVIDMR. In alternate embodiments, an image frame of an object or a series of images including an object, such as images from a video recording, can be tagged. Hence, the method is not limited to tagging an MVIDMR. In 1210, a selection of a location in a first frame of the MVIDMR can be received for a first selectable tag. In 1212, the first selectable tag can be rendered into the first frame of the MVIDMR at the selected location.

In 1214, the locations where the first selectable tag appears in the remaining frames of the MVIDMR can be determined. In some instances, the first selectable tag may not appear in a portion of the remaining frames. In 1216, the first selectable tag can be rendered into the remaining frames of the MVIDMR at the locations where it is determined to appear to generate a tagged MVIDMR. In 1218, the plurality of frames of the tagged MVIDMR of the object including the frames where the first selectable tag appears can be output.

In 1220, media content to associate with the first selectable tag can be received. The media content can be an MVIDMR without selectable tags, an MVIDMR with selectable tags, a photo, an audio clip, a movie clip, a text source, such as a brochure, or combinations thereof. In 1222, a second frame from among the plurality of frames from the tagged MVIDMR which includes the first selectable tag can be output to the display. In 1224, a selection within an area on the second frame associated with the first selectable tag can be received. In 1226, in response, the media content associated with the first selectable tag can be output to the display.

Auto Tagging

In this section, methods of automatically determining locations for selectable tags in the frames of an MVIDMR of an object are described with respect to FIGS. 12-17. Then, system components which can be used to implement the automatic tagging are described with respect to FIG. 18. One aspect of the methods can be associated with using a trained machine learning algorithm (TMLA) to recognize landmarks on an object, such as a car, in the image data, such as the frames associated with an MVIDMR or another sequence of frames including the object. In one embodiment, the landmarks can be used as joints where a 2-D skeleton is constructed from the joints. Structure from motion algorithms can be applied to frames of the MVIDMR to determine 3-D locations on an object captured in the frames. In particular, 3-D locations of the landmarks can be determined.

The 3-D locations of the landmarks can be used to construct a 3-D skeleton for the object. For example, the landmarks can be used as joints for the skeleton where the joints are connected to one another via segments. The 3-D skeleton position can be projected into the frames of the MVIDMR or other sequence of frames including the object where the orientation of the 3-D skeleton changes as the view of the object changes in the frames. The 3-D skeleton can include joints which are currently occluded in the frames and not directly visible. However, based upon the 3-D data, the positions of the occluded joints can still be estimated in the frames.

The positioning of a 2-D skeleton or a 3-D skeleton in the frames of the MVIDMR or other sequence of frames including the object can be used to determine the location of the selectable tags in each of the frames of the MVIDMR. For example, a location for a selectable tag in a frame of an MVIDMR can be determined based upon the position of a joint of the 2-D skeleton or a 3-D skeleton in an image or based upon a position of a segment which connects the joints, such as a mid-point of a segment. The 2-D skeleton or the 3-D skeleton approach for determining selectable tag locations can be used alone or in combination with key point tracking as described above in the previous section.

The methods described in this section can be combined with the methods described above, which are primarily associated with manually specifying selectable tag locations. For example, as described above, the system can prompt to place a selectable tag at a specific location on an object where the system receives the location in the frame of an MVIDMR to place the selectable tag. Then, the system can receive additional media content to associate with the selectable tag. Using auto tagging methods described in this section, the specific location for the selectable tag can be automatically identified in the frames of an MVIDMR. Rather than a selection of the location, a confirmation of the automatically determined location can be optionally received. Then, the additional media content associated with the selectable tag can be provided in the manner described in the previous section.

Next, FIGS. 12 to 17 are described. Prior to training a machine learning algorithm to recognize landmarks on a type of object, the landmarks can be selected. As follows, the type of object is a car. However, as described above, many different types of objects can be utilized in the methods described herein and the car is provided for the purposes of illustration only and is not meant to be limiting.

Figure 12:
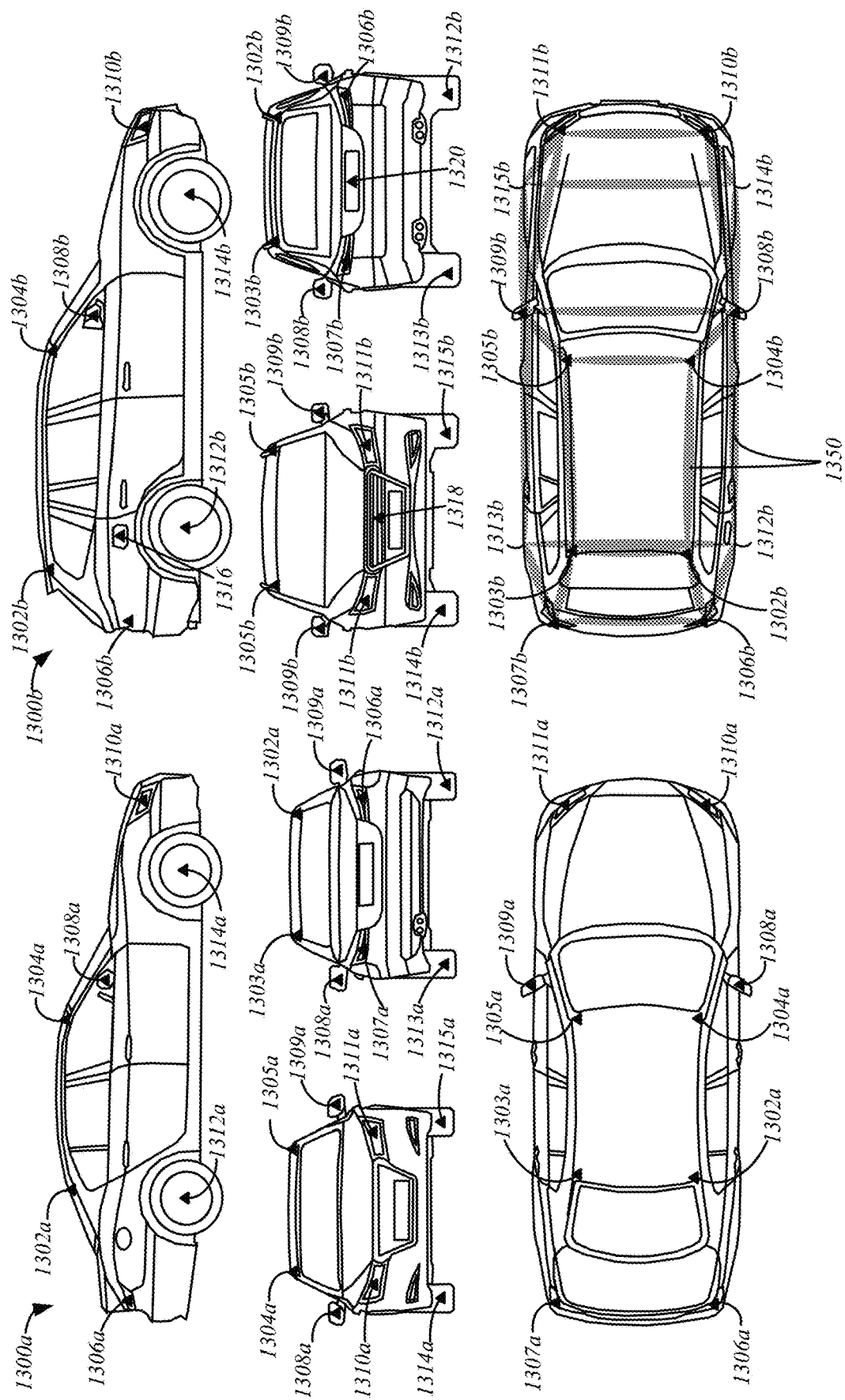
FIG. 12 illustrates landmarks selected for a car that can be recognized by a machine learning algorithm in accordance with embodiments of the present invention.

FIG. 12 illustrates landmarks selected for a car that can be recognized by a machine learning algorithm. Two examples of a car, first car 1300a and second car 1300b, are shown which include the marked locations of landmarks. A first car 1300a is a four door sedan. A second car 1300b is a four door hatchback.

For car 1300a, the landmarks can include four points on the roof of the car, 1302a, 1303a, 1304a and 1305a. Further, two points on the side mirrors of the car, 1308a and 1309a, can be specified. In addition, two points on the headlights of the car, 1310a and 1311a can be selected. Yet further, two points on the tail lights of the car 1306a and 1307a can be specified. Finally, four points on the tires of the car 1312a, 1313a, 1314a and 1315a can be designated. As will be described with respect to FIG. 13, a machine learning algorithm can be trained to recognize these landmarks in image data, such as in the frames of an MVIDMR associated with the car 1300a or another sequence of images including the car 1300a.

The set of landmarks which are selected for a type of object can vary and the example shown in FIG. 12 is provided for the purposes of illustration only and is not meant to be limiting. For example, for car 1300b, the landmarks for car 1300a can be repeated and additional landmarks can also be included. Thus, two landmarks on the side mirrors of the car, 1308b and 1309, can be specified. Two landmarks on the headlights of the car, 1310b and 1311b, can be utilized. Two landmarks on the tail lights of the car, 1306b and 1307b, can be specified. Finally, four landmarks on the tires of the car, 1312b, 1313b, 1314b and 1315b can be designated.

In addition, a first landmark 1316 can be specified on the gas cap of the car 1300b. A second landmark 1318 can be associated with a front grill of the car 1300b. Finally, a third landmark 1320 can be associated with a trunk of the car 1300b.

In various embodiments, the system can include different trained machine learning algorithms that are used to recognize different combinations of landmarks in the image data associated with the same type of object. For example, a first trained machine learning algorithm can be associated with identifying the landmarks specified for car 1300a and a second trained machine learning algorithm can be associated with identifying the landmarks specified for car 1300b. In one embodiment, the system can allow a user to select a group of landmarks that can be to be identified from among different groups of landmark combinations. Then, in response to the selection, a trained machine learning algorithm can be selected which is configured to identify the selected group of landmarks.

The examples in FIG. 12 are for an exterior of an object, which is a car. In other embodiment, landmarks can be specified for an interior of an object. For example, for an interior of a car, landmarks can be associated with the steering wheel, front seats, back seats, rear view mirror, etc. Thus, the example of the landmarks for an exterior of an object is provided for the purposes of illustration only and is not meant to be limiting.

As will be described in figures which follow, a skeleton can be constructed based upon the locations of landmarks determined via machine learning algorithm. First, landmarks and connections between landmarks can be determined in one or more frames of 2-D image data associated with an object, such as an MVIDMR of object or a sequence of frames including the objects, to construct a 2-D skeleton. Then, using a structure from motion (SFM) algorithm, positions of the landmarks in 3-D can be determined and used to construct a 3-D skeleton associated with the object.

To construct a skeleton, the connection relationships between landmarks can be specified. As an example, skeleton 1350 and its associated connections is shown rendered over the top view of car 1300b. The landmark 1314b on the right front tire is connected to the landmark 1310b on the right front headlight, is connected to the landmark 1312 on the right back tire, is connected to the landmark 1315b on the left front tire and is connected to the landmark 1308b on the right side mirror. The landmark 1310b on the right front headlight is connected to the landmark 1308b on the right side mirror and the landmark 1311b on the left front headlight.

The landmark 1311b on the left front headlight is connected to the landmark 1309b on the left side mirror and the landmark 1315b on the left front tire. The landmark 1315b on the left front tire is connected to the landmark 1309b on the left side mirror and the landmark 1313b on the left rear tire. The landmark 1309b on the left side mirror is connected to the landmark 1308b on the right side mirror and the landmark 1305b on the front left top of the roof. The landmark 1305b on the front left top of the roof is connected to the landmark 1304b on the front right top of the roof and the landmark 1303b on left rear top of the roof. The landmark 1304b on the front right top of the roof is connected to the landmark 1308b on the right side mirror and the landmark 1302b on the rear right top of the roof.

The landmark 1312 on the right rear tire is connected to the landmark 1313b on the left rear tire and the landmark 1306b on the right rear headlight. The landmark 1302b on the rear right top of the roof is connected to the landmark 1303b on the rear left top of the roof and the landmark 1306b on the rear right headlight The landmark 1303b on the rear left top of the roof is connected to the landmark 1307b on the left rear headlight. Finally the landmark 1307b on the left rear headlight is connected to the landmark 1313b on the left rear tire.

These connections can be used to determine a 2-D skeletons or 3-D skeletons for different types of cars. The landmark locations associated with the 2-D skeletons or 3-D skeletons can be used to determine locations in frames to place selectable tags. Methods of 2-D skeleton and 3-D skeleton determination are described with respect to FIGS. 14 and 15. An example of a 3-D skeleton with a connection schema similar to what is shown in FIG. 12 is described is shown in FIGS. 16A, 16B, 16C and 16D. The landmarks and the connections between landmarks are provided for the purposes of illustration only and are not meant to be limiting. Fewer or more landmarks can be specified in for a skeleton. Further, fewer, more or different connections than the shown in FIG. 12 can be specified.

In addition, landmarks and connections for different types of objects can be specified. For example, as described above, landmarks for clothes and connections between the landmarks for the clothes can be specified to form a skeleton. In the example of the car, the skeleton and its associated connections are rigid. Thus, the orientations of the landmarks, which form the joints of the skeleton, are fixed relative to one another. For other types of objects, such as clothes or people, which are flexible, the landmarks can articulate relative to one another. Thus, different poses involving the flexible objects are possible.

In various embodiments, not all of the landmarks in a set of landmarks can be used as part of the skeleton for the object. However, the landmark can still be recognized by a trained machine learning algorithm (TMLA) and automatically selected for a tag location. For example, the first landmark 1316 for the gas cap may be automatically recognized by a TMLA. However, since the gas cap can be at different locations depending on the type of car, such as one side or the other, the gas cap may not be incorporated into a skeleton for the car.

Figure 13:
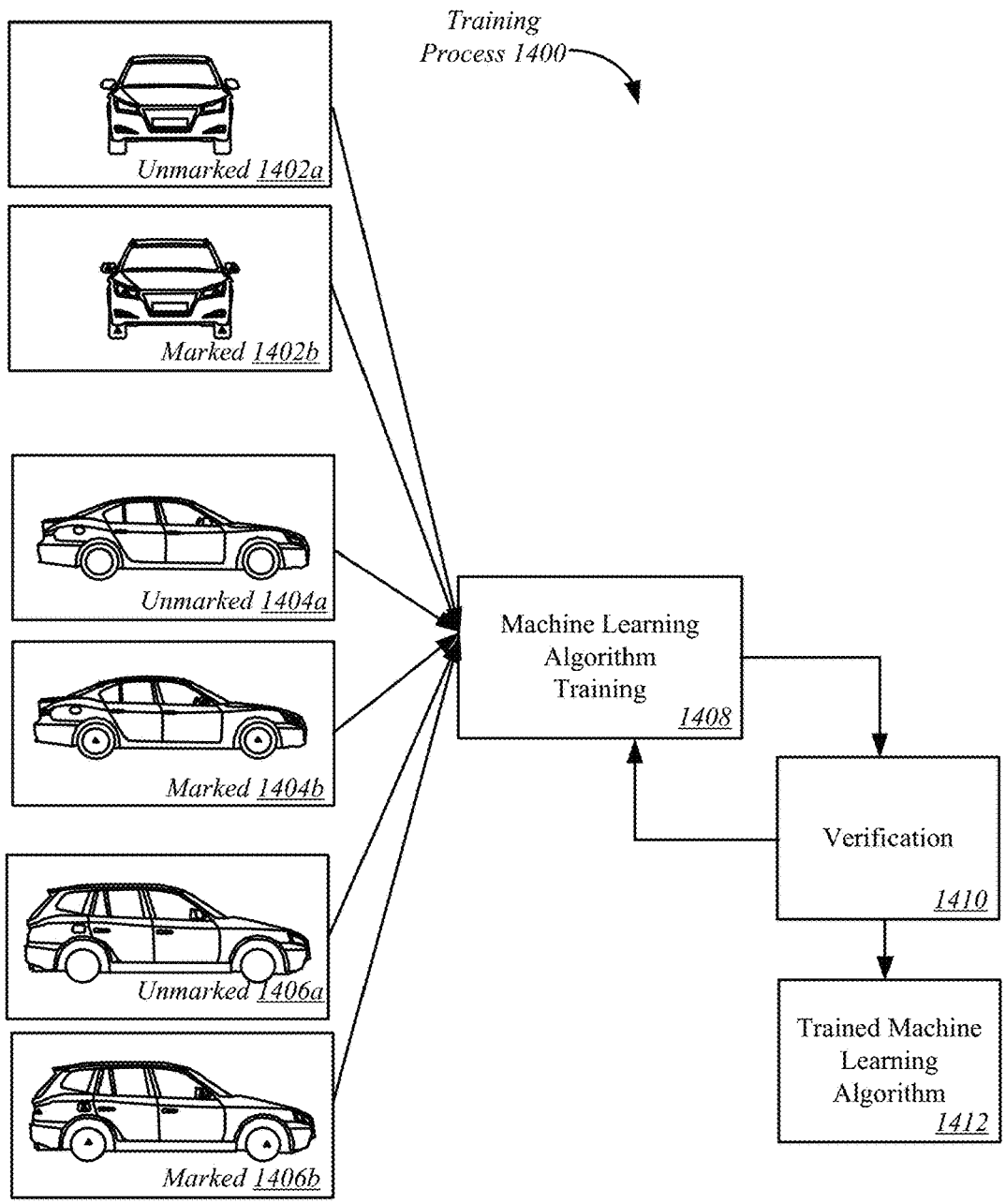
FIG. 13 illustrates a process for training a machine learning algorithm to recognize landmarks on an object in accordance with embodiments of the present invention.

Next, a process of training a machine learning algorithm to recognize landmarks is described with respect to FIG. 13. The training process can involve providing image pairs. Each of the images in the image pair can include a type of object on which landmarks are to be recognized, such as an exterior of a car. One of the images in each image pair can have one or more landmarks identified. Whereas, the other image in the image pair can be clean without any of the landmarks identified.

As an example, first image pair includes image 1402a and 1402b. Both images include a front view of a car. The first image 1402a is unmarked. In the second image 1402b, landmarks associated with the right front tire, the left front tire, the right front head light, the left front headlight, the right side mirror, the left side mirror, the front left top of the roof and the front right top of the roof are identified.

A second image pair includes images 1404a and 1404b. Both images include a side view of a car associated with the first image pair. The first image 1404a is unmarked. In the second image 1404b, landmarks associated with the right front headlight, right front wheel, right rear wheel, right side mirror, front right top of the roof and rear right top of the roof are identified. Images for 1402*a* and 1404*a* include common landmarks from different viewpoints, such as the right side mirror, right front headlight and right front tire. A training set of images can include images of a type of object from many different viewpoints.

A third image pair includes images 1406*a* and 1406*b*. Both images include a side view of a car. The car is different than the car associated with the first image pair and the second image pair. The first image 1406*a* is unmarked. In the second image 1406*b*, landmarks associated with the right front headlight, right front wheel, right rear wheel, right side mirror, front right top of the roof and rear right top of the roof are identified.

A plurality of image pairs can be used to train a machine learning algorithm 1408. In one embodiment, the machine learning algorithm can be a neural net, such as a deep neural net. A deep neural net is an artificial network with multiple hidden layers between the input and the output layers. Deep neural networks can model complex non-linear relationships. Deep neural networks are typically feed forward networks in which data flows from the input layer to the output layer without looping back.

In 1410, a trained machine learning algorithm (TMLA) can be verified. Verification can involve providing the TMLA with unmarked images. The TMLA can identify landmarks in the unmarked images. The landmarks locations can be manually verified to determine whether the TMLA is accurately identifying the landmarks. If the TMLA is inaccurately identifying landmarks, then additional image pairs can be provided to the machine learning algorithm to refine its training or the machine learning algorithm can be retrained with a new dataset.

In 1412, when the machine learning algorithm is verified, it can be considered a trained machine learning algorithm (TMLA). As described above, the system can include more than one TMLA. For example, a first TMLA can be configured to identify a first set of landmarks on a type of object and a second TMLA can be configured to identify a second set of landmarks, different from the first set of landmarks on the type of objects. As described above, the system can be configured to receive a selection of a set of landmarks to use with a type of object and in response, instantiate an associated TMLA with the selected set of landmarks.

Next, with respect to FIG. 14, an example of a process 1500 for determining a 2-D skeleton of an object in an image, such as a frame of an MVIDMR including the object or a sequence of images including the object, is described. In this example, a TMLA, such as a neural net, is configured to recognize landmarks on a car. An image, such as 1501, including a car can be input into the TMLA.

The TMLA can output a plurality of heatmaps 1504. The heatmap can be a matrix that stores the confidence that a particular pixel contains one of the landmarks which the neural net is trained to recognize. The number of heatmaps can depend on the number of landmarks that the neural net is trained to recognize. At least one heatmap can be generated for each of the landmarks.

Part affinity fields 1506 are matrices which give information about the position and orientation of pairs of landmarks that are connected. An example of the connections between landmarks for a car was described above with respect to FIG. 12. The example included twenty three connections. In 2-D, two part affinity matrices can be provided for each connection, one for each dimension.

In 1508, landmarks in the image 1501 can be extracted from the heatmaps in 1504. The landmarks can be considered local maximums associated with the heatmaps. In one embodiment, a non-maximum suppression algorithm can be applied to determine the local maximums. In a non-maximum suppression algorithm, a first pixel in the heatmap can be considered. It can be surrounded by a window of some dimension, such as a window of five pixels on a side, and the maximum value in the window can be provided. Then, the maximum value of in the window can be substituted for the value of the center pixel in the window. This process can be repeated for all the pixels in the heatmap.

The result of the substitutions can be compared with the original heatmap. The pixels staying with the same value can be the local maximums. In 1510, the local maximums can be designated candidates for landmarks. The other pixels can be set to a value of zero.

For a particular landmark, a set of pixels can be identified which are candidates for the landmark. As an example, for the car in image 1501, for each landmark the TMLA is configured to identify, a set of pixels can be identified via the Non-Maximum suppression algorithm in 1508 that are candidates for the particular landmark. For instance, a first set of pixel can be identified as candidates for the right side mirror landmark, a second set of pixels can be identified as candidates for right front headlight landmark, a third set of pixels can be identified as candidates for the right front tire landmark and a fourth set of pixels can be identified as candidates for the right rear tire landmark.

In 1512, the landmark candidates from 1510 can be connected to form pairs. For example, in a connection scheme for a car that specifies a car skeleton, the right front tire can be connected to the right rear tire. For each of the connection candidates for the right front tire, there is a possible connection candidate with each of the right rear tires. The potential connections can form a bipartite graph.

An algorithm can be applied to determine which vertices match best. The algorithms can involve applying weights to the vertices of the edges of the bipartite graph. The weights can be determined using the part affinity fields 1506. In one embodiment, in 1514, the part affinity fields can be integrated along the lines connecting each the landmark candidates. The line integrals can be used to generate connection scores between the landmark candidates.

The line integrals from 1514 can be used to generate a weighted bipartite graph in 1516. A weighted bipartite graph can include all the possible connections between a first set of landmark candidates and a second set of landmark candidates. In 1518, an assignment problem can be solved. In the assignment problem, the possible connections can be selected based upon maximizing a total score.

For example, the right front wheel landmark is connected to the right side mirror landmark, the right front headlight landmark and the right rear tire landmark. A first candidate landmark for right front tire can provide the best connection score with the right rear tire. However, a second candidate landmark for the right front tire can provide the best connection score with right side mirror. The assignment problem can involve determining a set of landmarks candidates which maximize the connection scores over all the possible connections.

The output from the assignment algorithm can be set of connections in 1520 where each of the connections is associated with a pair of landmarks including the locations of the landmarks. In 1522, the set of connections can be assembled into a 2-D skeleton. In 1524, the assembled 2-D skeleton 1526 is shown rendered over the car. The joints in the skeleton where the connections meet are the landmarks.

All or a portion of the landmark pixel locations, which form the joints of the skeletons, can be selected as the locations for selectable tags. In one embodiment, a 2-D skeleton calculation can be performed on a first frame of an MVIDMR to generate one or more selectable tag locations from landmarks associated with the 2-D skeleton. The system can output the 2-D skeleton, such as 1526, and one or more selectable tag locations associated with the 2-D skeleton, such as 1528, to a display.

In some instances, the system can be configured to receive an indication of whether each of the one or more selectable tag locations is to be used or not. Further, the system can be configured to allow a user to manually adjust a position of the selectable tag location determined from the 2-D skeleton calculation. For example, the system can be configured to receive input to manually adjust the position of the selectable tag location 1528.

When a selectable tag location is accepted, as described above, the system can be configured to determine a position of the selectable tag location in the remaining frames of the MVDIMR (or other sequence of images) including whether the selectable tag location is in the remaining frames. In one embodiment, key point tracking can be used to determine the selectable tag locations in the remaining frames. In another embodiment, a 2-D skeleton calculation can be performed for each frame. The 2-D skeleton calculation can determine a location of a landmark in each frame that is designated as a location for a selectable tag.

In yet other embodiments, a combination of 2-D skeleton calculations and keypoint tracking can be used to identify the pixel locations in an MVIDMR of a selectable tag. For example, a 2-D skeleton calculation can be employed at intervals, such as every fourth frame or every fifth frame. Between the frames where the 2-D skeleton calculation is used, key point tracking can be employed. The key point tracking can be used to "interpolate" from the frames where the 2-D skeleton calculation is used. One advantage of this approach is that it may be more computationally efficient than using a 2-D skeleton computation for each frame.

The key point tracking from 2-D skeleton locations can be performed in one direction only or both forwards and backwards in a series of frames of an MVIDMR. For example, a 2-D skeleton calculation can be performed on a first frame and a fifth frame of an MVIDMR. In one instance, key point tracking can be performed from the landmarks identified in the first frame to identify locations of the landmarks in the second, third and fourth frames. In another instance, key point tracking can be performed from the landmarks identified in the fifth frame to identify location in fourth, third and second frames.

In yet another instance, the key point tracking from the first frame to the second, third and fourth frames and the key point tracking from the fifth frame to the fourth, third and second frame can be combined in some manner, such as averaged. For example, a first pixel location of a first landmark can be determined in the first frame via the 2-D skeleton calculation and a second pixel location of the first landmark can be determined in the fifth frame via the 2-D skeleton calculation. Then, using key point tracking from the first pixel location in the first frame, a third pixel location of the first landmark in the second frame can be determined and, using key point tracking from the second pixel location in the fifth frame, a fourth pixel location of the first landmark in the second frame can be determined. The third and fourth pixel locations can be averaged to provide a fifth pixel location. The fifth pixel location can be used as the location of the landmark, which can also be a selectable tag in the second frame.

In this embodiment, the pixel locations value can be weighted. For instance, the key point tracking from the first frame to the second frame can be given a higher weight than the key point tracking from the fifth frame to the second frame. Then, the average value can be determined from the weighted values.

In yet other embodiments, a skeleton calculation doesn't have to be performed. Instead, the landmarks in a frame can be determined from the neural net. However, the landmarks don't have to be joined to form a skeleton. The determined landmark locations can be selected as a location for a selectable tag. For example, a landmark 1530 is determined to be over the gas cap. A selectable tag can be placed at this location. The pixel location of the gas cap in the remaining frames of the MVIDMR can be determined via one or more of key point tracking and repeating the application of the neural net to identify the landmark in the remaining frames.

Further, as described above, all of the landmarks which the machine learning algorithm is trained to recognize don't have to be part of skeleton. For example, a 2-D skeleton, such as 1526 can be generated and one or more landmarks, such as 1530, which is separate from the 2-D skeleton, can be identified. The landmarks locations that are determined separate from the 2-D skeleton and the landmark locations associated with the 2-D skeleton can be utilized as locations for selectable tags.

Figure 15:
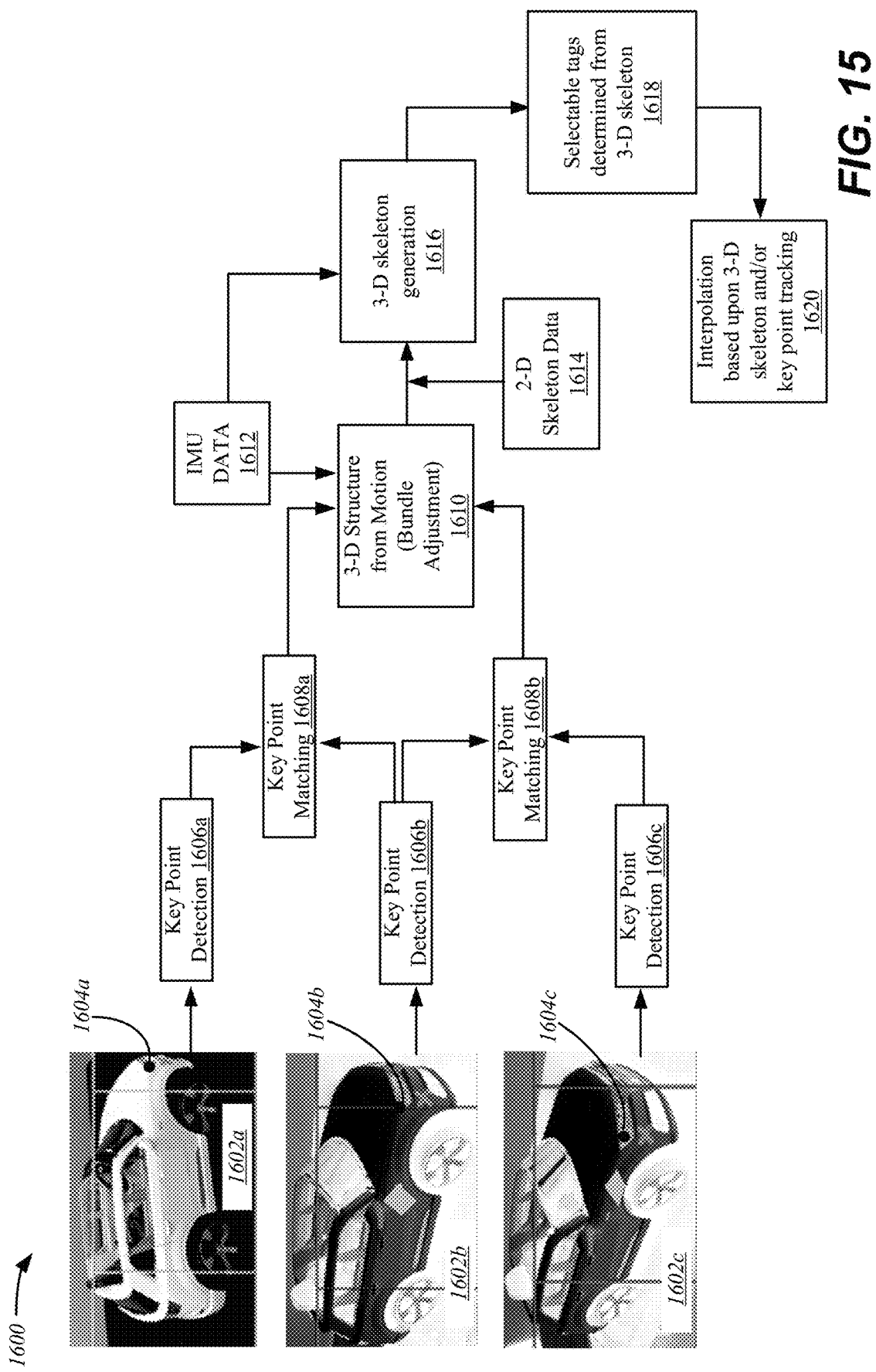
FIG. 15 illustrates a process for constructing 3-D data including a 3-D skeleton from images of an object taken from different viewpoints in accordance with embodiments of the present invention.

Next, methods are described for extending the 2-D skeleton calculation to a third dimension to generate a 3-D skeleton. The methods involve a structure from motion (SFM) algorithm. FIG. 15 illustrates a process 1600 for constructing 3-D data including a 3-D skeleton from images of an object taken from different viewpoints in accordance with embodiments of the present invention. In FIG. 15, three images including a car, 1602a, 1604b and 1604c, are shown.

In 1606a, 1606b and 1606c, key point detection can be performed. The key point detection can involve identifying specific locations on the object, such as the landmarks described above. However, other key points, such as easily identifiable features like corner locations or edges, can also be determined. Thus, the methods are not limited to using only the selected landmarks. In one embodiment, in a particular frame, such as 1602a, 1602b or 1602c, a TMLA, such as a neural net, can be used to identify landmarks on the object. The landmarks can be designated as key points. As described above, with respect to FIG. 15, connections can be specified between the landmarks. The connections can be used to construct a 2-D skeleton associated with the object. The joints and/or the connections between the joints can be used to determine key points.

In one instance, the identification of landmarks via a TMLA and/or the 2-D skeleton calculation can be performed on all or portion of images, 1602a, 1602b and 1602c. For example, the 2-D skeleton calculation, described with respect to FIG. 14, can be performed in each of frames, 1602a, 1602b and 1602c, to identify the landmarks, 1604a, 1604b and 1604c. Landmarks 1604a, 1604b and 1604c are each associated with the right front headlight of the car. In another example, the 2-D skeleton calculation can be performed on image 1602a and the landmark 1604a can be determined from the calculation. Then, key point tracking from the landmark 1604a in image 1602a can be used to determine the location of landmark 1604b in image 1602b.

In yet another example, the 2-D skeleton calculation can be performed on images 1602a and 1602c to determine the landmark 1604a and 1604c, respectively. Then, key point tracking from the landmark 1604a in image 1602a to image 1602b and from the landmark 1604c in image 1602c to image 1602b can be used to determine the location of landmark 1604b in image 1602b. The key point tracking from the two different images can provide two different locations for landmark 1604b in image 1602b. In one embodiment, the two locations can be averaged. One possible advantage of using key point tracking as opposed to the 2-D skeleton calculation is that the key point tracking can use less CPU resources than 2-D skeleton calculation.

After the key point detection, key point matching, in 1608a and 1608b, can be performed. The key point matching can involve taking two pairs of images, such as a first pair, 1602a and 1602b, and a second pair, 1602b and 1602c, and identifying where common key points appears in both images. For example, in 1608a, the landmark 1604a in image 1602a can be matched to the landmark 1604b in image 1602a. This process can be repeated for a plurality of landmarks appearing in both images 1602a and 1602b. In 1608b, the landmark 1604b in image 1602b can be matched to the landmark 1604c in image 1602c. This process can be repeated for a plurality of landmarks appearing in both images 1602b and 1602c.

In some instances, a landmark appearing in a first image may not be able to be matched to a landmark appearing in a second image. The inability to match landmarks between images can occur due to the change in viewpoint of the camera. When the camera view point changes, a landmark appearing in a first image may not be visible in a second image. For example, the left front headlight is visible in images 1602c but is not visible in image 1602a. Thus, the sets of landmarks which are matched between image pairs can vary from image pair to image pair.

Next, based upon the key point matches between the first image pair, 1602a and 1602b, and the second image pair, 1602b and 1602c and camera orientation data associated with each image a 3-D structure from motion (SFM) calculation can be performed. In one embodiment, as described above with respect to FIGS. 7, 8A and 8B, the camera orientation data can be obtained from an IMU. The IMU can provide IMU data 1612. SFM is a photogrammetric range imaging technique for estimating three-dimensional structures from two-dimensional image sequences, such as the sequences of images in an MVIDMR of an object or other image sequences including the object. SFM can be similar to finding 3-D structure from stereo vision except a single camera can be employed as opposed to the two cameras, which are typically used for stereo vision.

In one embodiment, a bundle adjustment can be performed to obtain the 3-D structure from motion. For a set of images depicting a number of 3-D points from different viewpoints, such as images 1602a, 1602b and 1602c, a bundle adjustment can simultaneously refine the 3-D coordinates describing the scene geometry, the parameters of the relative motion and the optical characteristics of the cameras employed to acquire the images, according to an optimality criterion involving corresponding image projections of all points. In some embodiments, the camera parameters can be the same for all of the images, such as an MVIDMR of an object generated from images captured from a mobile device camera in a single session as previously described above. Thus, the 3-D coordinates describing the scene geometry and the parameters of the relative motion can be simultaneously considered in the bundle adjustment.

The bundle adjustment can resolve differences in 3-D coordinates that can be determined if the first image pair, 1602a and 1602b, and the second image pair, 1602b and 1602c, are considered independently of one another. For example, based upon the first image pair, a first set of 3-D coordinates can be predicted for image 1602b and based upon the second image pair, a second set of 3-D coordinates can be predicted for image 1602c. These discrepancies can be resolved when a bundle adjustment algorithm is applied.

Bundle adjustment can involve minimizing the reprojection error between the image locations of observed and predicted image points. The reprojection error can be expressed as the sum of squares of a large number of non-linear, real valued functions. The minimization can be achieved using non-linear least-squares algorithms. One such algorithm which can be employed is the Levenberg-Marquardt algorithm.

The bundle adjustment can provide 3-D point data for pixel locations which are visible in image. In addition, based upon the connection relationships defined for a 3-D skeleton of an object, such as a rigid skeleton associated with a car, the 3-D point locations of joints in a skeleton, which are not visible in image, can be estimated in rendered into a 2-D image. In 1616, based upon a 2-D skeleton generated for an image, the orientation of the camera, the 3-D point data generated from the structure from motion determination and 3-D connection relationships that define a 3-D skeleton of an object, a 3-D skeleton of an object can be determined and projected into a 2-D image of the object, such as the frames of an MVIDMR. Examples of a 3-D skeleton of an object rendered into 2-D frames of an MVIDMR of the object are shown in FIGS. 16A, 16B, 16C and 16D.

In particular embodiments, in 1618, one or more joints of a 3-D skeleton, which can be the landmarks previously described above with respect to FIGS. 12, 13 and 14, can provide the locations for a selectable tag. For example, a 3-D skeleton can be generated in a first image of an object and output to a display. Then, the system can be configured to receive a selection of one or more of the landmarks forming the joints of the 3-D skeleton to be used as a selectable tag and then request additional media content to associate with the selectable tag. Alternatively, the system can designate one or more of the landmarks forming a joint in the 3-D skeleton as a selectable tag and request additional media content or the one or more landmarks.

Since a 3-D skeleton is projected into the image, only a portion of the joints and their associated connections can be visible in the image. For example, if a 3-D skeleton of a car is rendered into an image and the 3-D skeleton includes joints associated with each tire, then only two of the four or three of the four tires may actually only be visible in the image. However, a joint or joints can be rendered at locations in the image associated with the tires that are not visible in the image in accordance with the 3-D coordinate system associated with the image and the 3-D skeleton of the object projected into the 3-D coordinate system.

The joints in the image associated with a portion of the object that is not visible in the image can also be selected as a location for a selectable tag. Thus, additional media content can be associated with the selectable tag. When a location on the object is not visible in a frame of an MVIDMR is selected as a selectable tag location, the system can be configured to determine whether the location of the object appears in any of the remaining frames of the MVIDMR and render the selectable tag in frames of the MVIDMR where the location does appear.

In 1620, the system can be configured to perform interpolation within the frames of an MVIDMR or other sequence of images including an object for which a 3-D skeleton was generated to determine selectable tag locations. The interpolation can involve interpolating the position of a 3-D skeleton determined for a first image to a second image based upon the change in orientation of the camera from the first image to the second image and/or key point tracking from the first image to a second image. Similar to what is described above with respect to a 2-D skeleton, the 3-D skeleton of an object can be determined for portion of the frames of an MVIDMR or other sequence of images, then interpolated to intervening frames. The interpolation can be used to automatically determine selectable tag locations in a particular frame. The selectable tag locations determined from a first frame can involve interpolations from one or more frames.

The interpolation between frames can involve two different approaches. In one approach, as described above, the 3-D skeleton locations determined in a first frame can be interpolated to a second frame based upon key point tracking from a first frame to a second frame. In another embodiment, the 3-D skeleton from the first frame can be interpolated into the second frame based upon the change in orientation of the camera from the first frame to the second frame. Based upon the change in orientation of the camera, a new orientation of the 3-D skeleton can be determined in the second frame and then the 3-D skeleton in the new orientation can be projection in the second frame.

The approach involving determining an orientation of the 3-D skeleton can be used with key point matching. For example, a landmark or landmarks appearing in both the first frame and the second frame can be identified. The landmarks identified in the second frame can be used to help line up and project the 3-D skeleton into the second frame.

As described above, the system can be configured to allow a user to arbitrarily select locations on an object as a location for selectable tag. When a series of frames, such as an MVIDMR, are associated with the object, an interpolation method can be used to determine the locations in the remaining frames where the selectable tag appears. In some embodiments, a 2-D skeleton or 3-D skeleton associated with the object can be used to provide an interpolation method.

Figure 9E:
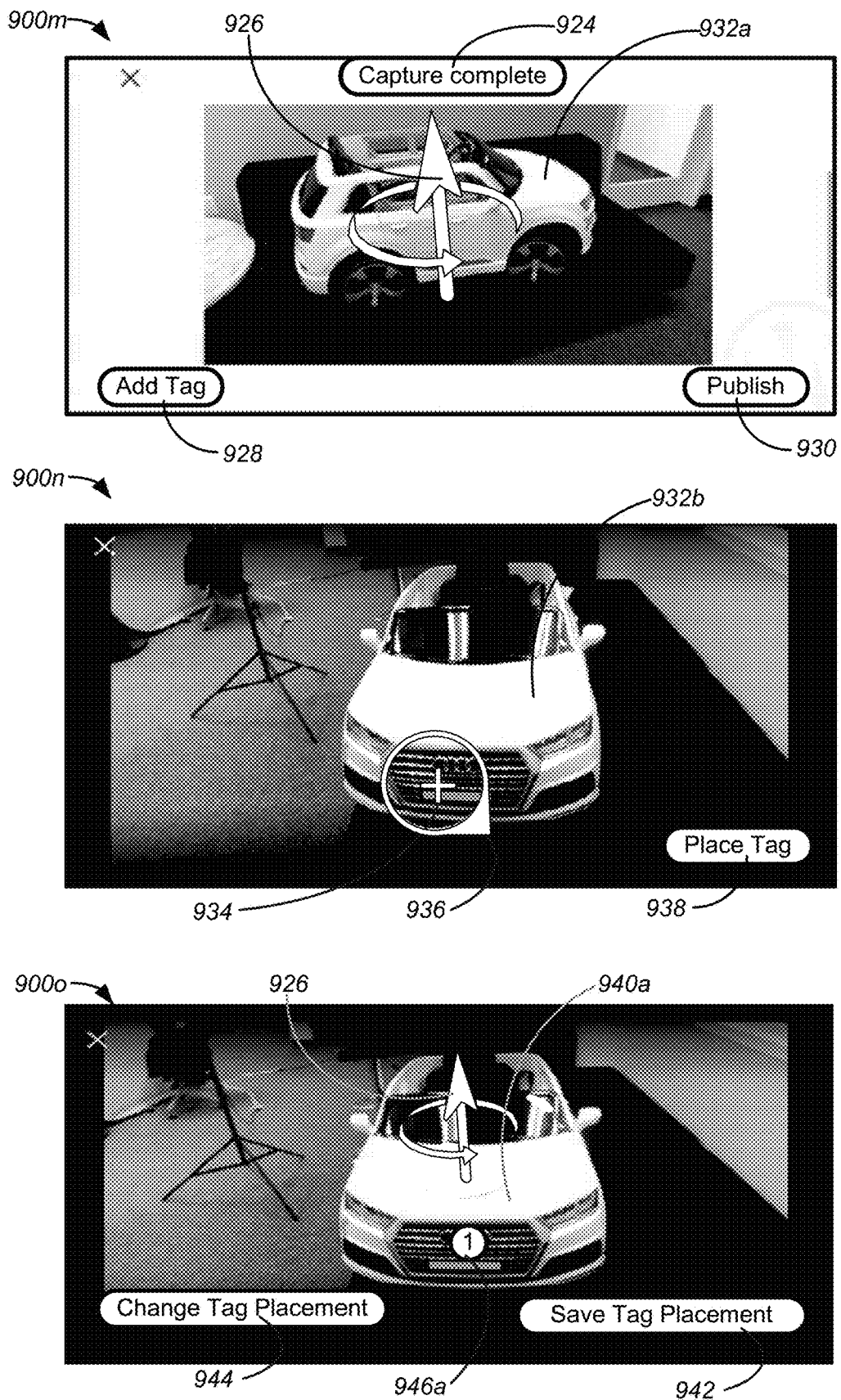
Figure 9F:
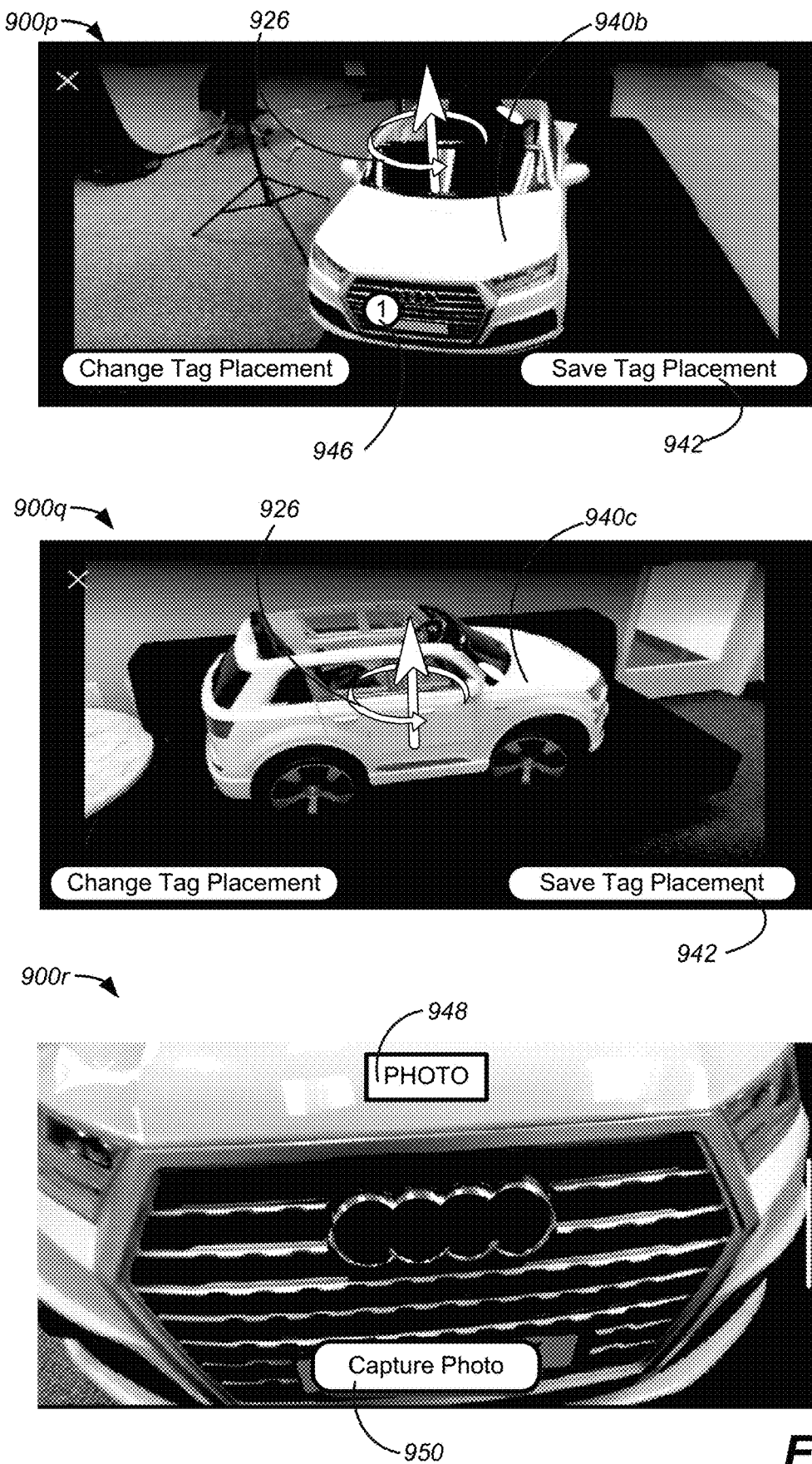
Figure 9G:
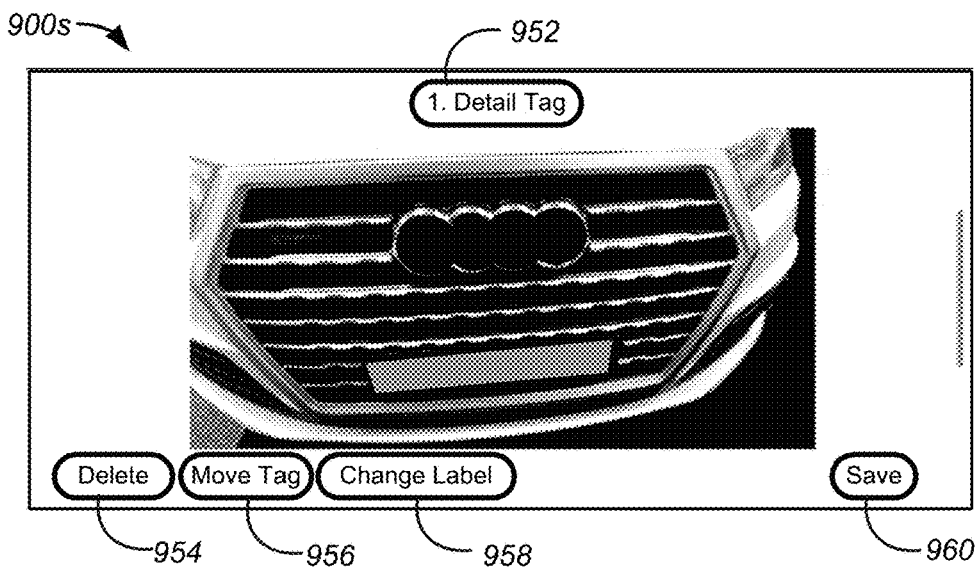
Figure 9G:
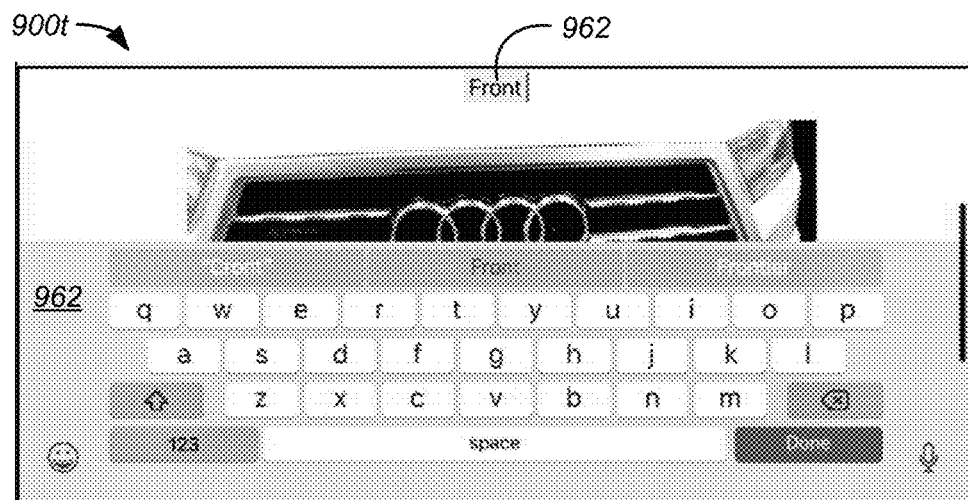
Figure 9G:
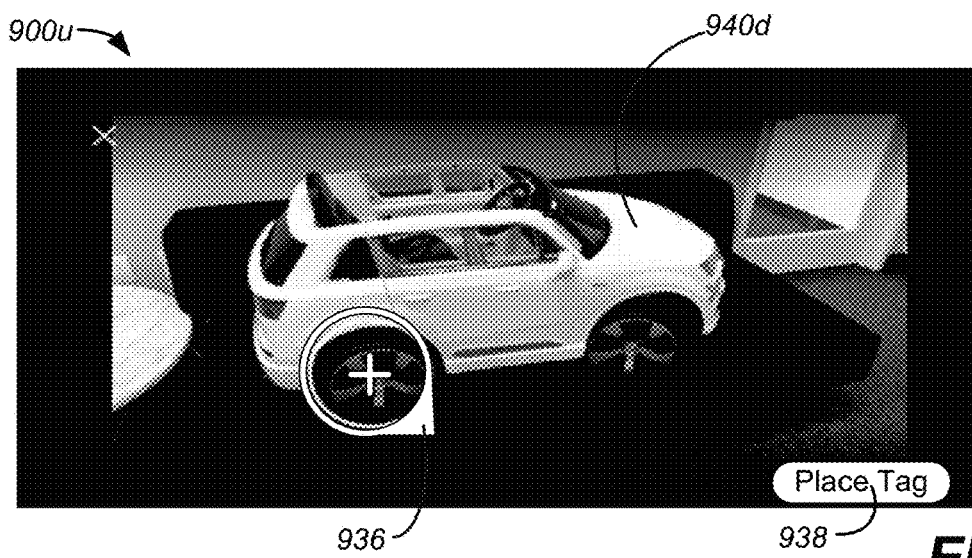
Figure 9H:
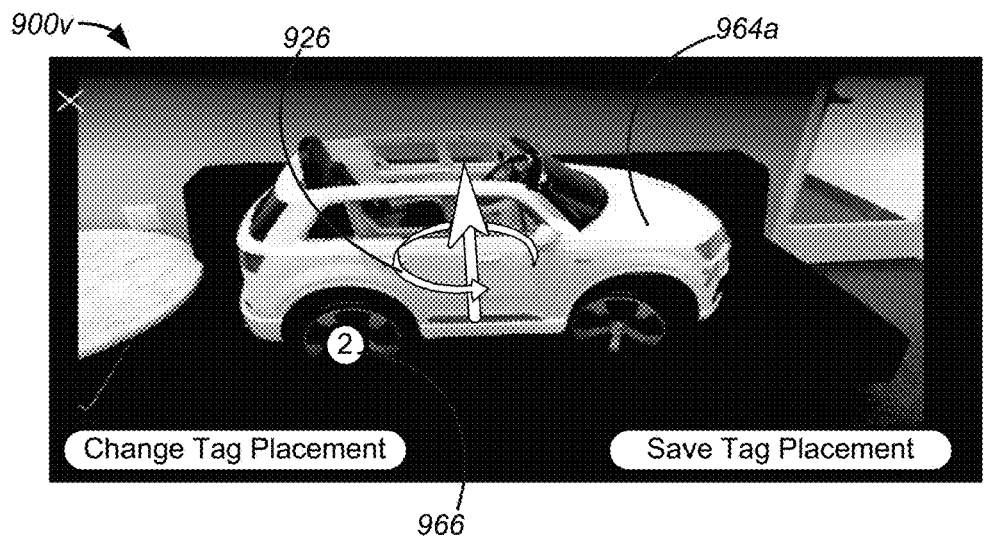
Figure 9H:
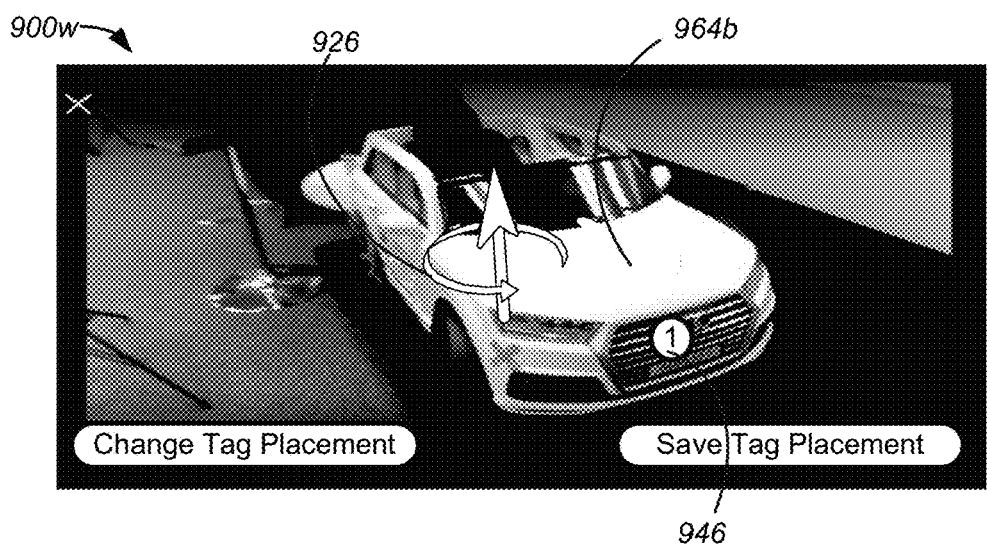
Figure 9H:
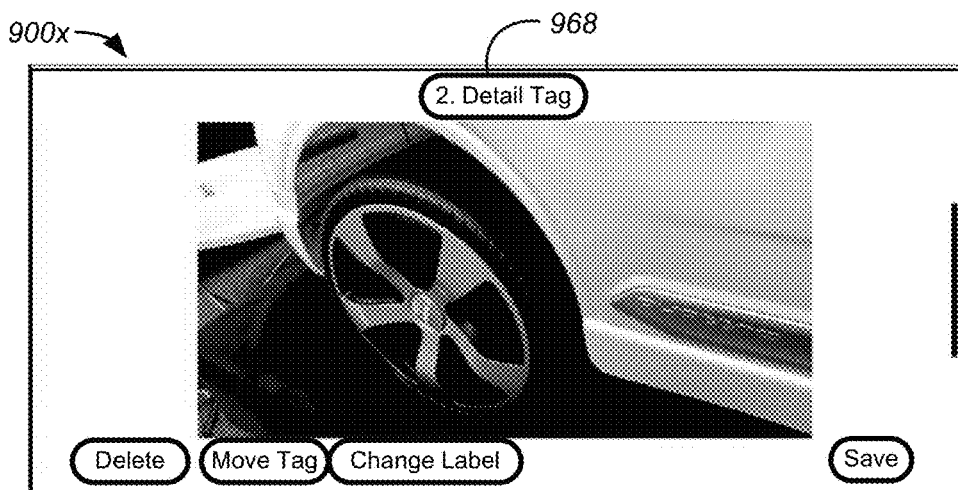
Figure 9I:
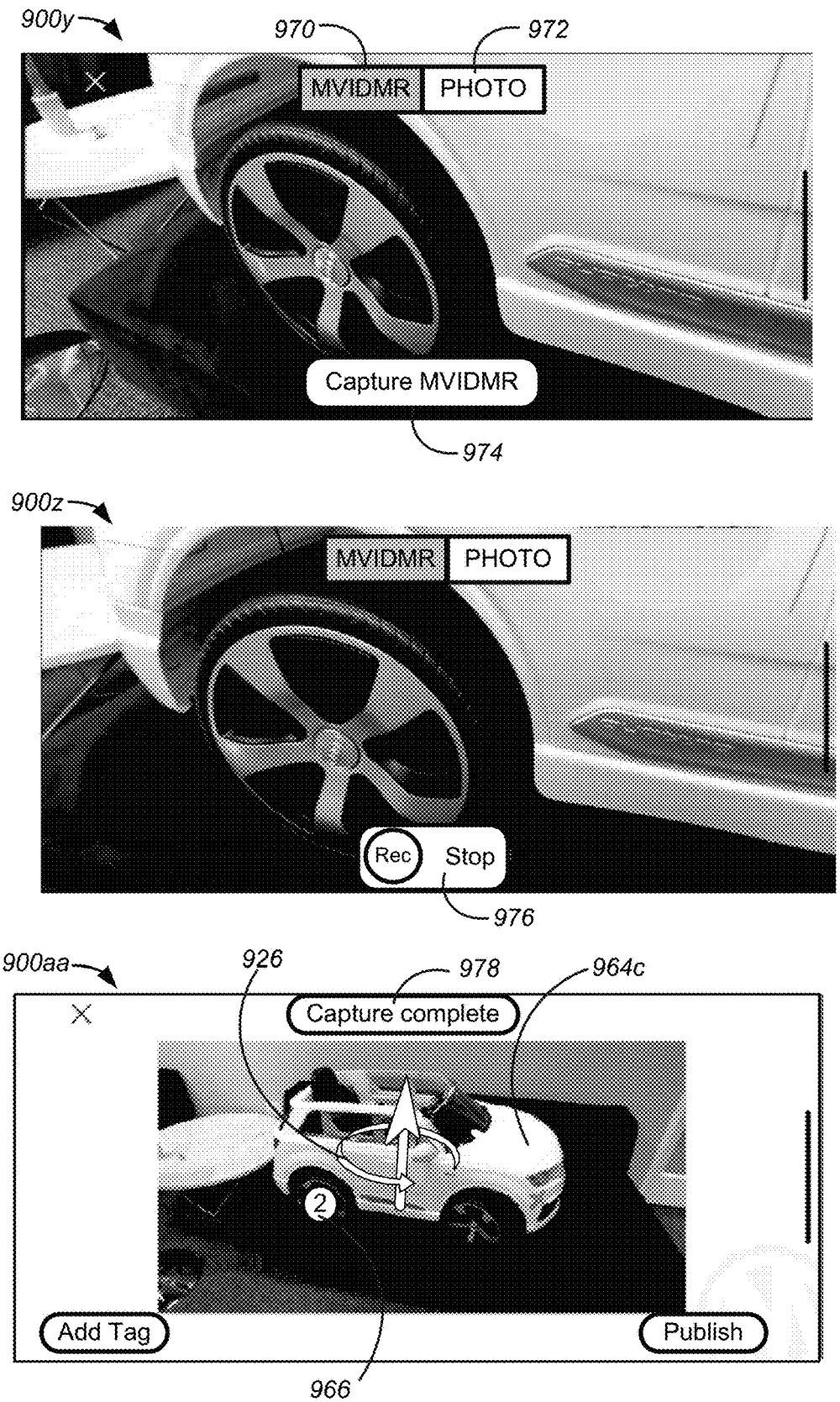
Figure 9J:
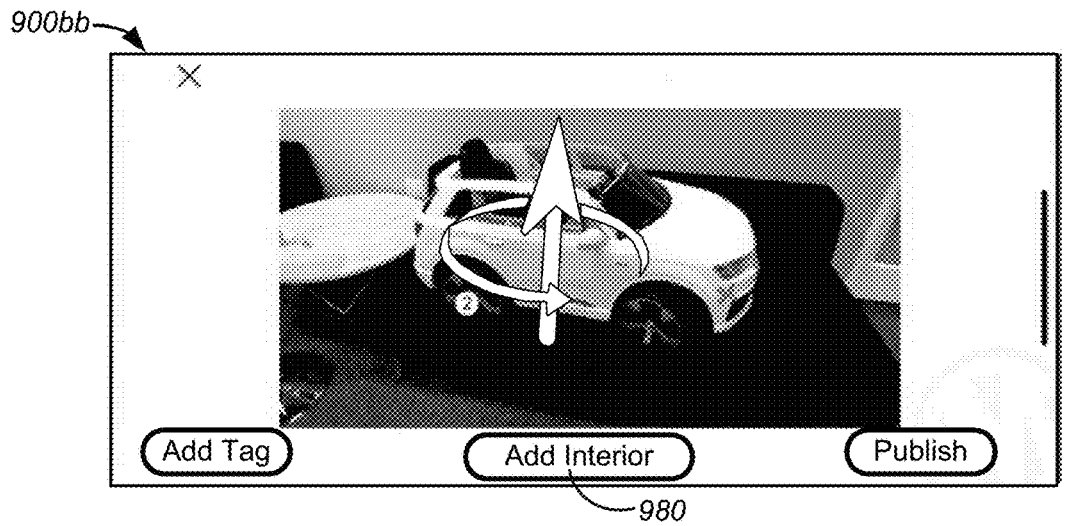
Figure 9J:
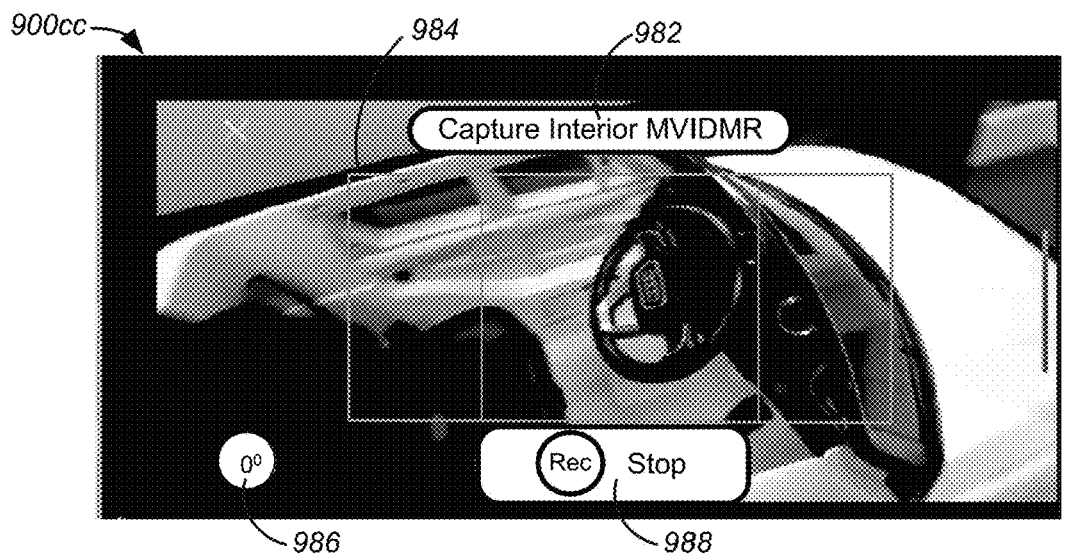
Figure 9J:
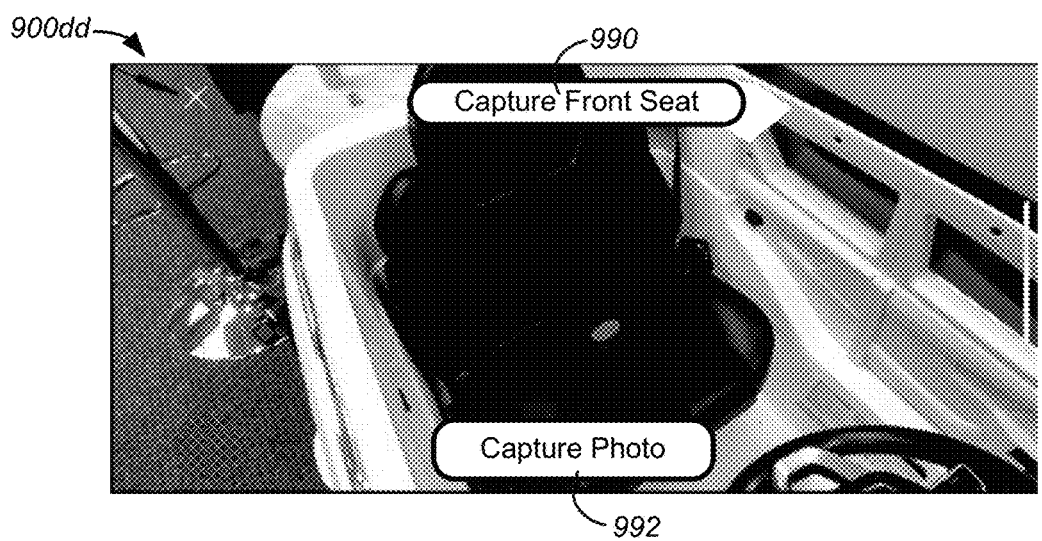
Figure 9K:
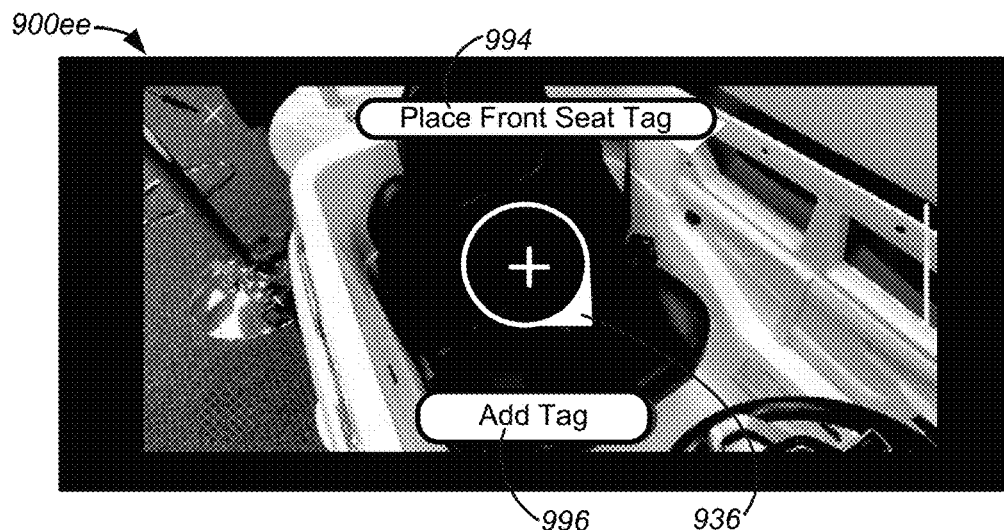
Figure 9K:
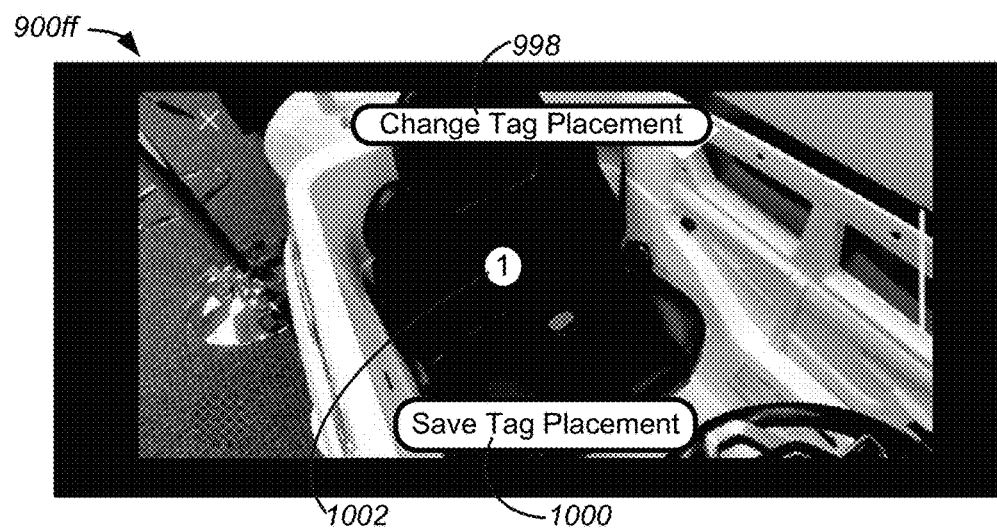
Figure 9K:
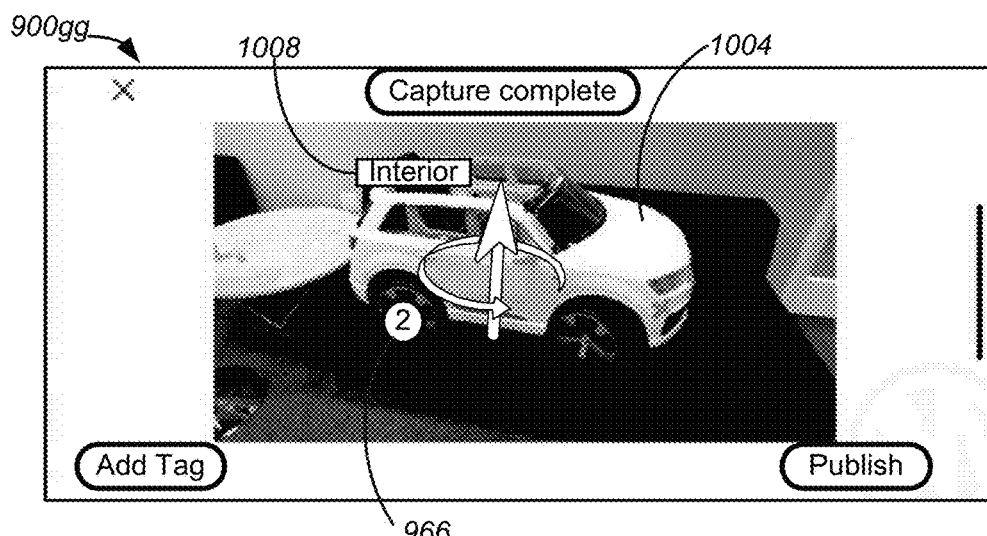

As an example, a location can be selected on an object from a frame including the object using an interface generated by the system (e.g., see FIG. 9E). The location may be different than one of the landmarks that the system is configured to recognize, such as a wheel or a mirror. Prior to or after the selection, landmarks on the object can be recognized and a 2-D skeleton or a 3-D skeleton can be generated for the object in the frame. The 2-D skeleton or the 3-D skeleton can define a 2-D surface or a 3-D surface in the frame including the object. The location selected for a selectable tag can be positioned on the 2-D surface defined by the 2-D skeleton or 3-D surface associated with the 3-D skeleton. For example, the position of the selected location in the frame including the object can be defined relative to the 2-D positions of the landmarks forming the joints of the skeleton in a 2-D coordinate system. As another example, the position of the selected location in the frame including the object can be defined on a 3-D surface associated with the 3-D skeleton in a 3-D coordinate system defined by the recognized landmarks.

In all or a portion of the remaining frames, landmarks can be recognized and a 2-D surface associated with the 2-D skeleton can be generated or a 3-D surface associated with the 3-D skeleton can be generated. Then, the location of the selectable tag can be positioned on the 2-D surface or the 3-D surface, such as relative to the positions of the landmarks as previously determined. Thus, the location of the arbitrary placed selectable tag can be determined in each of the remaining frames. This approach can also be applied to the top down view of an object, such as the top down view of the car shown in FIG. 10A.

Figure 16A:
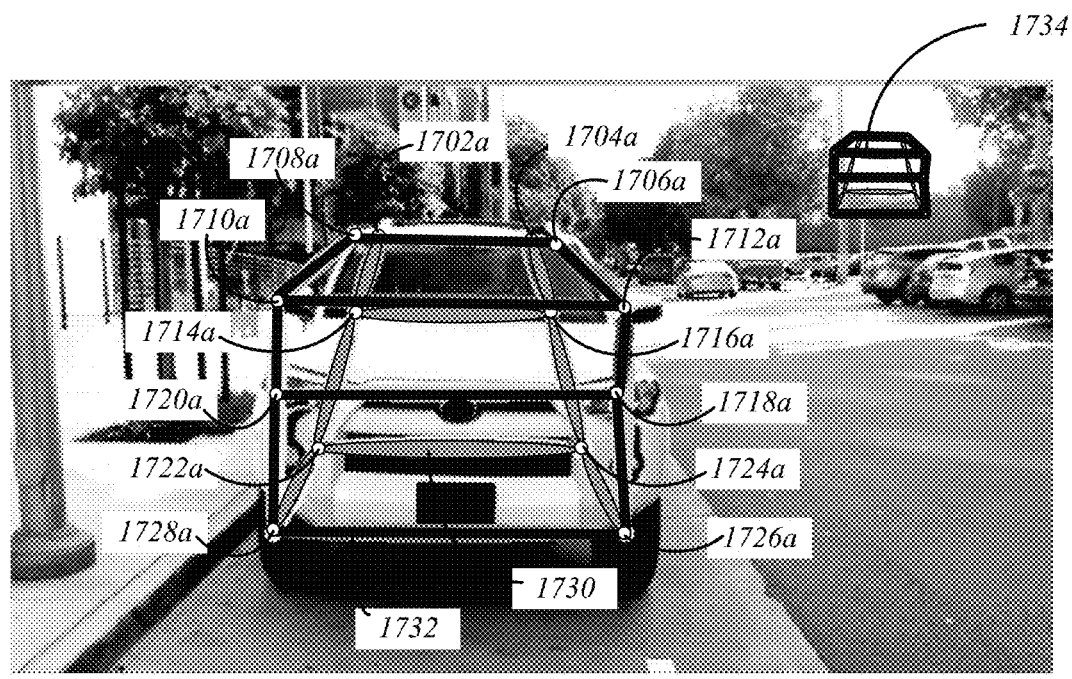
FIGS. 16A, 16B, 16C and 16D illustrate examples of a 3-D skeleton determined for a car where the joints in the 3-D skeleton can provide locations for selectable tags in accordance with embodiments of the present invention.
Figure 16B:
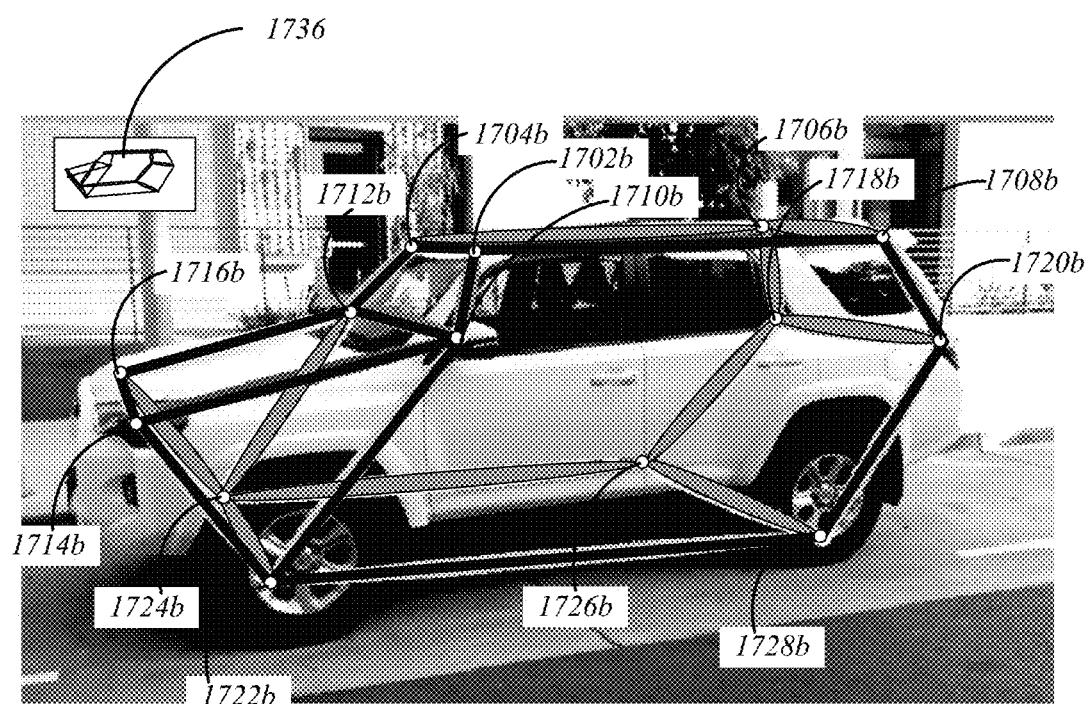
Figure 16C:
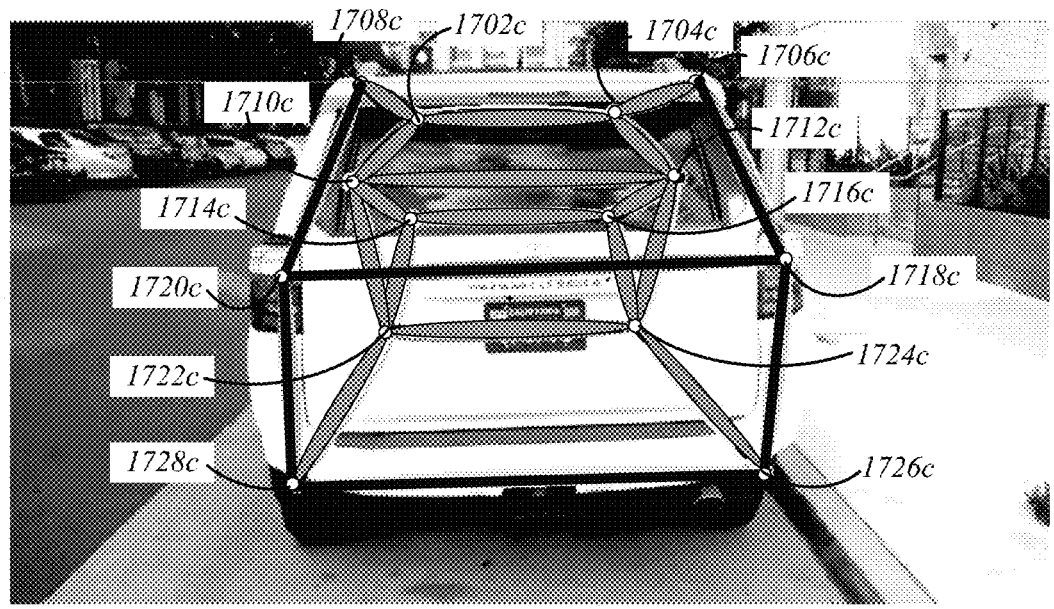
Figure 16D:
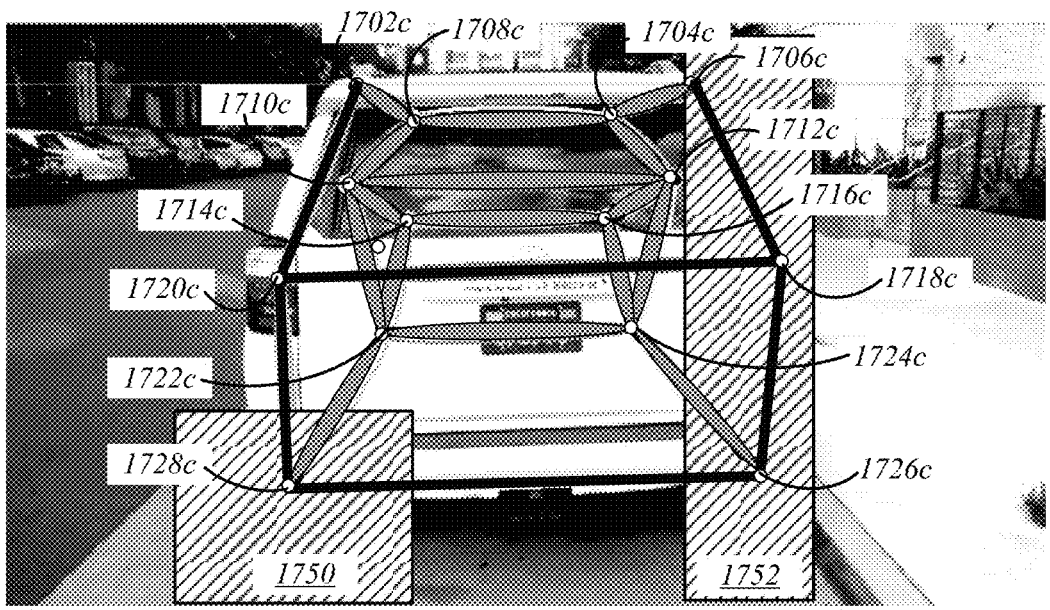

Next, with respect to FIGS. 16A, 16B, 16C and 16D, examples of a 3-D skeleton determined for a car where the joints in the 3-D skeleton can provide locations for selectable tags are described. In FIGS. 16A, 16B, 16C and 16D, the 3-D skeleton includes fourteen landmarks. The left side of the car can be driver's side of the car and the right sight side of the car can be opposite the driver's side. FIG. 16A is a frame showing the front of the car. FIG. 16B is a frame showing the left side of the car. FIGS. 16C and 16D show a frame from the rear of the car. In particular embodiments, the frames can be from an MVIDMR of the car. However, the frames can also be from a sequence of frames including the car that is not an MVIDMR. Other objects can be considered and the car is described for the purposes of illustration only and is not meant to be limiting.

The fourteen landmark and their locations in each frame can be identified using a 3-D skeleton calculation in a portion of the frames in combination with key point tracking as described above. Alternatively, a 3-D skeleton calculation can be performed in each of the frames. For a particular frame, the 3-D locations of the landmarks can be in a 3-D coordinate system associated with the particular frame. The 3-D locations can be projected into the 2-D pixel coordinates associated with the particular frame to determine 2-D pixel locations of the landmarks.

Next, details of the fourteen landmarks are described. The frames 16A, 16B, 16C and 16D include a first landmark, 1702a, 1702b and 1702c, at the right top rear of the roof, a second landmark, 1704a, 1704b and 1704c, at the left top rear of the roof, a third landmark, 1706a, 1706b and 1706c, at the left top front of the roof and a fourth landmark, 1708a, 1708b and 1708c, at the left top front of the roof. A fifth landmark, 1710a, 1710b and 1710c, and a sixth landmark, 1712a, 1712b and 1712c, are found at the right side mirror and the left side mirror, respectively. A seventh landmark, 1714a, 1714b and 1714c, an eighth landmark, 1716a, 1716b and 1716c, a ninth landmark, 1718a, 1718b and 1718c and a tenth landmark, 1720a, 1720b and 1720c, are associated with right rear tail light, the left rear tail light, the left front head light and the right front head light, respectively. An eleventh landmark, 1722a, 1722b and 1722c, a twelfth landmark, 1724a, 1724b and 1724c, a thirteenth landmark, 1726a, 1726b and 1726c and a fourteenth landmark, 1728a, 1728b and 1728c, are associated with right rear tire, the left rear tire, the left front tire and the right front tire, respectively.

The fourteen landmarks can be connected to form a 3-D skeleton. The four landmarks on the roof, such as 1702b, 1704b, 1706b and 1708b in FIG. 16B, are connected with one another to form a rectangle. The four landmarks on the tires, such as 1722b, 1724b, 1726b and 1728b, are connected with one another to form a rectangle. The side mirrors, such as 1710b and 1712b, are connected with one another, the landmarks at the front top of the roof, such as 1702b and 1704b, the landmarks on the front tires, such as 1722b and 1724b and the landmarks on the front headlights, such as 1714b and 1716b. The landmarks on the rear tail lights, 1718b and 1720b, are connected to each other, the landmarks on the rear tires, such as 1726b and 1728b, and the landmarks on the rear top of the roof, such as 1706b and 1708b.

Different connection schemes between the embodiments are possible. Thus, the specified connections are provided for the purposes of illustration only. For example, in an alternate embodiment, connections can be drawn between the side mirrors and the rear head lights. In another embodiment, the front door handles can be used as landmarks and connections can be determined between these landmarks and other landmarks, such as the side mirrors or the tires. In another embodiment, the connections between the side mirrors and the front tires can be removed to simplify the 3-D skeleton. In another embodiment, cross links can be provided between the tires, such as the right front tire and the left rear tire.

As described above, only a portion of the landmarks which form the joints of the 3-D skeleton are visible on the car in the figures. For example, in FIG. 16A, the landmarks, 1706a, 1708a, 1710a, 1712a, 1718a, 1720a, 1726a and 1728a are visible on the car in the frame. Connections between these visible joints represented by black lines such as 1732.

The landmarks, 1702a, 1704a, 1712a, 1714a, 1716a, 1722a and 1724a are not visible on the car in the frame. For example, the landmarks, 1714a and 1716a, associated with the rear tail lights, and the landmarks, 1722a and 1724a, associated with the rear tires are occluded by the front portion of the car in the image and can't be seen. Nevertheless, based upon the 3-D coordinate system determined for the image and the 3-D coordinates determined for the occluded landmarks, the non-visible landmarks can be projected onto and rendered into the image. The connections between i) the visible and non-visible landmarks and ii) the non-visible landmarks are represented by the gray ellipses.

In particular embodiments, the 3-D skeleton can optionally be shown or not be shown in a frame. The system can be configured to receive an indication that the 3-D skeleton is to be rendered into a frame. In one embodiment, the 3-D skeleton can be rendered into an MVIDMR when the selectable tags are being designated and the content for the selectable tags is being uploaded. Then, after the content for the automatically located selectable tags has been uploaded, the 3-D skeleton can be removed from the frames of the MVIDMR.

With the 3-D skeleton approach, additional media content can be uploaded for a location that is currently not visible on an object in an image. For example, in FIG. 16A, landmark 1716a, which is associated with the left rear tail light, is not visible on the car. However, the landmark position is approximated in the image. In one embodiment, the location associated with landmark 1716a can be automatically associated with a selectable tag. Thus, the landmark 1716a can be selected and then in response the system can generate an interface that allows additional media content with the selectable tag to be uploaded.

In additional embodiments, the 3-D skeleton for an object can be rendered separately, such as offset, from the image. For example, in FIG. 16A, 3-D skeleton 1734 is shown rendered off-set from the larger 3-D skeleton rendered over the car. Further, in FIG. 16B, 3-D skeleton 1736 is shown rendered off-set from the larger 3-D skeleton rendered over the car. In some embodiments, the off-set 3-D skeleton can be rendered for the object while a skeleton is not rendered over car.

In additional embodiments, the system can be configured to allow the 3-D skeleton whether rendered over the car or off-set from the vehicle to be rotated independently of an MVIDMR associated with the object. For example, the 3-D skeleton 1734 can be rotated while the car in FIG. 16A remains in a constant position. In another embodiment, the 3-D skeleton can be used as a navigational aid. For instance, the 3-D skeleton can be rotated to a particular orientation and then selected. When the particular orientation is selected, the object in the MVIDMR can rotate to the orientation that is selected by the 3-D skeleton.

In another embodiment, the system can allow a selection of a landmark which is not currently visible on the object, such as landmark 1724a on the left rear tire, in FIG. 16A, to cause the MVIDMR of the object or sequence of images including the object to rotate to a frame visibly showing the selected landmark on the object, such as the first frame in the sequence of frames that visibly includes the landmark on the object. Thus, when landmark 1724a is selected in FIG. 16A, the system can cause the MVIDMR to rotate to a frame including the landmark 1724a visibly shown on the object, such as the frame in FIG. 16B. In one embodiment, the system can show the rotation from the current frame where the landmark is not visible to the frame where the landmark is visible. In another embodiment, the system can directly jump to the frame where the landmark is visible without showing the intervening frames.

As described above, a portion of the landmarks and connections associated with a 3-D skeleton can be visible in an image and a portion may not be visible. The landmarks which are visible and the landmarks which are not visible can change as the viewpoint associated with the object changes from frame to frame. For example, the landmarks visible in FIG. 16B are different than in FIG. 16A or FIG. 16C. In FIG. 16B, landmarks 1702b, 1704b, 1708b, 1710b, 1712b, 1714b, 1720b, 1722b and 1728b are visible and landmarks 1706b, 1716b, 1718b, 1724b, 1726b are not visible. In FIG. 16C, landmarks 1706c, 1708c, 1718c, 1720c, 1726c and 1728c are visible and landmarks 1702c, 1704c, 1710c, 1712c, 1714c, 1716c, 1722c and 1724c are not visible.

One advantage of using a 3-D skeleton to determine the 2-D pixel locations of landmarks which can be used as locations for selectable tags over versus using only key point tracking to determine the 2-D pixel locations is the 3-D skeleton approach can provide more accuracy when secondary objects occlude the primary object during capture of the sequence of frames including the object. As an example, the primary object can be the object which is the subject of the MVIDMR. The secondary object can be objects in the foreground or background surrounding the primary object. For example, in FIG. 16B, two secondary objects, 1750 are and 1752, are shown to block the view of the car, which is the primary object. Secondary object 1750 blocks the view of landmark 1728c and secondary object 1752 blocks landmarks 1706c, 1718c and 1726c.

In FIG. 16D, the blocked landmarks, such as 1726c and 1728c, can be visible other frames of the MVIDMR. Thus, interpolation can be used to track the locations from the frames where the landmarks are visible to the frames where they are occluded by the secondary object. If key point tracking is used, the results may not be accurate because the key points are no longer visible in the frame associated with FIG. 16D. Hence, the key points can't be tracked.

The use of the 3-D skeleton to interpolate the landmarks 1726c and 1728c can provide tracking of the landmarks because the 3-D skeleton approach preserves the relationships between landmarks which make the joints of the skeleton. The relationships between the landmarks are the connections between the landmarks. The key point tracking doesn't include this information. Thus, the locations predicted by the interpolation can be closer to the locations of the landmarks 1726c and 1728c shown in FIG. 16D.

In some instances, the 3-D skeleton calculation can run on a frame where one or more landmarks are occluded by a secondary object, such as the frame shown in FIG. 16D.

When one or more landmarks associated with an object can't be identified in a frame because they are occluded by a secondary object, the system can be configured to use the 3-D relationships associated with the 3-D skeleton to estimate the position of the occluded landmark. This capability is demonstrated in FIGS. 16A, 16B and 16C where only a portion of landmarks are visible because the non-visible landmarks are occluded by the primary object. Nevertheless, the 2-D pixel locations of the non-visible landmarks are still estimated in the frames.

As an example, the structure from motion calculation can indicate that the secondary object 1750 is in front of the car and hence landmark 1728c is occluded. Based upon the nearby landmarks which are identified in the frame, such as 1702c and 1720c, their 3-D locations and the connections between landmarks associated with the 3-D skeleton, the system can be configured to estimate the location of landmarks occluded in the frame by secondary objects, such as landmark 1728c occluded by secondary object 1750.

Figure 17:
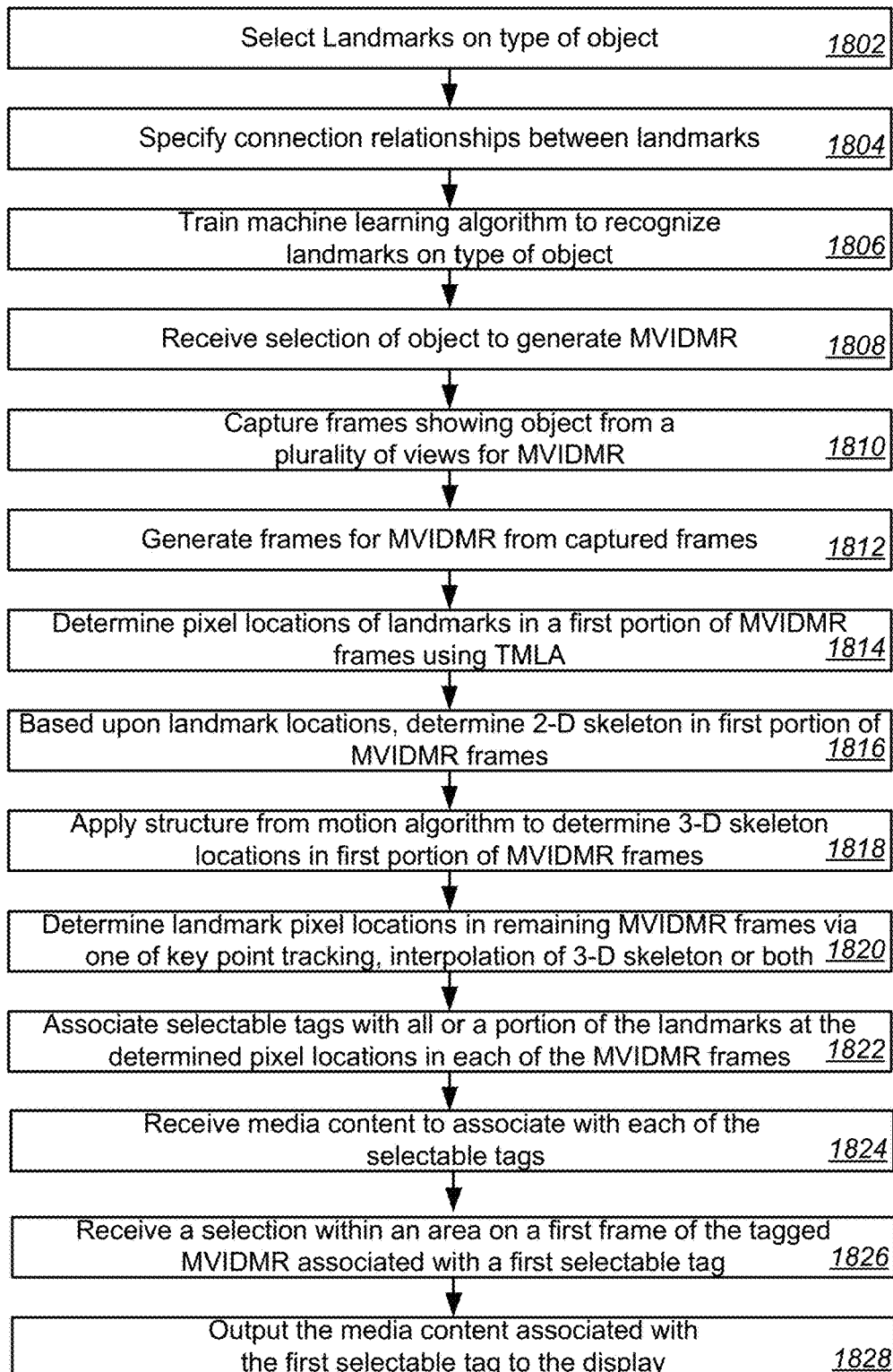
FIG. 17 is a method of automatically determining locations of selectable tags on an object in frames of an MVIDMR in accordance with embodiments of the present invention.

Next, with respect to FIG. 17, a method 1800 of automatically determining locations of selectable tags on an object in frames of an MVIDMR or a sequence of image frames including an object is described. In 1802, landmarks on a type of object can be selected, such as landmarks on a car as described above. In 1804, connection relationships between the landmarks can be specified. The connection relationships can be used to generate a 2-D skeleton and/or a 3-D skeleton associated with the type of object.

In 1806, a machine learning algorithm, such as a neural net can be trained to recognize the landmarks selected for a type of object. Thus, a trained machine learning algorithm (TMLA) can be obtained. In some embodiments, more than one machine learning algorithm can be trained. For example, a first machine learning algorithm can be trained to recognize a first set of landmarks and a second machine learning algorithm can be trained to recognize a second set of landmarks. As described above, all or a portion of the landmarks in the set of landmarks can be connected to form a skeleton associated with the object.

In 1808, a selection of an object can be received on which to generate an MVIDMR. In 1810, a camera, such as a camera on a mobile device, can be used to capture a plurality of frames showing the object from a plurality of different viewpoints. In 1812, an MVIDMR of the object can be generated from the captured frames.

In 1814, possible 2-D pixel locations of landmarks in a first portion of the frames of the MVIDMR can be determined using the TMLA. In 1816, based upon the possible 2-D pixel locations of the landmarks determined from the TMLA and the specified connection relationships between the landmarks, a 2-D skeleton can be determined for the object in the first portion of the frames of the MVIDMR. The determination of the 2-D skeleton can include determining the 2-D pixel locations of the joints of the skeleton. The joints of the 2-D skeleton can be the landmark. In 1816, a structure from motion (SFM) algorithm can be applied to determine a 3-D position of the landmarks in the first portion of the frames of the MVIDMR. In one embodiment, the SFM algorithm can include using a bundle adjustment algorithm.

The 3-D positions of landmarks and the connection relationships between the landmarks can be used to determine a 3-D skeleton associated with the object. When rendered into the frame, the 3-D skeleton can include landmarks currently visible in the frame and landmarks not currently visible in the frame. Based upon a 3-D coordinate system determined for each of the first portion of frames from the structure from motion calculations and the 3-D positions of the landmarks in the 3-D skeleton, landmarks associated with the 3-D skeleton currently not visible in each of the first portion of frames can be projected into the 2-D pixel coordinates associated with each frame.

In 1820, the pixel locations of landmarks in the remaining frames of the MVIDMR in which a 3-D skeleton calculation was not performed can be determined. The pixel locations of the landmarks can be determined via one of key point tracking, interpolation of the 3-D skeleton using IMU data or a combination of both approaches. In 1822, selectable tags can be automatically associated with all or a portion of the landmarks. The selectable tags can be placed relative to the 2-D pixel locations determined for the landmarks in each of the frames of the MVIDMR.

In 1824, media content to associate with each of the selectable tags can be received. In 1826, a selection within an area on a first frame of the tagged MVIDMR associated with a first selectable tag can be received. In 1828, the media content associated with the first selectable tag can be output to the display.

With reference to FIG. 18, shown is a particular example of a computer system that can be used to implement particular examples of the present invention. For instance, the computer system 2300 can be used to provide multi-view interactive digital media representations according to various embodiments described above. According to particular example embodiments, a system 2300 suitable for implementing particular embodiments of the present invention includes a processor 2301, a memory 2303, an interface 2311, a bus 2315 (e.g., a PCI bus), a persistent memory 2319 and a server 2321.

In particular embodiments, the persistent memory 2319 can store data for subsequent off-line processing. In some embodiments, the off-line processing can be performed on system 2300. In alternate embodiments, a portion of the off-line processing can be handed off to a remote device, such as server 2321.

The system 2300 can include one or more sensors, such as light sensors, accelerometers, gyroscopes, multi-axis magnetometers, microphones, cameras including stereoscopic capabilities or structured light cameras. Structured light cameras can be used to determine distances from the camera to objects in images. A Kinect™ uses a structured light sensor. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones When acting under the control of appropriate software or firmware, the processor 2301 is responsible for such tasks such as optimization. Various specially configured devices can also be used in place of a processor 2301 or in addition to processor 2301, such as graphical processor units (GPUs).

The touch screen can be a sensor which is placed over the display. The locations of touches received via the touch screen sensor can be mapped to content and their locations which are output to the display. Based upon the mapping, the mobile device can be configured to perform different actions depending on where the touch input is received on the touch screen sensor.

In one embodiment, the system 2300 can include dedicated hardware configured to implementing a neural net. For example, a special hardware chip, referred to as an NPU (Neural Processing Unit) can be employed. Neural nets can also be deployed on a GPU. Thus, it may be possible to implement plurality of neural nets in parallel. In one embodiment, the neural nets can be implemented to perform object recognition, segmentation (determining the boundaries or edges associated with objects or object parts) and/or skeleton detection in image data. In one embodiment, the neural nets for the skeleton detection and segmentation can be run in parallel. For example, the GPU can be utilized to execute a neural net which performs skeleton detection and the NPU can be used to execute a neural net which performs segmentation, such as body segmentation or vice versa.

The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 18, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a multi-view interactive digital media representation. In addition, a virtual guide can be provided to help teach a user how to view a multi-view interactive digital media representation in the wearable system. For example, the virtual guide can be provided in synthetic images output to head mounted display which indicate that the multi-view interactive digital media representation can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:

processing a recording, generated using a recording device, of a first plurality of frames captured by a camera of the recording device from a video stream as the recording device moves along a trajectory such that different views of a car are captured in the first plurality of frames;

generating a multi-view interactive digital media representation (MVIDMR) of the car including a second plurality of frames from the first plurality of frames wherein the different views of the car are included in each of the second plurality of frames;

using a machine learning algorithm on the second plurality of frames to generate heatmaps and part affinity fields associated with 2-D pixel locations of a plurality of landmarks on the car wherein the machine learning algorithm is trained to recognize the plurality of landmarks;

determining, using the heatmaps and part affinity fields, a skeleton for the car, the plurality of landmarks forming joints of the skeleton;

rendering a first selectable tag into the second plurality of frames to form a third plurality of frames associated with a tagged MVIDMR wherein the first selectable tag is associated with a first landmark positioned at a first joint within the skeleton and wherein the first selectable tag is rendered into the second plurality frames relative to 2-D pixel locations corresponding to the first joint in the second plurality of frames; and causing display of, on a display device of a user, a first frame from the third plurality of frames of the tagged MVIDMR that includes the first selectable tag.

2. The method of claim 1, further comprising:
receiving, from the display device, input indicating selection of the first selectable tag by the user; and
in response to receiving the input, causing display of, on the display device of the user, media content associated with the first selectable.

3. The method of claim 2, wherein the landmarks are selected from the group consisting of a location on a roof of the car, a location on a side mirror on the car, a location on a tail light of the car, a location on the tires of the car and a location headlights on the car.

4. The method of claim 3, wherein the first selectable tag is associated with a damaged location on the car and wherein the media content shows one or more close-up views of the damaged location.

5. The method of claim 4, wherein the first selectable tag is associated with a damaged location on the car and wherein the media content further shows an assessment of severity of damage to the damaged location.

6. The method of claim 5, wherein the first selectable tag is associated with a damaged location on the car and wherein the media content further shows an estimate of cost of repairing damage to the damaged location.

7. The method of claim 3, wherein the first selectable tag is associated with a component or a region of the car and wherein the media content shows one or more close-up views of the component or the region of the car.

8. The method of claim 3, wherein the MVIDMR shows an interior of the car.

9. The method of claim 1, wherein the displayed tagged MVIDMR comprises a 360 degree view of the car associated with an advertisement to sell the car.

10. The method of claim 1, wherein the skeleton is a 3-D skeleton.

11. The method of claim 10, further comprising based upon a structure from motion calculation, determining 3-D positions of the joints of the 3-D skeleton.

12. The method of claim 11, wherein the structure from motion calculation includes a bundle adjustment calculation.

13. A method comprising:
processing a recording, generated using a recording device, of a first plurality of frames captured by a camera of the recording device from a video stream as the recording device moves along a trajectory such that different views of an article of clothing are captured in the first plurality of frames;
generating a multi-view interactive digital media representation (MVIDMR) of the article of clothing including a second plurality of frames from the first plurality of frames wherein the different views of the article of clothing are included in each of the second plurality of frames;
using a machine learning algorithm on the second plurality of frames to generate heatmaps and part affinity fields associated with 2-D pixel locations of a plurality of landmarks on the article of clothing wherein the machine learning algorithm is trained to recognize the plurality of landmarks;
determining, using the heatmaps and part affinity fields, a skeleton for the article of clothing, the plurality of landmarks forming joints of the skeleton;
rendering a first selectable tag into the second plurality of frames to form a third plurality of frames associated with a tagged MVIDMR wherein the first selectable tag is associated with a first landmark positioned at a first joint within the skeleton and wherein the first selectable tag is rendered into the second plurality frames relative to 2-D pixel locations corresponding to the first joint in the second plurality of frames; and
causing display of, on a display device of a user, a first frame from the third plurality of frames of the tagged MVIDMR that includes the first selectable tag.

14. The method of claim 13, wherein the first selectable tag highlights a portion of the article of clothing.

15. The method of claim 13, wherein the tagged MVIDMR is generated in association with an advertisement for the article of clothing.

16. The method of claim 15, wherein the multi-view interactive digital media representation of the object is displayed in association with a selection allowing the person to purchase the article of clothing.

17. The method of claim 13, wherein the first selectable tag highlights a price of the article of clothing.

18. The method of claim 13, wherein the skeleton is a 3-D skeleton.

19. The method of claim 18, further comprising based upon a structure from motion calculation, determining 3-D positions of the joints of the 3-D skeleton.

20. The method of claim 19, wherein the structure from motion calculation includes a bundle adjustment calculation.

* * * * *